United States Patent [19]
Nagano et al.

[11] Patent Number: 5,797,046
[45] Date of Patent: Aug. 18, 1998

[54] VISUAL AXIS CONTROLLABLE OPTICAL APPARATUS INCLUDING A VISUAL AXIS DETECTING DEVICE FOR DETECTING A VISUAL AXIS

[75] Inventors: Akihiko Nagano, Ichihara; Akira Yamada; Yoshiaki Irie, both of Yokohama, all of Japan

[73] Assignee: Canon Kabushiki Kaisha, Tokyo, Japan

[21] Appl. No.: 408,281

[22] Filed: Mar. 22, 1995

[30] Foreign Application Priority Data

Mar. 23, 1994 [JP] Japan .................................... 6-076567
Jan. 13, 1995 [JP] Japan .................................... 7-019970
Jan. 13, 1995 [JP] Japan .................................... 7-019972

[51] Int. Cl.$^6$ ............................................. G03B 17/00
[52] U.S. Cl. .............................................. 396/51; 396/50
[58] Field of Search ................................ 354/471, 410, 354/432, 62, 219; 396/51, 50; 348/78

[56] References Cited

U.S. PATENT DOCUMENTS

| | | | |
|---|---|---|---|
| 5,036,347 | 7/1991 | Tsunekawa et al. | 354/400 |
| 5,182,443 | 1/1993 | Suda et al. | 250/201.2 |
| 5,214,466 | 5/1993 | Nagano et al. | 354/402 |
| 5,225,862 | 7/1993 | Nagano et al. | 354/62 |
| 5,245,371 | 9/1993 | Nagano et al. | 354/62 |
| 5,253,008 | 10/1993 | Konishi et al. | 354/402 |
| 5,280,312 | 1/1994 | Yamada et al. | 351/211 |
| 5,298,927 | 3/1994 | Konishi et al. | 351/211 |
| 5,386,258 | 1/1995 | Nagano | 354/400 |
| 5,461,452 | 10/1995 | Iwasaki | 354/410 |
| 5,461,453 | 10/1995 | Watanabe et al. | 354/471 |
| 5,541,400 | 7/1996 | Hagiwara et al. | 250/208.1 |

FOREIGN PATENT DOCUMENTS

| | | |
|---|---|---|
| 1-274736 | 11/1989 | Japan . |
| 6-34874 | 2/1994 | Japan . |

*Primary Examiner*—Safet Metjahic
*Assistant Examiner*—Eric Nelson
*Attorney, Agent, or Firm*—Fitzpatrick, Cella, Harper & Scinto

[57] ABSTRACT

A visual axis controllable optical apparatus, which is used in different postures. The optical apparatus includes a light detecting device for receiving light reflected by an eye, and detecting the intensity distribution of the received light, a storage device for storing personal data associated with a personal difference of the eye in correspondence with the different postures and a visual axis detecting device for detecting a visual axis. The visual axis detecting device detects the position of the visual axis using the personal data stored in the storage device corresponding to the posture of the optical apparatus, and the intensity distribution detected by the light detecting device.

26 Claims, 41 Drawing Sheets

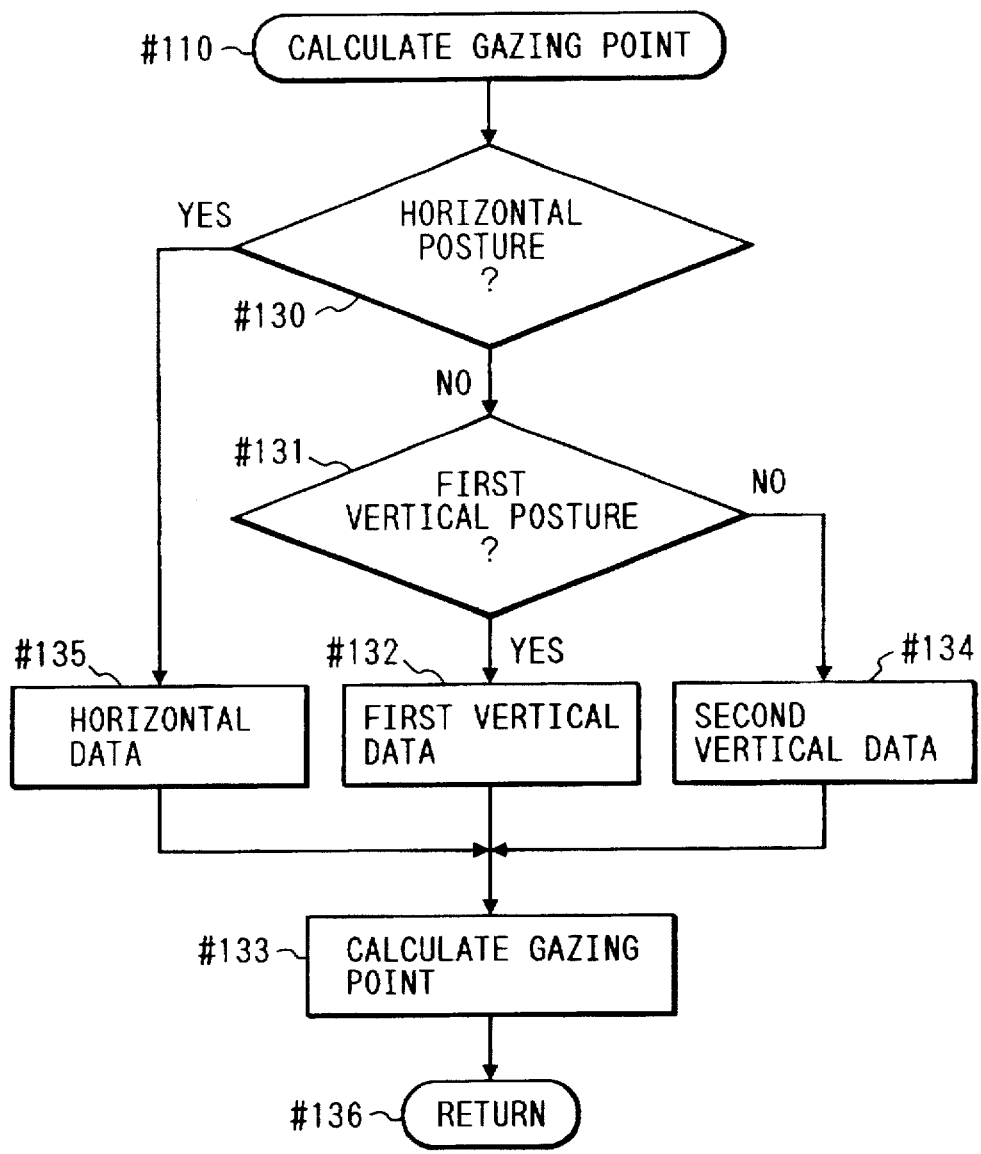

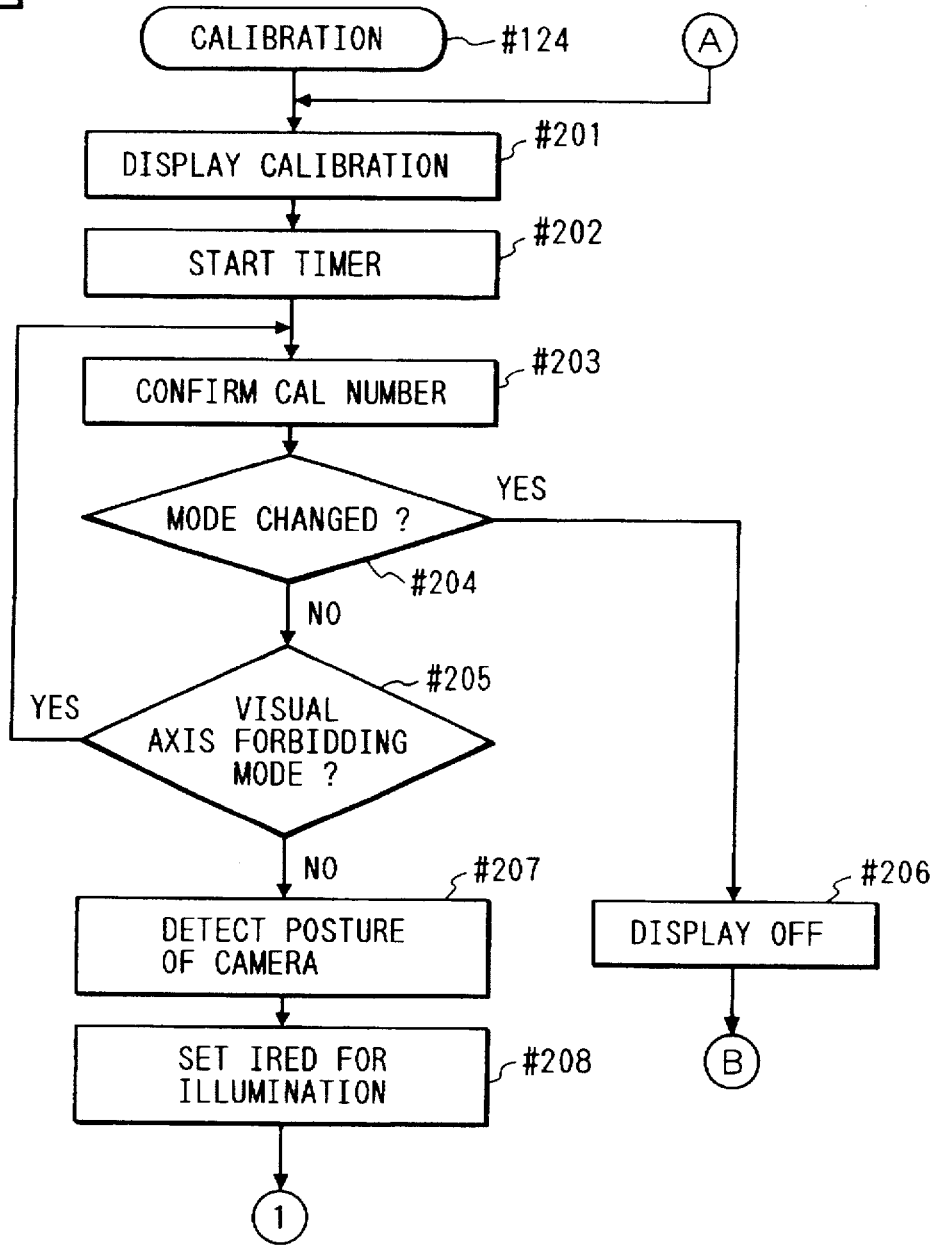

| FIG. 21A |
| FIG. 21B |
| FIG. 21C |
| FIG. 21D |

(HORIZONTAL POSTURE)

(FIRST VERTICAL POSTURE)

(SECOND VERTICAL POSTURE)

FIG. 23

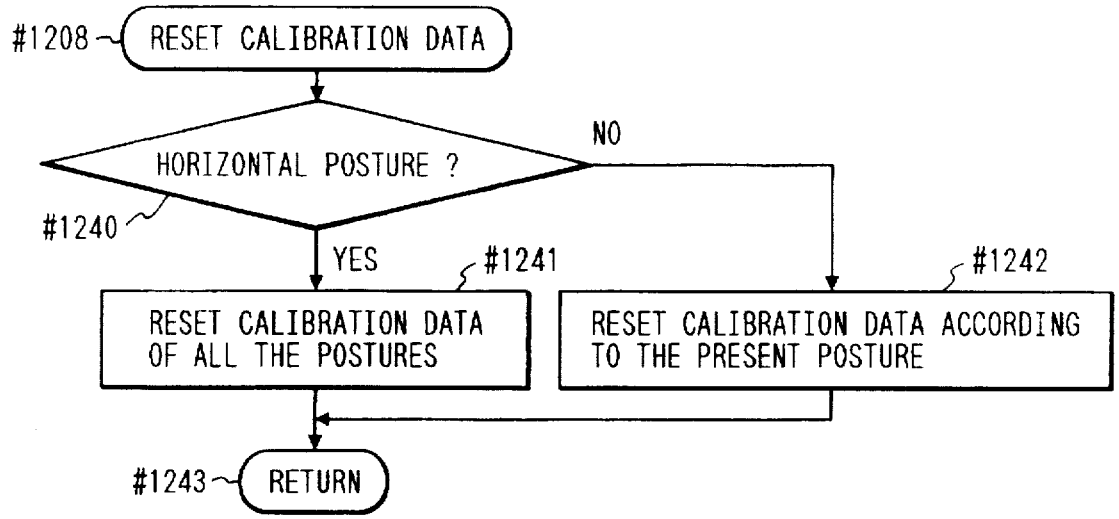

FIG. 24

| HORIZONTAL POSTURE | FIRST VERTICAL POSTURE | SECOND VERTICAL POSTURE |
|---|---|---|
| IREDh | IREDv1 | IREDv2 |
| nh | nv1 | nv2 |
| $\sum \theta x1$ | $\sum \theta xv1$ | $\sum \theta xv2$ |
| $\sum Rpx1*\theta x1$ | $\sum Rpxv1*\theta xv1$ | $\sum Rpxv2*\theta xv2$ |
| $\sum Rpx1$ | $\sum Rpxv1$ | $\sum Rpxv2$ |
| $\sum Rpx1\hat{~}2$ | $\sum Rpxv1\hat{~}2$ | $\sum Rpxv2\hat{~}2$ |
| $\sum \theta x2$ | $\sum \theta y1v1$ | $\sum \theta y1v2$ |
| $\sum Rpx2*\theta x2$ | $\sum Rpy1v1*\theta y1v1$ | $\sum Rpy1v2*\theta y1v2$ |
| $\sum Rpx2$ | $\sum Rpy1v1$ | $\sum Rpy1v2$ |
| $\sum Rpx2\hat{~}2$ | $\sum Rpy1v1\hat{~}2$ | $\sum Rpy1v2\hat{~}2$ |
| $\sum \theta yh$ | $\sum \theta y2v1$ | $\sum \theta y2v2$ |
| $\sum Rpyh*\theta yh$ | $\sum Rpy2v1*\theta y2v1$ | $\sum Rpy2v2*\theta y2v2$ |
| $\sum Rpyh$ | $\sum Rpy2v1$ | $\sum Rpy2v2$ |
| $\sum Rpyh\hat{~}2$ | $\sum Rpy2v1\hat{~}2$ | $\sum Rpy2v2\hat{~}2$ |

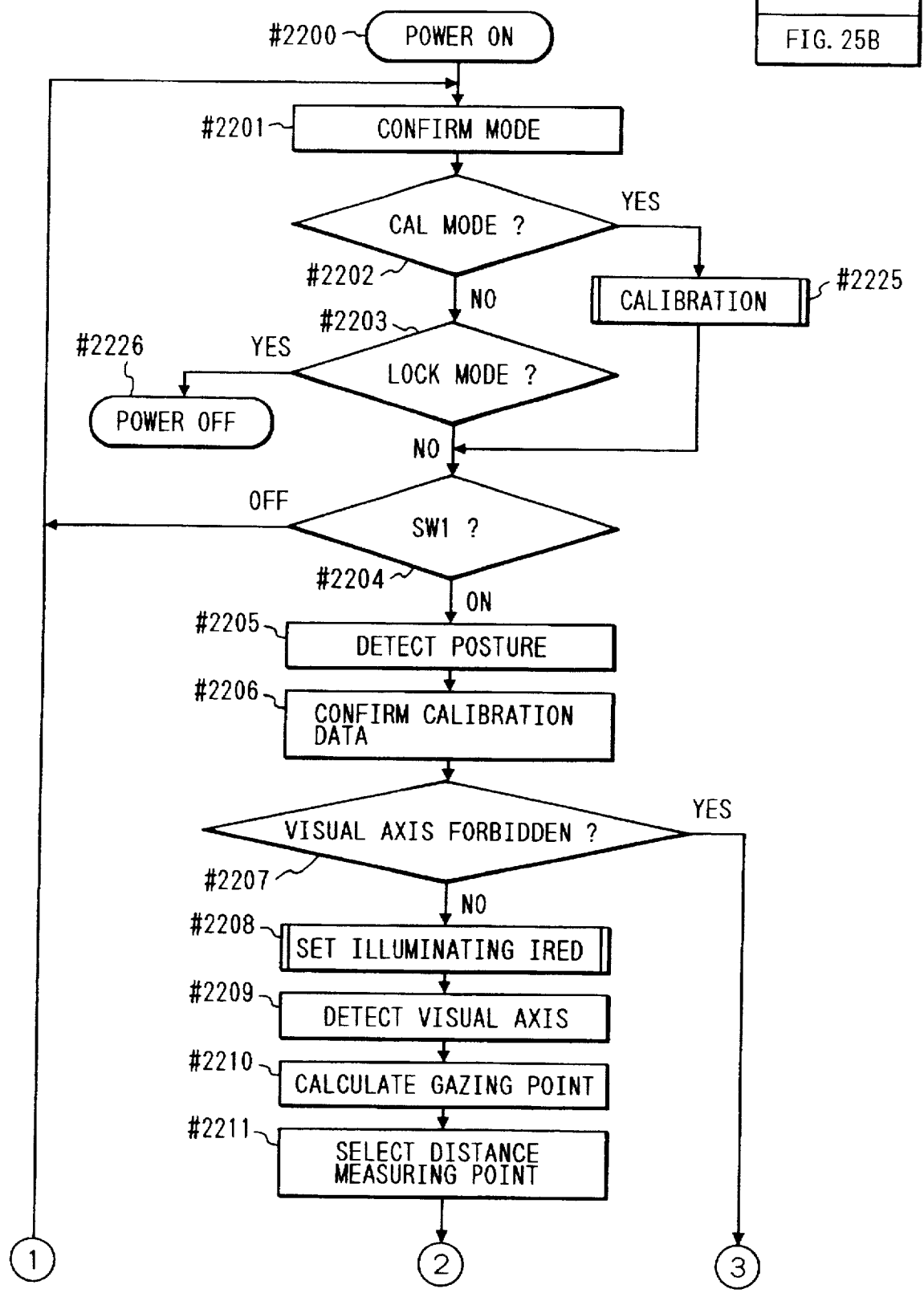

(HORIZONTAL POSTURE)

(FIRST VERTICAL POSTURE)

(SECOND VERTICAL POSTURE)

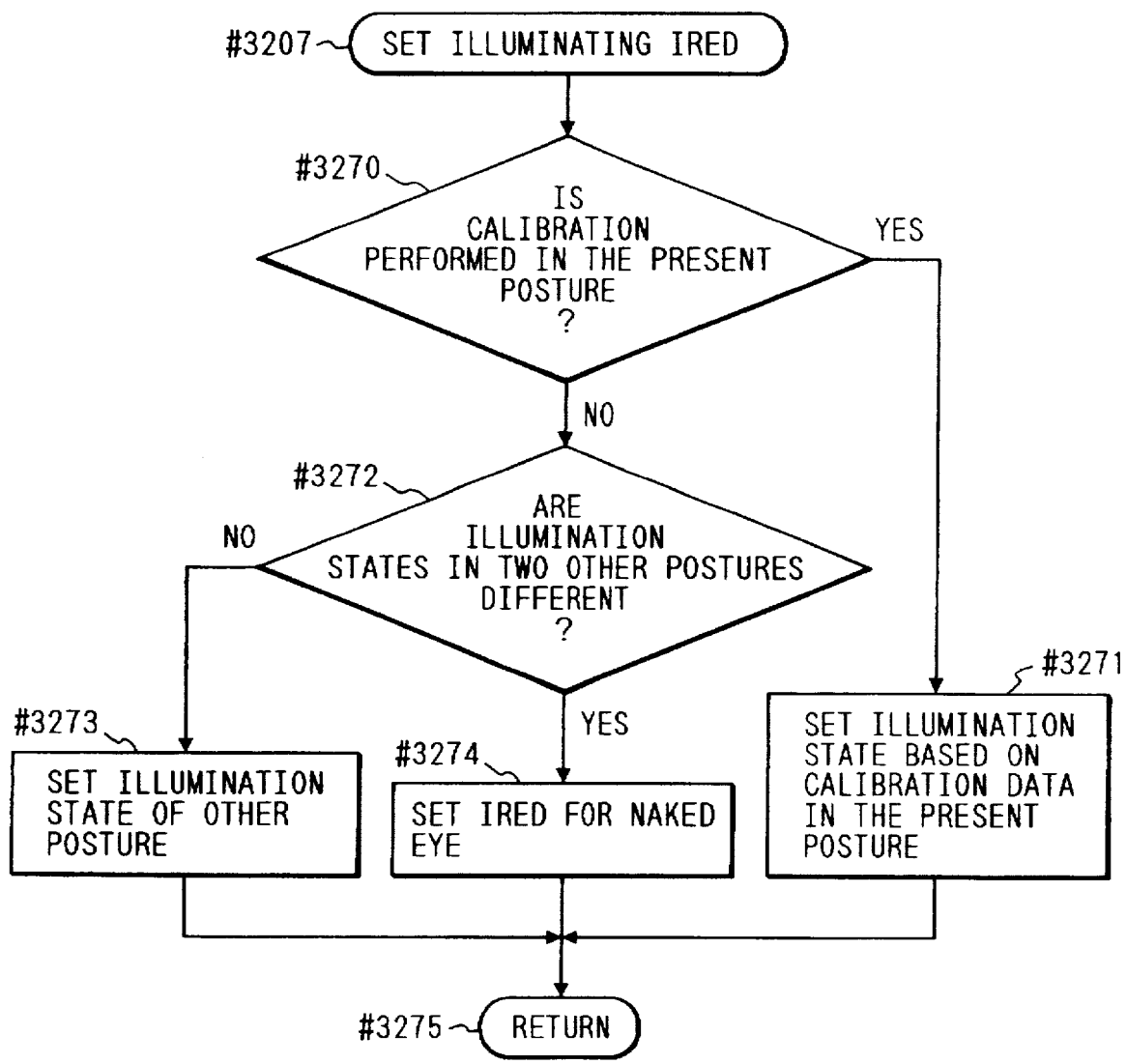

FIG. 29A

| HORIZONTAL POSTURE | FIRST VERTICAL POSTURE | SECOND VERTICAL POSTURE |
|---|---|---|
| IREDh | IREDv1 | IREDv2 |
| nh | nv1 | nv2 |
| $\Sigma \theta x1$ | $\Sigma \theta xv1$ | $\Sigma \theta xv2$ |
| $\Sigma Rpx1 * \theta x1$ | $\Sigma Rpxv1 * \theta xv1$ | $\Sigma Rpxv2 * \theta xv2$ |
| $\Sigma Rpx1$ | $\Sigma Rpxv1$ | $\Sigma Rpxv2$ |
| $\Sigma Rpx1\hat{\ }2$ | $\Sigma Rpxv1\hat{\ }2$ | $\Sigma Rpxv2\hat{\ }2$ |
| $\Sigma \theta x2$ | $\Sigma \theta y1v1$ | $\Sigma \theta y1v2$ |
| $\Sigma Rpx2 * \theta x2$ | $\Sigma Rpy1v1 * \theta y1v1$ | $\Sigma Rpy1v2 * \theta y1v2$ |
| $\Sigma Rpx2$ | $\Sigma Rpy1v1$ | $\Sigma Rpy1v2$ |
| $\Sigma Rpx2\hat{\ }2$ | $\Sigma Rpy1v1\hat{\ }2$ | $\Sigma Rpy1v2\hat{\ }2$ |
| $\Sigma \theta yh$ | $\Sigma \theta y2v1$ | $\Sigma \theta y2v2$ |
| $\Sigma Rpyh * \theta yh$ | $\Sigma Rpy2v1 * \theta y2v1$ | $\Sigma Rpy2v2 * \theta y2v2$ |
| $\Sigma Rpyh$ | $\Sigma Rpy2v1$ | $\Sigma Rpy2v2$ |
| $\Sigma Rpyh\hat{\ }2$ | $\Sigma Rpy2v1\hat{\ }2$ | $\Sigma Rpy2v2\hat{\ }2$ |

FIG. 29B

| | IRED FOR NAKED EYE | IRED FOR SPECTACLES |
|---|---|---|
| HORIZONTAL POSTURE | 13a, 13b (IREDh = 0) | 13c, 13d (IREDh = 1) |
| FIRST VERTICAL POSTURE | 13a, 13e (IREDv1 = 0) | 13c, 13g (IREDv1 = 1) |
| SECOND VERTICAL POSTURE | 13b, 13f (IREDv2 = 0) | 13d, 13h (IREDv2 = 1) |

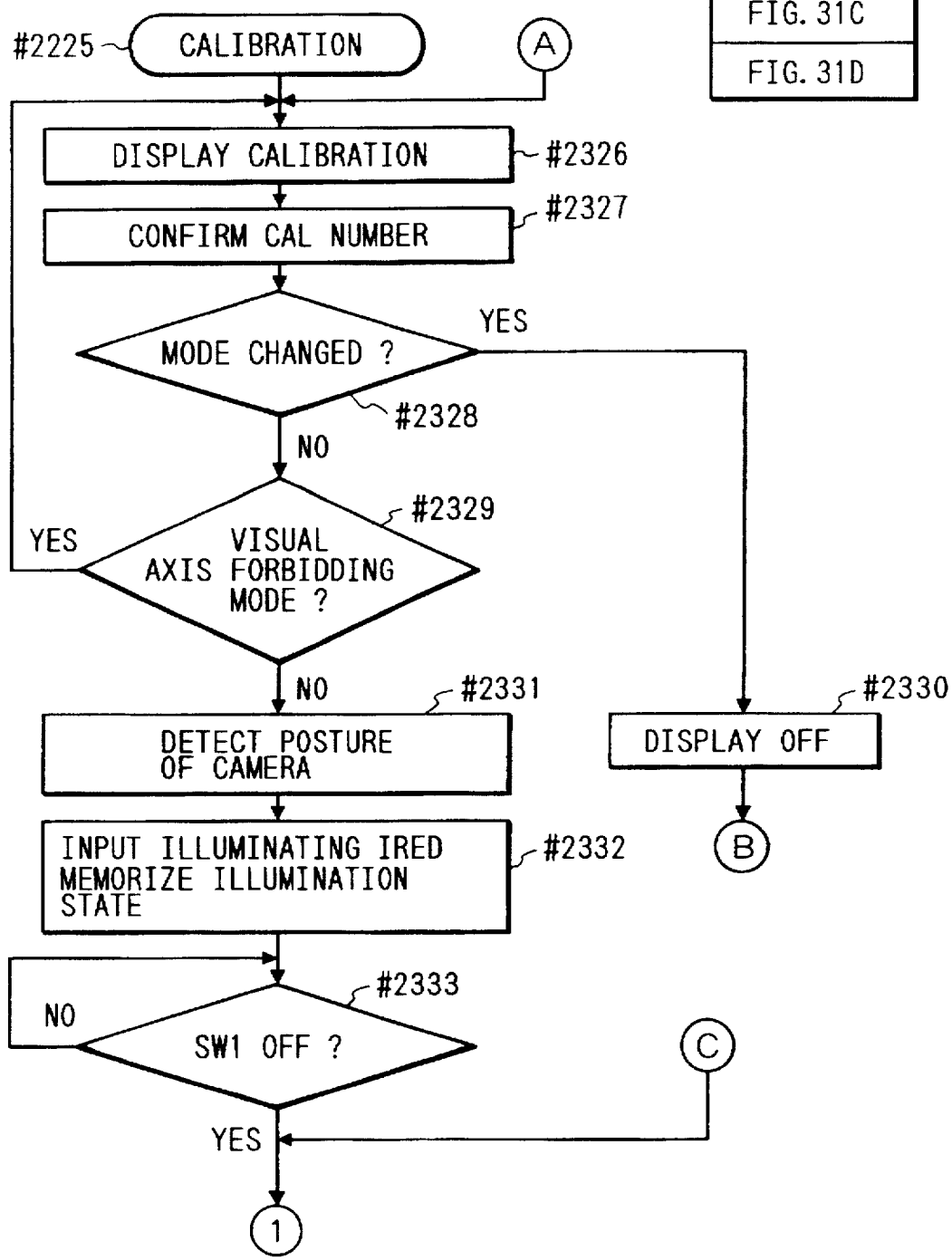

FIG. 33

|  |  | IRED FOR NAKED EYE | IRED FOR SPECTACLES |
|---|---|---|---|
| HORIZONTAL POSTURE | | 13a, 13b | 13c, 13d |
| LIGHT EMISSION AMOUNT | LARGE | IREDh = 2 | IREDh = 1 |
| | SMALL | IREDh = 0 | |
| FIRST VERTICAL POSTURE | | 13a, 13e | 13c, 13g |
| LIGHT EMISSION AMOUNT | LARGE | IREDv1 = 2 | IREDv1 = 1 |
| | SMALL | IREDv1 = 0 | |
| SECOND VERTICAL POSTURE | | 13b, 13f | 13d, 13h |
| LIGHT EMISSION AMOUNT | LARGE | IREDv2 = 2 | IREDv2 = 1 |
| | SMALL | IREDv2 = 0 | |

VISUAL AXIS CONTROLLABLE OPTICAL APPARATUS INCLUDING A VISUAL AXIS DETECTING DEVICE FOR DETECTING A VISUAL AXIS

BACKGROUND OF THE INVENTION

1. Field of the Invention

The present invention relates to a visual axis controllable optical apparatus and, more particularly, to a visual axis controllable optical apparatus which comprises a visual axis detecting device for detecting the axis of the direction of a gazing point, where an observer (photographer) observes via a finder system, i.e., a so-called visual axis (line of sight), on an observation surface (focusing surface) on which an object image is formed by a photographing system, by utilizing an image of the eyeball obtained upon illumination of light onto the eyeball surface of the observer.

2. Related Background Art

Conventionally, various apparatuses (e.g., eye cameras) for detecting a position, where an observer observes, on the observation surface, i.e., a so-called visual axis (line of sight), have been proposed.

For example, in Japanese Laid-Open Patent Application No. 1-274736, a collimated light beam emitted from a light source is projected onto the front eye portion of the eyeball of an observer, and the visual axis is obtained by utilizing the imaging positions of a cornea reflected image formed by light reflected by the cornea and an image of the pupil. This reference also discloses an example wherein the visual axis detecting device is arranged in a single-lens reflex camera, and the focusing point of a photographing lens is automatically adjusted using the visual axis information of an observer.

FIG. 20 is an explanatory view of the principle of a known visual axis detection method. Referring to FIG. 20, light sources 13a and 13b comprise light-emitting diodes for emitting infrared light to which an observer is insensitive. The light sources 13a and 13b are arranged to be substantially symmetrical about the optical axis of a light-receiving lens 12 in the x-direction, and illuminate an eyeball 15 of an observer with divergent light. Some light components of the illumination light reflected by the eyeball 15 are focused on an image sensor 14 via the light-receiving lens 12.

FIG. 19A is a schematic view of an eyeball image 20 projected onto the image sensor 14, and FIG. 19B is a graph showing the intensity of an output signal from the image sensor 14. The visual axis detection method will be described below with reference to FIGS. 19A and 19B.

Infrared light emitted from the light source 13b irradiates a cornea 16 of the eyeball 15 of the observer. A cornea reflected image d (virtual image) formed by some light components of the infrared light reflected by the surface of the cornea 16 is focused by the light-receiving lens 12, and is imaged at a position d' on the image sensor 14. Similarly, infrared light emitted from the light source 13a irradiates the cornea 16 of the eyeball 15. At this time, a cornea reflected image e formed by some light components of the infrared light reflected by the surface of the cornea 16 is focused by the light-receiving lens 12, and is imaged at a position e' on the image sensor 14.

Light beams from end portions a and b of an iris 17 respectively form images of the end portions a and b at positions a' and b' on the image sensor 14 via the light-receiving lens 12. When a rotation angle $\theta$ of the optical axis of the eyeball 15 with respect to the optical axis of the light-receiving lens 12 is small, if the x-coordinates of the end portions a and b of the iris 17 are respectively represented by xa and xb, an x-coordinate xc of a central position c of a pupil 19 is given by:

$$xc \approx (xa+xb)/2$$

On the other hand, the x-coordinate of the middle point of the cornea reflected images d and e substantially coincides with an x-coordinate xo of a center o of curvature of the cornea 16. For this reason, when the x-coordinates of the generation positions d and e of the cornea reflected images are respectively represented by xd and xe, and a standard distance between the center o of curvature of the cornea 16 and the center c of the pupil 19 is represented by OC, the rotation angle $\theta$ of an optical axis 15a of the eyeball 15 substantially satisfies:

$$OC*SIN\theta \approx \{(xd+xe)/2\}-xc \quad (1)$$

(* means multiplication in this specification.)

For this reason, by detecting the positions of the feature points (the cornea reflected images d and e and the end portions a and b of the iris) of the eyeball 15 of which image is projected onto the image sensor 14, as shown in FIGS. 19A and 19B, the rotation angle $\theta$ of the optical axis 15a of the eyeball 15 can be obtained. At this time, formula (1) is rewritten as:

$$\beta*OCSIN\theta \approx \{(xd'+xe')/2\}-\{(xa'+xb')/2\} \quad (2)$$

where $\beta$ is the magnification factor determined by the position of the eyeball 15 with respect to the light-receiving lens 12, and is calculated as a function of an interval |xd'-xe'| between the cornea reflected images in practice.

Furthermore, the rotation angle $\theta$ of the optical axis 15a of the eyeball 15 is rewritten as:

$$\theta \approx ARCSIN\{(xpo-xic)/\beta/OC\} \quad (3)$$

for $$xic=(xa'+xb')/2$$

$$xpo=(xd'+xe')/2$$

Since the size of the eyeball 15 of the observer and the deviation amount between the optical axis 15a of the eyeball 15 and the visual axis have personal differences, a visual axis rotation $\theta x$ (horizontal direction) of the observer is calculated by correcting the rotation angle $\theta$ of the optical axis 15a of the eyeball as follows:

$$\theta x = A*\theta+B \quad (4)$$

where A and B are calibration data. More specifically, A is a coefficient which takes the personal difference of the size of the eyeball into account, and B is a coefficient which takes the personal difference of the deviation amount between the optical axis of the eyeball and the visual axis into account.

Japanese Laid-Open Patent Application No. 1-274736 and Japanese Application Publication No. 4-213795 have proposed a gazing point calibration method for calculating the above-mentioned calibration data.

In the gazing point calibration method, calibration data for horizontal and vertical rotations of the eyeball are obtained by rotating the eyeball of a photographer in a state wherein the camera posture corresponds to a horizontal posture.

The calibration data calculated by the gazing point calibration method include assembling error factors of optical elements (infrared light-emitting diodes, lenses, CCDS, and the like) constituting an optical system for detecting an eyeball image in addition to personal difference factors of a photographer himself or herself, which represent the relationship between the rotation angle of the eyeball of the photographer and the gazing point in a finder. For this reason, when gazing point detection is performed using another combination of infrared light-emitting diodes for illuminating the eyeball of the photographer when the photographer holds the camera at a vertical posture, the assembling errors of the infrared light-emitting diodes change, and errors are generated in the calibration data.

SUMMARY OF THE INVENTION

It is an object of the present invention to provide a visual axis controllable optical apparatus which can accurately detect the visual axis position of a user at a plurality of mutually different postures.

According to the first aspect of the present invention, there is provided a visual axis controllable optical apparatus, which is used at mutually different postures, comprising: light detecting means for receiving light reflected by an eye to detect an intensity distribution of the received light; storage means for storing personal data associated with a visual axis corresponding to each of the mutually different postures; and visual axis detecting means for detecting the visual axis position by using the stored personal data corresponding to the posture of the optical apparatus, and the intensity distribution detected by the light detecting means.

According to the second aspect of the present invention, there is provided a visual axis controllable optical apparatus, which is used at mutually different postures, comprising: illumination means for illuminating an eye; light detecting means for receiving light reflected by the eye to detect an intensity distribution of the received light; visual axis detecting means for detecting a visual axis by using the intensity distribution; and storage means for storing illumination conditions by the illumination means corresponding to each of the mutually different postures, wherein the illumination means illuminates the eye under the illumination conditions stored corresponding to the posture of the optical apparatus.

BRIEF DESCRIPTION OF THE DRAWINGS

FIG. 9 is a flow chart showing a gazing point calculation routine;

FIG. 23 is a flow chart showing the operation of the camera upon resetting of calibration data for the postures shown in FIGS. 22A to 22F;

FIG. 24 is a table showing an example of calibration data for the postures shown in FIGS. 22A to 22F;

FIG. 28 is a flow chart showing the illuminating IRED setting operation in FIGS. 27A to 27D;

FIGS. 29A and 29B are tables showing the relationship among the data used in the calibration routine in the fourth embodiment, the postures of the camera, and the illumination mode flags;

FIG. 33 is a table showing the relationship between the postures of the camera and the illumination mode flags in the fifth embodiment of the present invention.

DETAILED DESCRIPTION OF THE PREFERRED EMBODIMENTS

Figure 1:
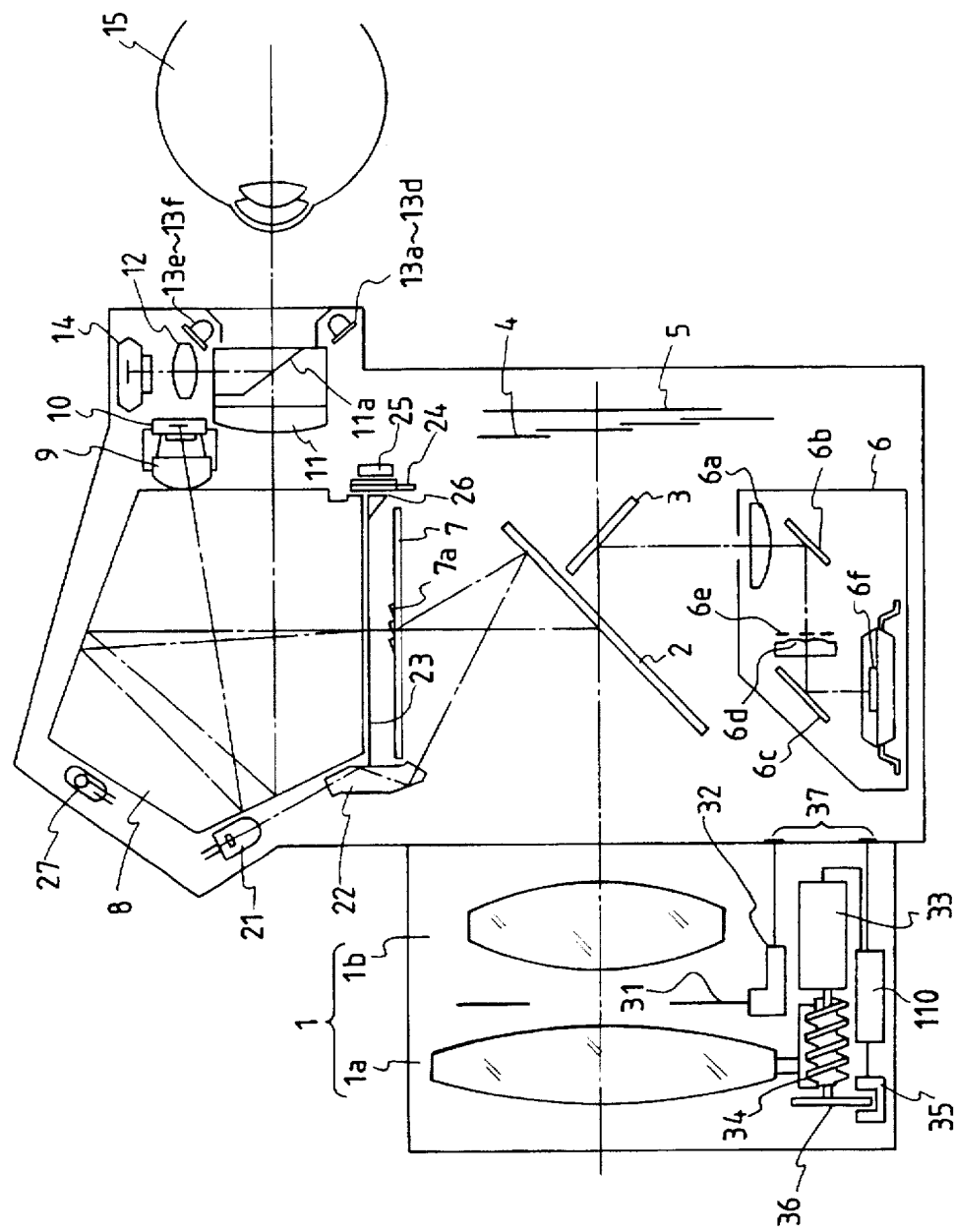
FIG. 1 is a schematic sectional view of the first embodiment in which the present invention is applied to a single-lens reflex camera.
Figure 2A:
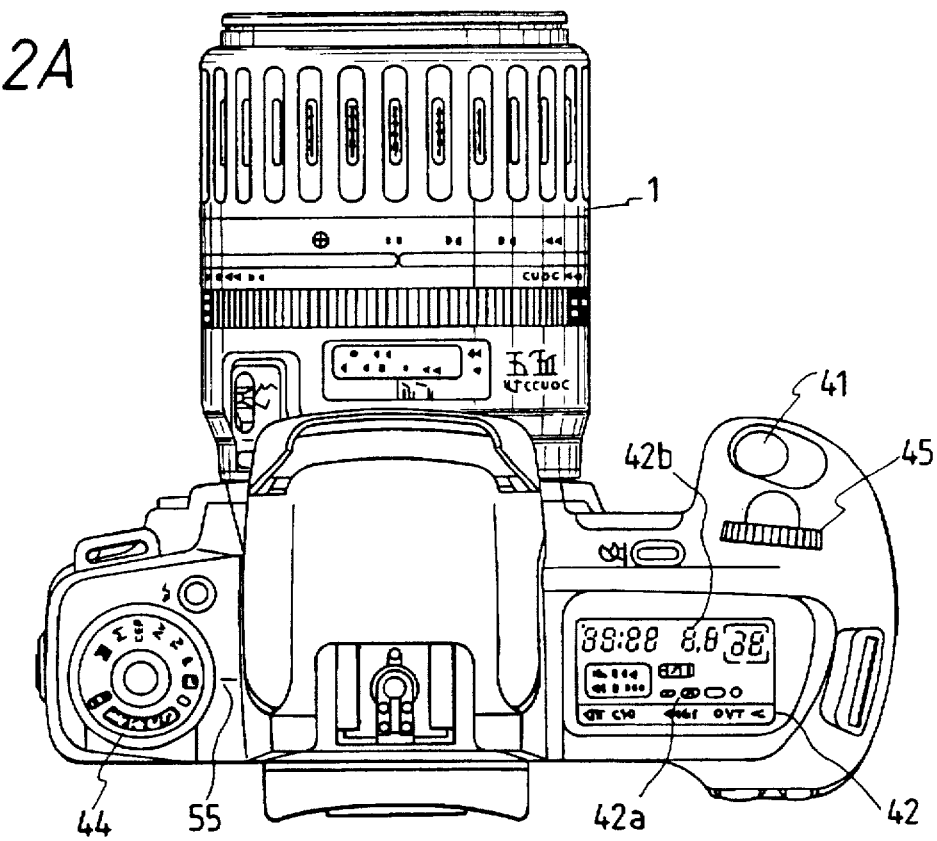
FIGS. 2A and 2B are respectively a top view and a rear view showing the outer appearance of a principal part of the single-lens reflex camera shown in FIG. 1.
Figure 2B:
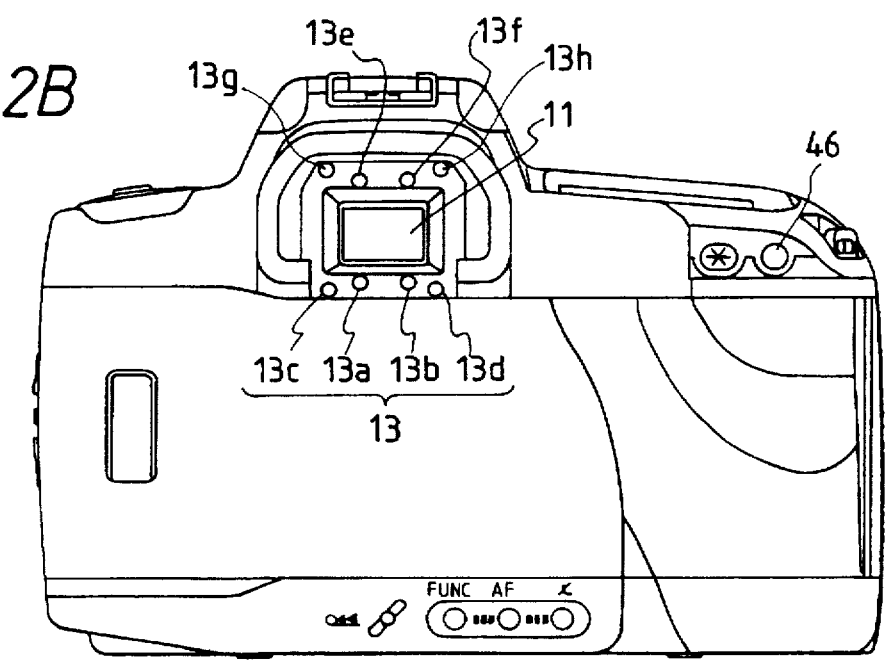
Figure 3:
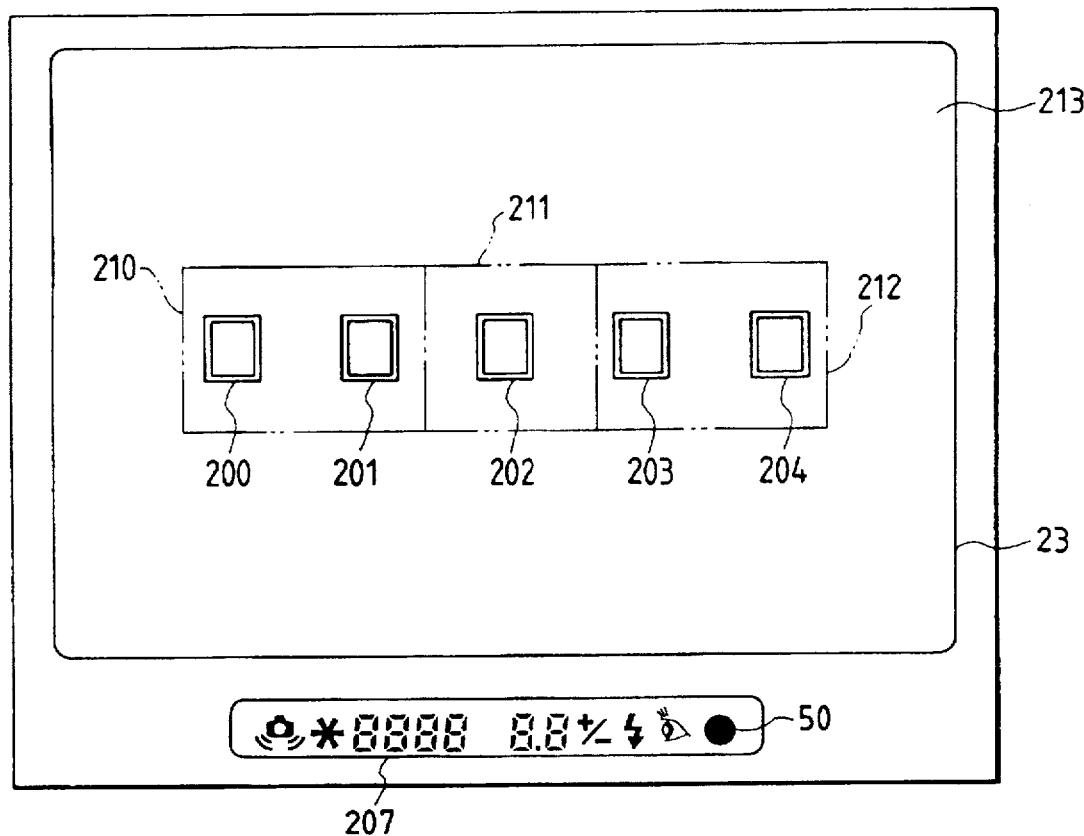
FIG. 3 is a view of the finder view field shown in FIG. 1.

FIG. 1 is a schematic sectional view of principal part of a each of the first to fifth embodiments when the present invention is applied to a single-lens reflex camera as an optical apparatus. FIGS. 2A and 2B are respectively a top view and a rear view showing the outer appearance of the single-lens reflex camera shown in FIG. 1, and FIG. 3 is an explanatory view of the finder view field shown in FIG. 1.

Referring to FIG. 1, a photographing lens 1 is shown as being constituted by two lenses 1a and 1b for the sake of simplicity in FIG. 1, but is constituted by a larger number of lenses, in practice. A main mirror 2 is obliquely inserted in or retracted from the photographing optical path in correspondence with the observation state and photographing state. A sub mirror 3 reflects a light beam transmitted through the main mirror 2 toward a lower portion of a camera body. A shutter 4 is arranged in front of a photosensitive member 5. The photosensitive member 5 comprises a silver chloride film, a solid-state image pickup element such as a CCD or a MOS type element, or an image pickup tube such as a VIDICON.

A focusing point detecting device 6 adopts a known phase difference method, and is constituted by a field lens 6a arranged in the vicinity of an imaging plane, reflection mirrors 6b and 6c, a secondary imaging lens 6d, an aperture 6e, a line sensor 6f including a plurality of CCDs, and the like. The focusing point detecting device 6 shown in FIG. 1 can detect a focusing point (an amount of defocus) with respect to a plurality of regions (five distance measuring point marks 200 to 204) in an observation frame (finder view field) 213, as shown in FIG. 3.

A focusing screen 7 is arranged on the prospective imaging plane of the photographing lens 1. A pentagonal roof type prism 8 is used for deflecting the finder optical path. An imaging lens 9 and a photometering sensor 10 are used for measuring the object luminance in the observation frame. The imaging lens 9 defines a conjugate relationship between the focusing screen 7 and the photometering sensor 10 via the reflection optical path in the pentagonal roof type prism 8.

An eyepiece lens 11 with a beam splitter 11a is arranged behind the exit surface of the pentagonal roof type prism 8, and is used for observing the focusing screen 7 by an eye 15 of a photographer. The beam splitter 11a, for example, comprises a dichroic mirror which transmits visible light and reflects infrared light. A light-receiving lens 12 is arranged before an image sensor 14 which is constituted by two-dimensionally arranging photoelectric element arrays such as CCDs. The image sensor 14 is arranged to be conjugate with the vicinity of the iris of the eye 15 of the photographer, which is located at a predetermined position with respect to the light-receiving lens 12.

Infrared light-emitting diodes (IREDs) 13a to 13h serve as illumination light sources of the eye 15 of the photographer, and are arranged around the eyepiece lens 11, as shown in FIG. 2B.

The IREDs 13a, 13b, 13e, and 13f are set for a photographer whose eye 15 is separated from the eyepiece lens 11 by a relatively small distance, e.g., a photographer with a naked eye. These IREDs are arranged at positions near the optical axis of a finder as an optical system, which coincides with the optical axis of the eyepiece lens 11, and their light emission amounts are set to be relatively small. On the other hand, the IREDs 13c, 13d, 13g, and 13h are set for a photographer whose eye 15 is separated from the eyepiece lens 11 by a relatively large distance, e.g., a photographer who wears spectacles. These IREDs are arranged at positions far from the optical axis of the finder which coincides with the optical axis of the eyepiece lens 11, and their light emission amounts are set to be relatively large.

Superimposed LEDs 21 have a high luminance so that they can be visually confirmed even in a light object. Light emitted from the superimposed LEDs 21 is reflected by a projection prism 22 and the main mirror 2, is deflected in the vertical direction by micro-prism arrays 7a formed on the display portion on the focusing screen 7, and reaches the eye 15 of the photographer via the pentagonal roof type prism 8 and the eyepiece lens 11.

The micro-prism arrays 7a are formed at positions, corresponding to the focusing point detecting regions, on the focusing screen 7 in frame patterns, and are respectively illuminated with light beams from the corresponding superimposed LEDs 21 (to be respectively referred to as LED-L1, LED-L2, LED-C, LED-R1, and LED-R2 hereinafter). With these light beams, as can be seen from FIG. 3 showing the finder view field, the distance measuring point marks 200, 201, 202, 203, and 204 shine in the finder view field 213, thus displaying the focusing point detecting regions (distance or defocus measuring points) (to be referred to as a superimposed display hereinafter).

A view field mask 23 forms a finder view field region, and an LCD 24 in the finder (to be referred to as a finder LCD hereinafter) displays photographing information on a region outside the finder view field. The finder LCD 24 is illuminated with light from an illuminating LED (F-LED) 25. Light transmitted through the finder LCD 24 is guided into the finder via a triangular prism 26, and forms an image of photographing information on a region 207 outside the finder view field, as shown in FIG. 3. The photographer observes the displayed photographing information. A mercury switch (posture detecting switch) 27 constitutes posture detecting means, and detects the posture of the camera.

The photographing lens 1 includes an aperture 31, an aperture drive device 32 including an aperture drive circuit 111, a lens drive motor 33, a lens drive member 34 comprising, e.g., a drive gear, and a photocoupler 35. The photocoupler 35 detects the rotation of a pulse plate 36 which is interlocked with the lens drive member 34, and supplies the detected information to a lens focusing point adjusting circuit 110. The lens focusing point adjusting circuit 110 drives the lens drive motor by a predetermined amount on the basis of this information and lens drive amount information from the camera side, thereby moving the focusing lens 1a of the photographing lens 1 to an in-focus position. Mount contacts 37 serve as a known interface between the camera and the lens.

Referring to FIGS. 2A and 2B, a release button 41 is arranged near an LCD 42 for a monitor (to be referred to as a monitor LCD hereinafter) as an external monitor display device. The monitor LCD 42 includes a fixed segment display portion 42a for displaying predetermined patterns, and a 7-segment display portion 42b for variably displaying numbers. A mode dial 44 is used for selecting, e.g., a specific photographing mode. A reset switch 46 is used for erasing personal information (the information representing the personal difference) associated with the visual axis and stored in storage means. Since other operation members are not necessary for the understanding of the present invention, a detailed description thereof will be omitted.

Figure 4:
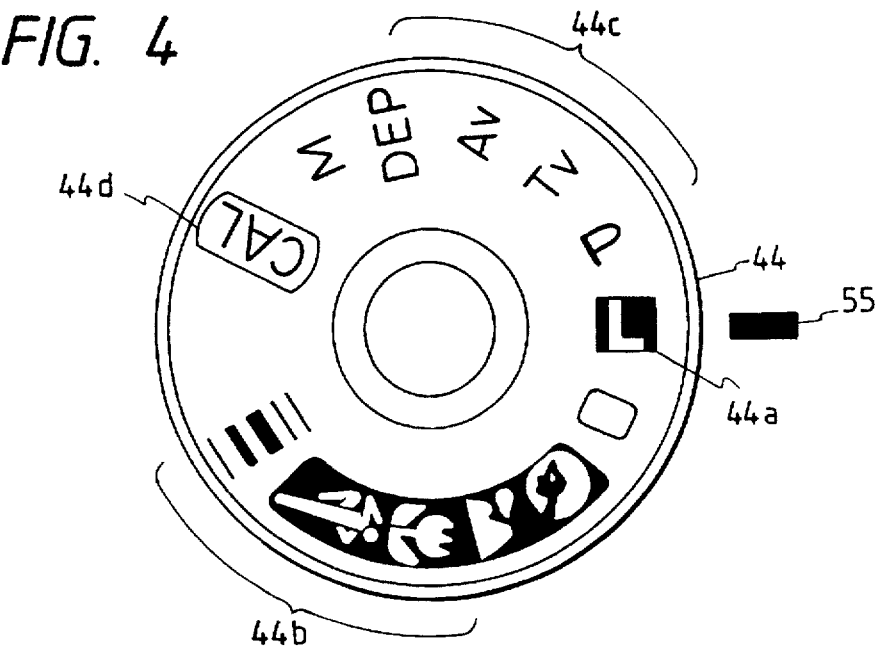
FIG. 4 is an explanatory view of a mode dial shown in FIGS. 2A and 2B.

FIG. 4 is a detailed explanatory view of the mode dial 44 shown in FIG. 2A. When each of marks on the mode dial 44 is set at the position of an index 55 printed on the camera main body, a specific photographing mode is set in correspondence with the contents of the mark. The mode dial 44 has a lock position 44a for making the camera inoperative, automatic photographing mode positions 44b at each of which the camera is controlled by a predetermined photographing program, and manual photographing mode positions 44c at each of which the photographer can set photographing contents. The manual photographing mode includes a program AE photographing mode, a shutter priority AE photographing mode, an aperture priority AE photographing mode, a field depth priority AE photographing mode, and a manual exposure photographing mode. The mode dial 44 also includes a "CAL" position 44d at which a calibration mode for executing calibration processing of a gazing point (to be described later) is selected.

Referring to FIG. 2A, an electronic dial 45 is used for selecting one of setting values available in a mode selected by the mode dial 44 by generating click pulses when it is rotated. The finder LCD 24 and the monitor LCD 42 display the presently selected shutter speed. When the photographer rotates the electronic dial 45, the shutter speed sequentially changes from the presently selected value in correspondence with the direction of rotation.

Figure 5:
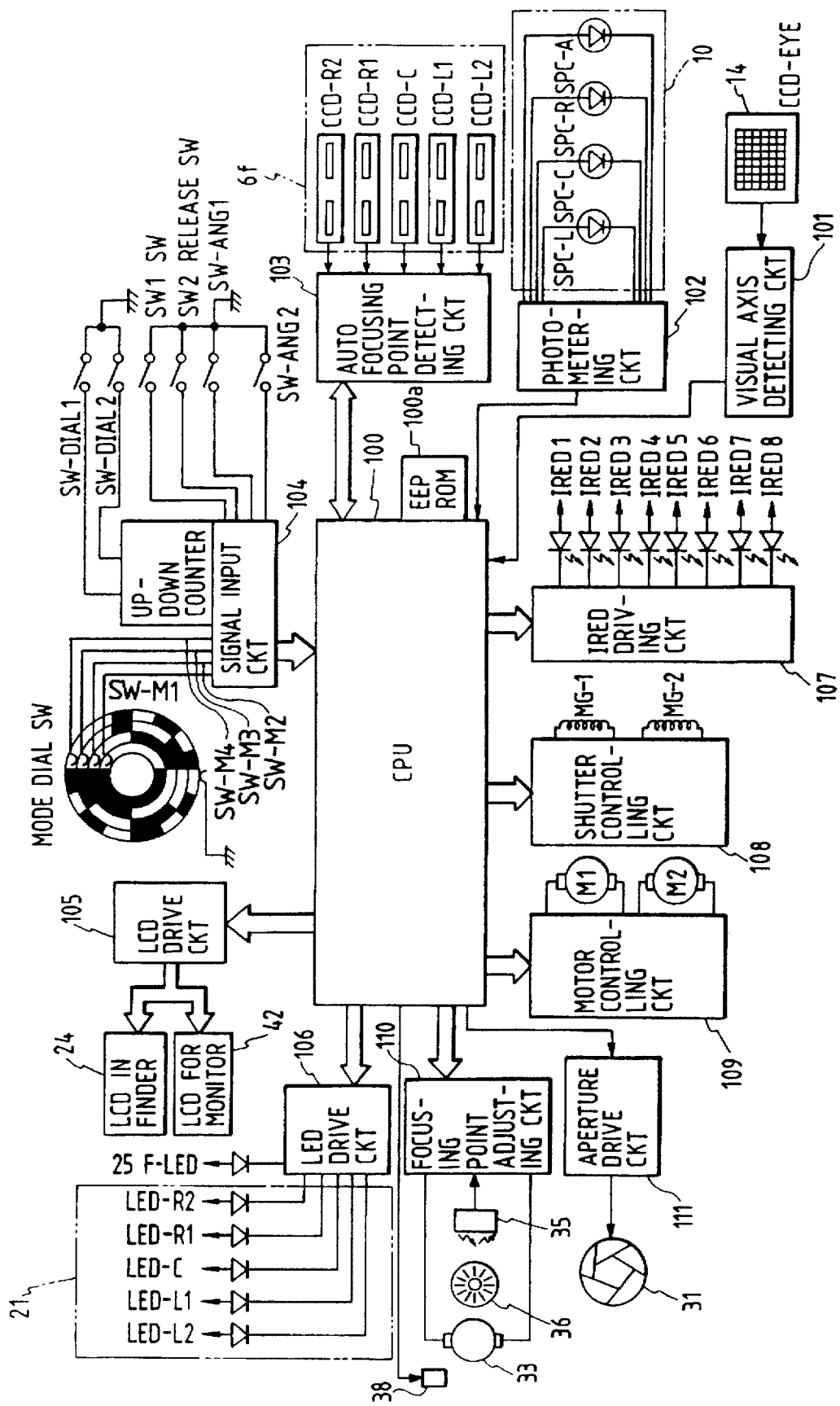
FIG. 5 is a block diagram showing a principal part of an electrical circuit according to the first embodiment of the present invention.

FIG. 5 is a block diagram showing a principal part of an electrical circuit arranged in the camera main body of the present invention. The same reference numerals in FIG. 5 denote the same parts as in FIG. 1. A central processing unit (to be referred to as a CPU hereinafter) 100 serves as camera control means arranged in the camera main body and comprises a microcomputer. The CPU 100 is connected to a visual axis detecting circuit 101, a photometering circuit 102, an auto focusing point detecting circuit 103, a signal input circuit 104, an LCD drive circuit 105, an LED drive circuit 106, an IRED driving circuit 107, a shutter controlling circuit 108, and a motor controlling circuit 109. The CPU 100 exchanges signals with the focusing point adjusting circuit 110 and an aperture drive circuit 111 arranged in the photographing lens via the mount contacts 37 shown in FIG. 1.

An EEPROM 100a as storage means included in the CPU 100 has a storage function of calibration data which are used for correcting the personal difference of the visual axis. The calibration data to be stored in the EEPROM 100a will be described in detail later. When the "CAL" position of the mode dial 44 is set at the position of the index, a calibration mode for acquiring calibration data used in correction of the personal difference of the visual axis can be selected. In this state, a calibration number corresponding to each of a plurality of calibration data, a mode for turning "OFF" the calibration operation, and a mode for forbidding a visual axis detection can be selected by the electronic dial 45.

A plurality of calibration data can be stored. Such data are effectively set when a single camera is used by a plurality of users, or in correspondence with different observation states of a single user, e.g., whether or not the user wears spectacles or whether or not the user uses an eyesight correction lens. The selected calibration number or the selected visual axis forbid mode state is stored as a calibration number (1, 2, ..., or 0) in the EEPROM 100a.

The visual axis detecting circuit 101 A/D-converts an eyeball image output from the image sensor 14 (CCD-EYE), and sends the digital image information to the CPU 100. The CPU 100 extracts the feature points of the eyeball image required for visual axis detection in accordance with a predetermined algorithm, as will be described later, and calculates the rotation angle of the eyeball of the photographer on the basis of the positions of the extracted feature points.

The photometering circuit 102 amplifies, logarithmically compresses, and A/D-converts outputs from the photometering sensor 10, and sends the digital data as the luminance information of the respective sensor portions to the CPU 100. The photometering sensor 10 is constituted by four photodiodes, i.e., a photodiode SPC-L for photometering a left region 210 including the left-side distance measuring points 200 and 201 in the finder frame shown in FIG. 3, a photodiode SPC-C for photometering a central region 211 including the central distance measuring point 202, a photodiode SPC-R for photometering a right region 212 including the right-side distance measuring points 203 and 204, and a photodiode SPC-A for photometering a region 213 surrounding these regions.

The line sensor 6f is a known line sensor constituted by the five line sensors CCD-L2, CCD-L1, CCD-C, CCD-R1, and CCD-R2 corresponding to the five distance measuring points 200 to 204 in the frame, as described above. The auto focusing point detecting circuit 103 A/D-converts voltages obtained from these sensors of the line sensor 6f, and sends digital data to the CPU 100.

A photometering switch SW-1 is turned on at the first stroke position of the release button 41 to start photometering, AF, and visual axis detection operations. A release switch SW-2 is turned on at the second stroke position of the release button. Posture detecting switches SW-ANG1 and SW-ANG2 are respectively detected by the mercury switch 27 and a mercury switch 28 (not shown). Dial switches SW-DIAL1 and SW-DIAL2 are arranged in the electronic dial 45. The outputs from these switches SW-DIAL1 and SW-DIAL2 are input to an up-down counter of the signal input circuit to count the rotation click amount of the electronic dial 45. Dial switches SW-M1 to SW-M4 are arranged in the mode dial. Signals from these switches are input to the signal input circuit 104, and are sent to the CPU 100 via a data bus.

The LCD drive circuit 105 for driving liquid crystal display elements LCD is a known one, and drives both the monitor LCD 42 and the finder LCD 24 to simultaneously display an aperture value, a shutter speed, a selected photographing mode, and the like in accordance with signals from the CPU 100.

The LED drive circuit 106 controls operation to turn on or to flicker the illuminating LED (F-LED) 25 the superimpose LEDs 21. The IRED driving circuit 107 selectively turns on the infrared light-emitting diodes (IRED1 to IRED8) 13a to 13h depending on the situation. The shutter controlling circuit 108 controls a magnet MG-1 for traveling a front curtain and a magnet MG-2 for traveling a rear curtain when it is energized, thereby exposing the photosensitive member with a predetermined amount of light.

The motor controlling circuit 109 controls a motor M1 for winding/rewinding film, and a motor M2 for charging the main mirror and the shutter 4. The shutter controlling circuit 108 and the motor controlling circuit 109 achieve the release sequence of the camera.

Control means of the camera comprises the CPU 100 and the EEPROM 100a. Of these members, the CPU 100 transmits signals to the respective functional members of the camera to control them, and receives signals from various detecting circuits to process the received signals. Posture detecting means comprises the CPU 100, the signal input circuit 104, the posture detecting switches 27 and 28, and the like. Eyeball rotation angle detecting means comprises the CPU 100, the visual axis detecting circuit 101, the IRED driving circuit 107, and the posture detecting means. Gazing point calculating means comprises the CPU 100 and the EEPROM 100a.

Gazing point calibration means comprises the CPU 100, the EEPROM 100a, the LED drive circuit 106, the posture detecting means, and the eyeball rotation angle detecting means.

Figure 6:
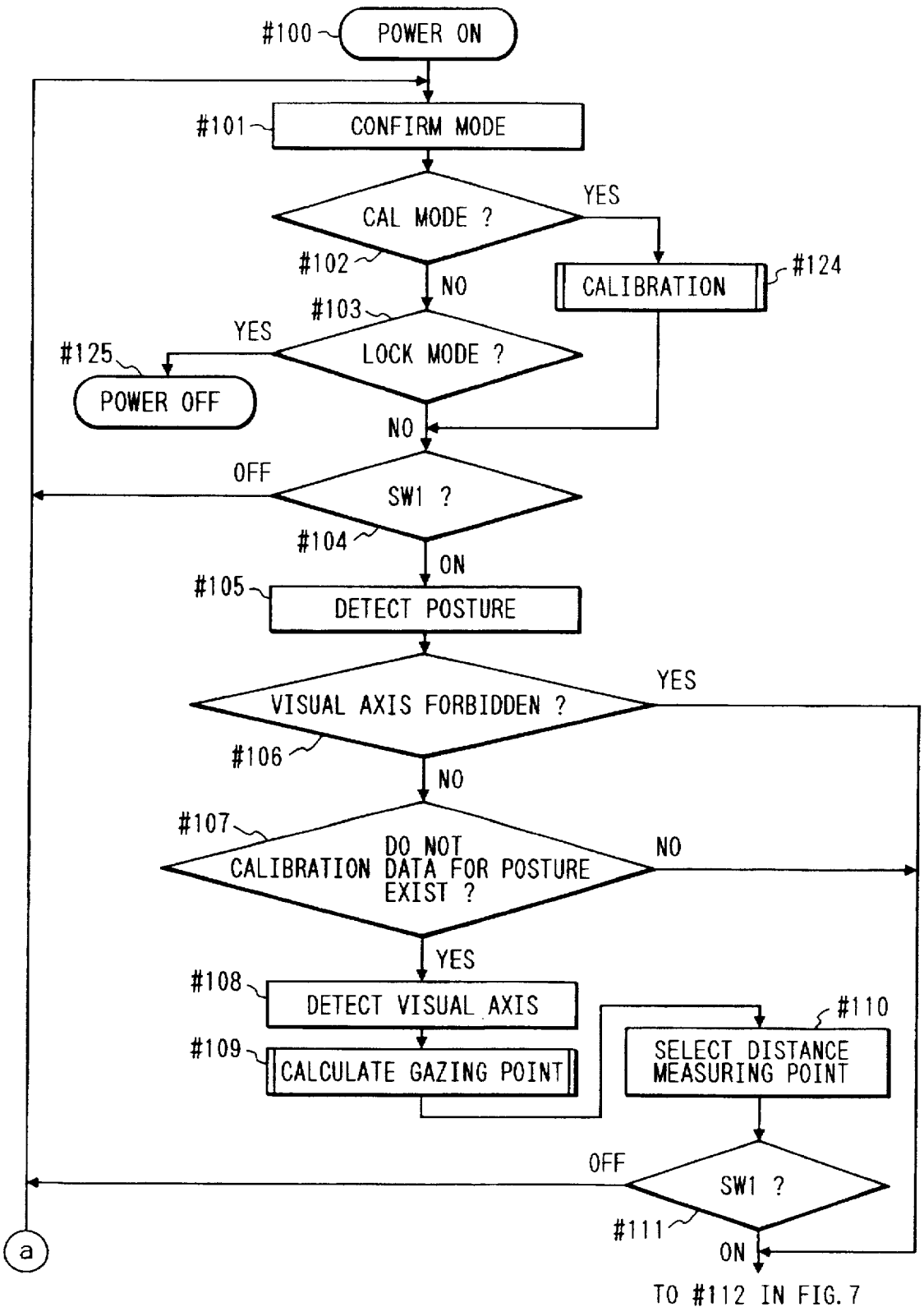
FIG. 6 is a flow chart showing the operation of the single-lens reflex camera shown in FIG. 5.
Figure 7:
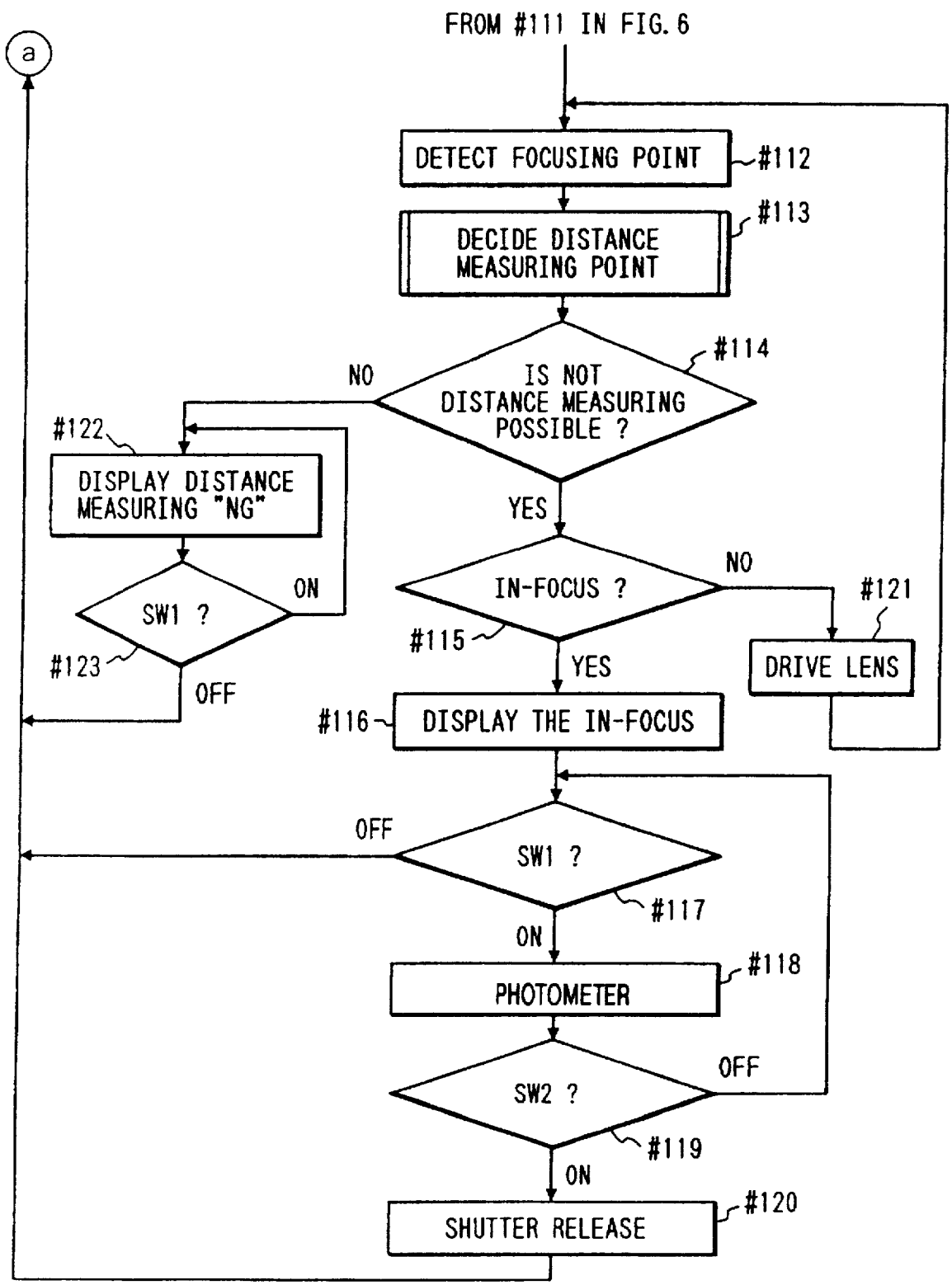
FIG. 7 is a flow chart showing the operation of the single-lens reflex camera shown in FIG. 5.

FIGS. 6 and 7 are flow charts showing the operation of the camera as the optical apparatus having the visual axis detecting device according to the present invention, and FIGS. 8A to 8F show the outer appearance states and the states of the finder view field at different postures of the camera.

The operation of this embodiment will be described below with reference to FIGS. 6 to 8F. When the camera is released from an inoperative state (lock state) and is set in a predetermined photographing mode by turning the mode dial 44, the power supply of the camera is turned on (#100). The CPU 100 confirms the selected mode position of the mode dial 44 via the signal input circuit 104 (#101). If the mode dial 44 is set in the calibration mode of a gazing point (#102), a calibration of the gazing point is executed (#124).

The gazing point calibration method will be described later. Upon completion of the calibration of the gazing point, the camera waits until the switch SW1 is turned on upon depression of the release button 41 (#104). On the other hand, if the mode dial 44 is not set in the gazing point calibration mode (#102), but is set in a power supply lock mode (#103), the power supply of the camera is turned off (#125).

On the other hand, if the mode dial 44 is set in the normal photographing mode, the camera waits until the switch SW1 is turned on upon depression of the release button 41 (#104). If the signal input circuit 104 detects that the switch SW1 is turned on upon depression of the release button 41, the posture detecting means detects the present posture of the camera (#105).

Of the CPU 100 and the signal input circuit 104 constituting the posture detecting means, the CPU 100 analyzes signals transmitted from the posture detecting switches SW-ANG1 and SW-ANG2 via the signal input circuit 104, and determines whether the posture of the camera corresponds to a horizontal or vertical posture. FIGS. 8A to 8F show the postures of the camera.

Figure 8A:
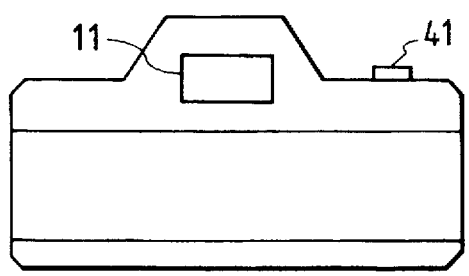
FIGS. 8A to 8F are explanatory views of the postures of the camera.
Figure 8B:
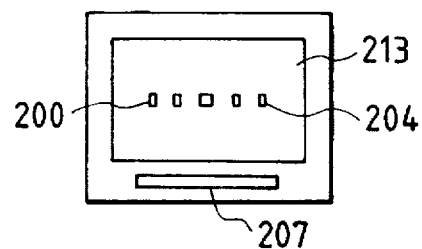
Figure 8C:
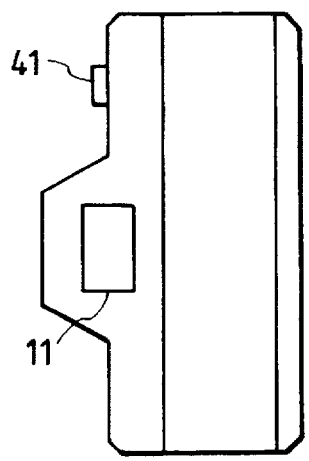
Figure 8D:
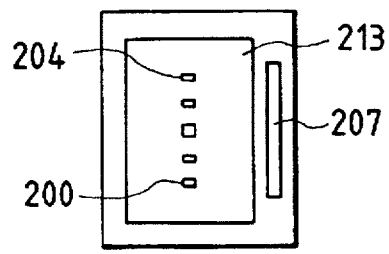

FIGS. 8A and 8B show a state wherein the camera is held at a horizontal posture. In this state, both the posture detecting switches SW-ANG1 and SW-ANG2 are ON. FIGS. 8C and 8D show a state wherein the camera is held at a first vertical posture (the release button 41 is at the upper position). In this state, the posture detecting switch SW-ANG1 is ON, and the switch SW-ANG2 is OFF.

Figure 8E:
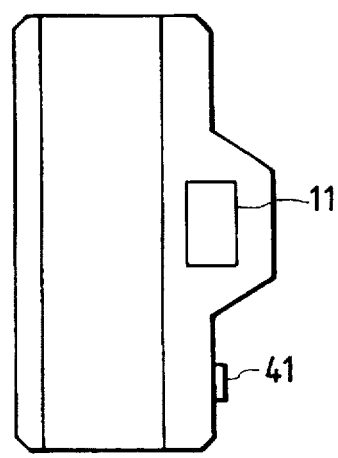
Figure 8F:
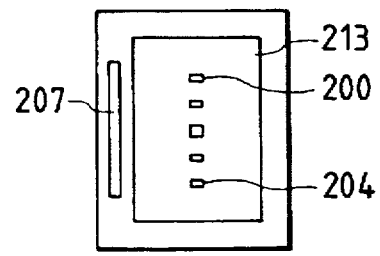

Furthermore, FIGS. 8E and 8F show a state wherein the camera is held at a second vertical posture (the release button is at the lower position). In this state, the posture detecting switch SW-ANG1 is OFF, and the switch SW-ANG2 is ON.

Furthermore, the CPU 100 confirms calibration data to be used in visual axis detection on the basis of the contents of the EEPROM 100a (#106). At this time, if the confirmed calibration data number corresponds to the visual axis forbid mode (#106), focusing point detection for the respective distance measuring points is immediately executed without performing the visual axis detecting operation (#112).

The CPU 100 confirms whether or not calibration data corresponding to the posture of the camera detected by the posture detecting means is stored on a predetermined address in the EEPROM 100a. If a calibration data number and calibration data corresponding to the posture of the camera are not stored on the predetermined address in the EEPROM 100a (#107), focusing point detection for the respective distance measuring points is immediately executed without performing the visual axis detecting operation (#112).

On the other hand, if it is confirmed that calibration data corresponding to the posture of the camera are stored on the predetermined address in the EEPROM 100a, and they are input by a photographer (#107), the CPU 100 executes visual axis detection (#108). In practice, the eyeball rotation angle detecting means detects the rotation angle of the eyeball of the photographer.

The CPU 100 selects a pair of IREDs for illuminating the eyeball of the photographer on the basis of the posture of the camera detected by the posture detecting means, and transmits a signal to the IRED driving circuit 107. At the same time, the CPU 100 sends a signal to the visual axis detecting circuit 101 to start light accumulation of the image sensor 14. Upon completion of the light accumulation for a predetermined period of time, the visual axis detecting circuit 101 A/D-converts an image output from the image sensor 14, and sends image information to the CPU 100.

The CPU 100 executes image processing of the eyeball image signal in accordance with a predetermined algorithm, thereby extracting feature points (cornea reflected images and edges of the pupil) of the eyeball image. If the coordinates of the middle point of a pair of extracted cornea reflected images are represented by (xpo, ypo), and the coordinates of the center of the pupil calculated based on the edges of the pupil are represented by (xic, yic), the rotation angle θ of the eyeball of the photographer satisfies the following formulas from formula (2):

$$\beta*OC*SIN\theta x \propto (xpo-\delta x)-xic \qquad (5)$$

$$\beta*OC*SIN\theta y \propto (ypo-\delta y)-yic \qquad (6)$$

where θx is the rotation angle in the horizontal direction with respect to the photographer, and θy is the rotation angle in the vertical direction with respect to the photographer. Also, δx and δy are correction terms for correcting the position of the middle point of the cornea reflected images.

After the rotation angles of the eyeball are calculated by the eyeball rotation angle detecting means, the gazing point calculating means calculates the gazing point in the finder on the basis of the rotation angles (θx, θy) of the eyeball. The coordinates (x, y) of the gazing point in the finder are expressed by:

$$x = m * \frac{\theta x - (cx*Rp + dx)}{ax*Rp + bx} \qquad (7)$$

$$y = m * \frac{\theta y - (cy*Rp + dy)}{ay*Rp + by} \qquad (8)$$

Note that the x-direction corresponds to the horizontal direction with respect to the photographer, and the y-direction corresponds to the vertical direction with respect to the photographer. Also, m is a conversion coefficient for converting the rotation angle of the eyeball into a coordinate on the focusing screen, and Rp is the pupil diameter. In addition, ax, bx, cx, dx, ay, by, cy, and dy are calibration coefficients, and are calculated on the basis of the calibration data stored in the EEPROM 100a. Table 1 below shows the contents of calibration data stored in the EEPROM 100a.

Data stored in the EEPROM 100a and associated with calibration include the visual axis forbid mode or calibration data numbers corresponding to the calibration numbers in addition to the calibration data shown in Table 1.

TABLE 1

| Horizontal Posture | First Vertical Posture | Second Vertical Posture |
|---|---|---|
| nh | nv1 | nv2 |
| ΣΘx1 | ΣΘxv1 | ΣΘxv2 |
| ΣRpx1*Θx1 | ΣRpxv1*Θxv1 | ΣRpxv2*Θxv2 |
| ΣRpx1 | ΣRpxv1 | ΣRpxv2 |
| ΣRpx1^2 | ΣRpxv1^2 | ΣRpxv2^2 |
| ΣΘx2 | ΣΘylv1 | ΣΘylv2 |
| ΣRpx2*Θx2 | ΣRpylv1*Θylv1 | ΣRpylv2*Θylv2 |
| ΣRpx2 | ΣRpylv1 | ΣRpylv2 |
| ΣRpx2^2 | ΣRpylv1^2 | ΣRpylv2^2 |
| ΣΘyh | ΣΘy2v1 | ΣΘy2v2 |
| ΣRpyh*Θyh | ΣRpy2v1*Θy2v1 | ΣRpy2v2*Θy2v2 |
| ΣRpyh | ΣRpy2v1 | ΣRpy2v2 |
| ΣRpyh^2 | ΣRpy2v1^2 | ΣRpy2v2^2 |

Note that "^2" represents a square.

FIG. 9 is a flow chart for explaining the gazing point calculation routine. If the CPU 100 detects the posture of the camera using the posture detecting means, and determines that the camera is in the horizontal posture state (the state shown in FIGS. 8A and 8B) (#130), it calculates calibration coefficients using the calibration data (ΣΘx1 to ΣRpyh^2) for the horizontal posture (#135). At this time, the calibration coefficients are respectively expressed by:

$$axh = \frac{m^*(Kx1 - Kx2)}{x1 - x2}$$

$$bxh = \frac{Kx1 + Kx2}{2}$$

$$cxh = \frac{m^*(Lx1 - Lx2)}{x1 - x2}$$

$$dxh = \frac{Lx1 + Lx2}{2}$$

$$ayh = 0$$

$$byh = axh^* \frac{\Sigma Rpyh}{nh} + bxh$$

$$cyh = Kyh$$

$$dyh = Lyh$$

In this case, the calibration coefficient for the rotation angle θy in the vertical direction is set to be 0, so that the sensitivity (ayh*Rp+byh) of the rotation angle θy in the vertical direction in the horizontal posture state of the camera does not depend on the pupil diameter Rp. Also, we have:

$$Kx1 = \frac{nh^*\Sigma Rpx1^*\Theta x1 - \Sigma Rpx1^*\Sigma\Theta x1}{nh^*\Sigma Rpx1^{\hat{}}2 - (\Sigma Rpx1)^{\hat{}}2}$$

$$Lx1 = \frac{\Sigma Rpx1^{\hat{}}2^*\Sigma\Theta x1 - \Sigma Rpx1^*\Sigma Rpx1^*\Theta x1}{nh^*\Sigma Rpx1^{\hat{}}2 - (\Sigma Rpx1)^{\hat{}}2}$$

$$Kx2 = \frac{nh^*\Sigma Rpx2^*\Theta x2 - \Sigma Rpx2^*\Sigma\Theta x2}{nh^*\Sigma Rpx2^{\hat{}}2 - (\Sigma Rpx2)^{\hat{}}2}$$

-continued $$Lx2 = \frac{\Sigma Rpx2^{\hat{}}2^*\Sigma\Theta x2 - \Sigma Rpx2^*\Sigma Rpx2^*\Theta x2}{nh^*\Sigma Rpx2^{\hat{}}2 - (\Sigma Rpx2)^{\hat{}}2}$$

$$Kyh = \frac{nh^*\Sigma Rpyh^*\Theta yh - \Sigma Rpyh^*\Sigma\Theta yh}{nh^*\Sigma Rpyh^{\hat{}}2 - (\Sigma Rpyh)^{\hat{}}2}$$

$$Lyh = \frac{\Sigma Rpyh^{\hat{}}2^*\Sigma\Theta yh - \Sigma Rphy^*\Sigma Rpyh^*\Theta yh}{nh^*\Sigma Rpyh^{\hat{}}2 - (\Sigma Rpyh)^{\hat{}}2}$$

where x1 and x2 are the x-coordinates of two visual indices presented in the finder in the gazing point calibration routine. From formulas (7) and (8), the coordinates of the gazing point in the finder of the photographer are:

$$x = m^* \frac{\theta x - (cxh^*Rp + dxh)}{axh^*Rp + bxh} \quad (9)$$

$$y = m^* \frac{\theta y - (cyh^*Rp + dyh)}{ayh^*Rp + byh} \quad (10)$$

On the other hand, if the CPU 100 detects the posture of the camera using the posture detecting means (#130), and determines that the camera is in the first vertical posture state (the state shown in FIGS. 8C and 8D) (#131), it calculates calibration coefficients using the calibration data (ΣΘxv1 to ΣRpy2v1^2) for the first vertical posture shown in Table 1 (#132). At this time, the calibration coefficients are respectively expressed by:

$$axv1 = 0$$

$$bxv1 = ayv1^* \frac{\Sigma Rpxv1}{nv1} + byv1$$

$$cxv1 = Kxv1$$

$$dxv1 = Lxv1$$

$$ayv1 = \frac{m^*(Ky1v1 - Ky2v1)}{y1 - y2}$$

$$byv1 = \frac{Ky1v1 + Ky2v1}{2}$$

$$cyv1 = \frac{m^*(Ly1v1 - Ly2v1)}{y1 - y2}$$

$$dyv1 = \frac{Ly1v1 + Ly2v1}{2}$$

Note that the calibration coefficient axv1 for the rotation angle θx in the horizontal direction is set to be 0, so that the sensitivity (axv1*Rp+bxv1) of the rotation angle θx in the horizontal direction in the first vertical posture state of the camera does not depend on the pupil diameter Rp. Also, we have:

$$Kxv1 = \frac{nv1^*\Sigma Rpxv1^*\Theta xv1 - \Sigma Rpxv1^*\Sigma\Theta xv1}{nv1^*\Sigma Rpxv1^{\hat{}}2 - (\Sigma Rpxv1)^{\hat{}}2}$$

$$Lxv1 = \frac{\Sigma Rpxv1^{\hat{}}2^*\Sigma\Theta xv1 - \Sigma Rpxv1^*\Sigma Rpxv1^*\Theta xv1}{nv1^*\Sigma Rpxv1^{\hat{}}2 - (\Sigma Rpxv1)^{\hat{}}2}$$

$$Ky1v1 = \frac{nv1^*\Sigma Rpy1v1^*\Theta y1v1 - \Sigma Rpy1v1^*\Sigma\Theta y1v1}{nv1^*\Sigma Rpy1v1^{\hat{}}2 - (\Sigma Rpy1v1)^{\hat{}}2}$$

$$Ly1v1 = \frac{\Sigma Rpy1v1^{\hat{}}2^*\Sigma\Theta y1v1 - \Sigma Rpy1v1^*\Sigma Rpy1v1^*\Theta y1v1}{nv1^*\Sigma Rpy1v1^{\hat{}}2 - (\Sigma Rpy1v1)^{\hat{}}2}$$

$$Ky2v1 = \frac{nv1*\Sigma Rpy2v1*\theta y2v1 - \Sigma Rpy2v1*\Sigma \theta y2v1}{nv1*\Sigma Rpy2v1\hat{\ }2 - (\Sigma Rpy2v1)\hat{\ }2}$$

$$Ly2v1 = \frac{\Sigma Rpy2v1\hat{\ }2*\Sigma \theta y2v1 - \Sigma Rpy2v1*\Sigma Rpy2v1*\theta y2v1}{nv1*\Sigma Rpy2v1\hat{\ }2 - (\Sigma Rpy2v1)\hat{\ }2}$$

where y1 and y2 are the y-coordinates of the two visual indices presented in the finder in the gazing point calibration routine. From formulas (7) and (8), the coordinates (x, y) of the gazing point in the finder of the photographer are calculated as follows (#133):

$$x = m* \frac{\theta x - (cxv1*Rp + dxv1)}{axv1*Rp + bxv1} \quad (11)$$

$$y = m* \frac{\theta y - (cyv1*Rp + dyv1)}{ayv1*Rp + byv1} \quad (12)$$

If the CPU 100 detects the posture of the camera using the posture detecting means, and determines that the camera is in the second vertical posture state (the state shown in FIGS. 8E and 8F) (#131), it calculates calibration coefficients using the calibration state ($\Sigma \theta xv2$ to $\Sigma Rpy2v2\hat{\ }2$) for the second vertical posture shown in Table 1 (#134). At this time, the calibration coefficients are respectively expressed by:

$$axv2 = 0$$

$$bxv2 = ayv2* \frac{\Sigma Rpxv2}{nv2} + byv2$$

$$cxv2 = Kxv2$$

$$dxv2 = Lxv2$$

$$ayv2 = \frac{m*(Ky1v2 - Ky2v2)}{y1 - y2}$$

$$byv2 = \frac{Ky1v2 + Ky2v2}{2}$$

$$cyv2 = \frac{m*(Ly1v2 - Ly2v2)}{y1 - y2}$$

$$dyv2 = \frac{Ly1v2 + Ly2v2}{2}$$

Note that the calibration coefficient axv2 for the rotation angle $\theta x$ in the horizontal direction is set to be 0, so that the sensitivity (axv2*Rp+bxv2) of the rotation angle $\theta x$ in the horizontal direction in the second vertical posture state of the camera does not depend on the pupil diameter Rp. Also, we have:

$$Kxv2 = \frac{nv2*\Sigma Rpxv2*\theta xv2 - Rpxv2*\Sigma \theta xv2}{nv2*\Sigma Rpxv2\hat{\ }2 - (\Sigma Rpxv2)\hat{\ }2}$$

$$Lxv2 = \frac{\Sigma Rpxv2\hat{\ }2*\Sigma \theta xv2 - \Sigma Rpxv2*\Sigma Rpxv2*\theta xv2}{nv2*\Sigma Rpxv2\hat{\ }2 - (\Sigma Rpxv2)\ 2}$$

$$Ky1v2 = \frac{nv2*\Sigma Rpy1v2*\theta y1v2 - \Sigma Rpy1v2*\Sigma \theta y1v2}{nv2*\Sigma Rpy1v2\hat{\ }2 - (\Sigma Rpy1v2)\hat{\ }2}$$

$$Ly1v2 = \frac{\Sigma Rpy1v2\hat{\ }2*\Sigma \theta y1v2 - \Sigma Rpy1v2\ \Sigma Rpy1v2*\theta y1v2}{nv2*\Sigma Rpy1v2\hat{\ }2 - (\Sigma Rpy1v2)\hat{\ }2}$$

$$Ky2v2 = \frac{nv2*\Sigma Rpy2v2*\theta y2v2 - \Sigma Rpy2v2*\Sigma \theta y2v2}{nv2*\Sigma Rpy2v2\hat{\ }2 - (\Sigma Rpy2v2)\hat{\ }2}$$

$$Ly2v2 = \frac{\Sigma Rpy2v2\hat{\ }2*\Sigma \theta y2v2 - \Sigma Rpy2v2*\Sigma Rpy2v2*\theta y2v2}{nv2*\Sigma Rpy2v2\hat{\ }2 - (\Sigma Rpy2v2)\hat{\ }2}$$

From formulas (7) and (8), the coordinates (x, y) of the gazing point in the finder of the photographer are calculated as follows (#133):

$$x = m* \frac{\theta x - (cxv2*Rp + dxv2)}{axv2*Rp + bxv2} \quad (13)$$

$$y = m* \frac{\theta y - (cyv2*Rp + dyv2)}{ayv2*Rp + byv2} \quad (14)$$

After the coordinates of the gazing point are calculated (#135), the flow returns to the main routine shown in FIGS. 6 and 7 (#136).

When the gazing point in the finder where the photographer gazes is calculated (#109), a distance measuring point to be subjected to focusing point detection is selected on the basis of the coordinates of the calculated gazing point (#110). In this case, a distance measuring point closest to the coordinates of the gazing point is selected. Furthermore, the CPU 100 displays the selected distance measuring point in the finder by flickering one of the marks 200 to 204.

When the photographer recognizes upon observation of the distance measuring point superimpose-displayed in the finder that the selected distance measuring point is different from one that he or she intended, and the photographer releases his or her hand from the release button 41 to turn off the switch SW1 (#111), the CPU 100 confirms the selected mode again (#101). If the normal photographing mode is selected, the control waits until the switch SW1 is turned on (#104).

On the other hand, when the photographer keeps the switch SW1 ON upon observation of the superimpose-displayed distance measuring point selected by his or her visual axis (#111), the auto focusing point detecting circuit 103 executes focusing point detection at the distance measuring point selected by the visual axis information (i.e., detection of the defocus amount) (#112). Upon completion of the focusing point detection (#112), a distance measuring point at which focusing point adjustment of the photographing lens 1 is to be actually performed is determined (#113).

Figure 10:
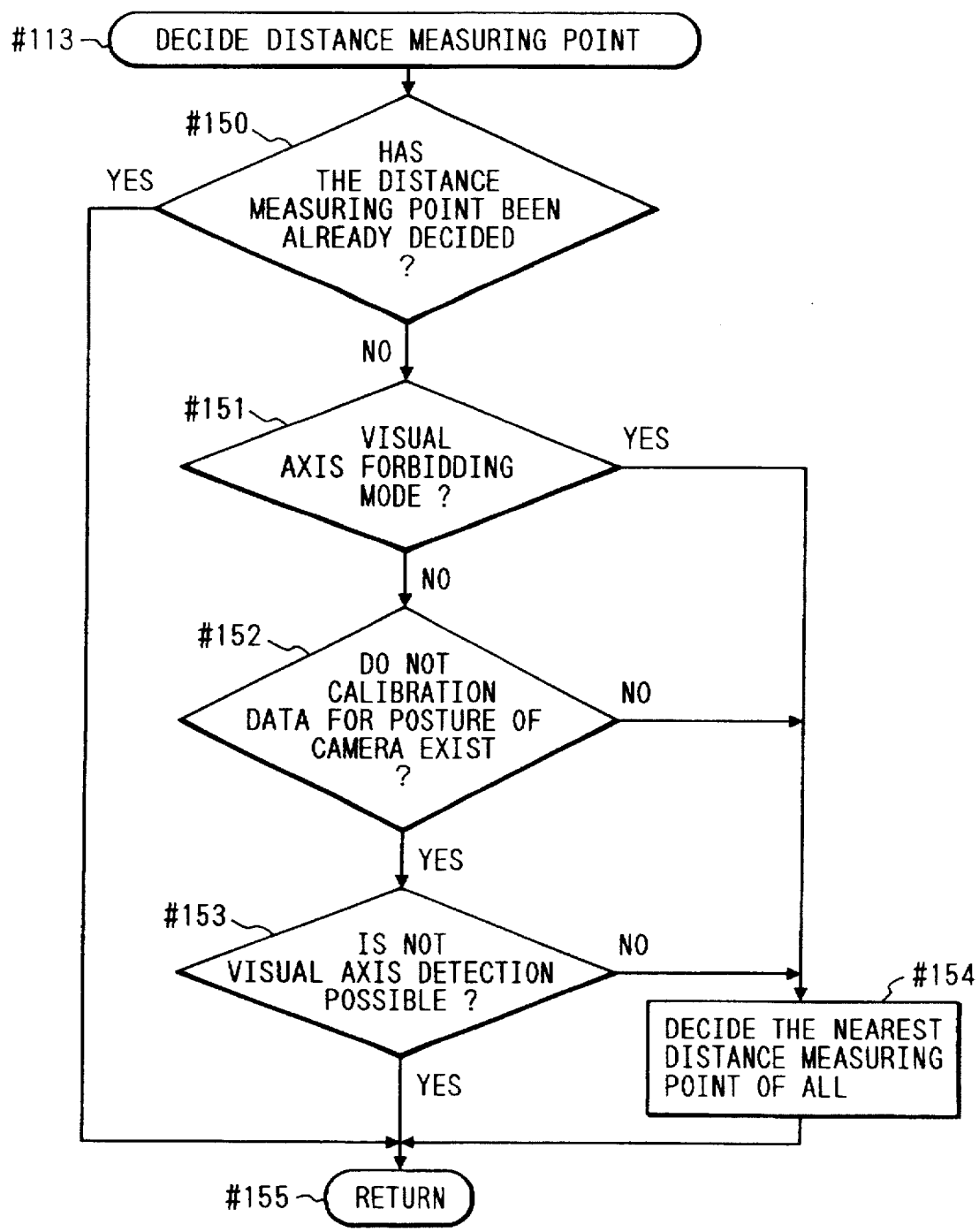
FIG. 10 is a flow chart showing a distance measuring point decision routine.

FIG. 10 is a flow chart for explaining the distance measuring point decision routine. Referring to FIG. 10, if a distance measuring point to be subjected to focusing point adjustment has already been decided (#150), the flow immediately returns to the main routine (#155).

On the other hand, if a distance measuring point to be subjected to focusing point adjustment is not decided yet (#150), the CPU 100 confirms the calibration data stored in the EEPROM 100a. At this time, if the confirmed calibration data number is set in the visual axis forbid mode (#151), a distance measuring point corresponding to the shortest object distance is decided from all the distance measuring points subjected to focusing point detection (#154).

Even when the visual axis forbid mode is not set (#151), if calibration data corresponding to the present posture of the camera is not stored on a predetermined address in the EEPROM 100a (#152), a distance measuring point corresponding to the shortest object distance is decided from all the distance measuring points subjected to focusing point detection (#154). Furthermore, when the visual axis detection is not possible although it is executed, and a distance measuring point cannot be selected based on visual axis information (#153), a distance measuring point corresponding to the shortest object distance is similarly decided from all the distance measuring points subjected to focusing point detection (#154). When a distance measuring point to be subjected to focusing point adjustment is decided (#154), the flow returns to the main routine (#155).

If the distance measuring at the distance measuring point decided based on the visual axis information is not possible (#114), the CPU 100 sends a signal to the LCD drive circuit 105 to flicker an in-focus mark 50 on the finder LCD 24, thereby displaying, for the photographer, an alarm message indicating that the distance measuring is "NG" (not possible) (#122). This alarm message is continuously displayed until the switch SW1 is released (#123).

If the decided distance measuring point can be subjected to distance measuring (#114), and the focusing point adjustment state of the photographing lens 1 corresponding to the distance measuring point is not an in-focus state (#115), the CPU 100 sends a signal to the lens focusing point adjusting circuit 110 to drive the focusing lens 1a in the photographing lens 1 by a predetermined amount (#121). After the lens is driven, the auto focusing point detecting circuit 103 performs focusing point detection at the decided distance measuring point again (#112), and it is checked if the photographing lens 1 has reached an in-focus state (#115). If the photographing lens 1 has reached an in-focus state (#115), the CPU 100 sends a signal to the LCD drive circuit 105 to turn on the in-focus mark 50 on the finder LCD 24, and also sends a signal to the LED drive circuit 106 to perform an in-focus display on the in-focus distance measuring point, i.e., one of the marks 200 to 204 (#116).

At this time, the flickering display of the distance measuring point selected by the visual axis is turned off, and the in-focus distance measuring point is turned on, so that the photographer can recognize the in-focus state. If the photographer observes the in-focus distance measuring point displayed in the finder, recognizes that the distance measuring point is not correct, and releases his or her hand from the release button 41 to turn off the switch SW1 (#117), the CPU 100 confirms the selected mode again (#101). If the normal photographing mode is selected, the control waits until the switch SW1 is turned on (#104).

On the other hand, if the photographer keeps the switch SW1 ON upon observation of the displayed in-focus distance measuring point (#117), the CPU 100 sends a signal to the photometering circuit 102 to perform photometering (#118). At this time, an exposure value is calculated by weighting the photometering regions 210 to 213 including the in-focus distance measuring point.

Furthermore, it is checked if the switch SW2 is turned on by pressing the release button 41 (#119). If the switch SW2 is OFF, the state of the switch SW1 is checked again (#117). On the other hand, if the switch SW2 is ON, the CPU 100 sends signals to the shutter controlling circuit 108, the motor controlling circuit 109, and the aperture drive circuit 111.

The motor M2 is energized to move the main mirror 2 upward, and to stop down the aperture 31. Thereafter, the magnet MG-1 is energized to open the front curtain of the shutter 4. The aperture value of the aperture 31 and the shutter speed of the shutter 4 are respectively determined on the basis of the exposure value detected by the photometering circuit 102, and the sensitivity of the film 5. After an elapse of a predetermined shutter time, the magnet MG-2 is energized to close the rear curtain of the shutter 4.

Upon completion of exposure onto the film 5, the motor M2 is energized again to move the mirror downward and to charge the shutter. In addition, the motor M1 is also energized to feed the film by one frame, thus completing a series of operations in the shutter release sequence (#120).

Upon completion of the shutter release operations of the camera (#120), the CPU 100 confirms the selected mode again (#101). If the normal photographing mode is selected, the control waits until the switch SW1 is turned on (#104).

Figure 11B:
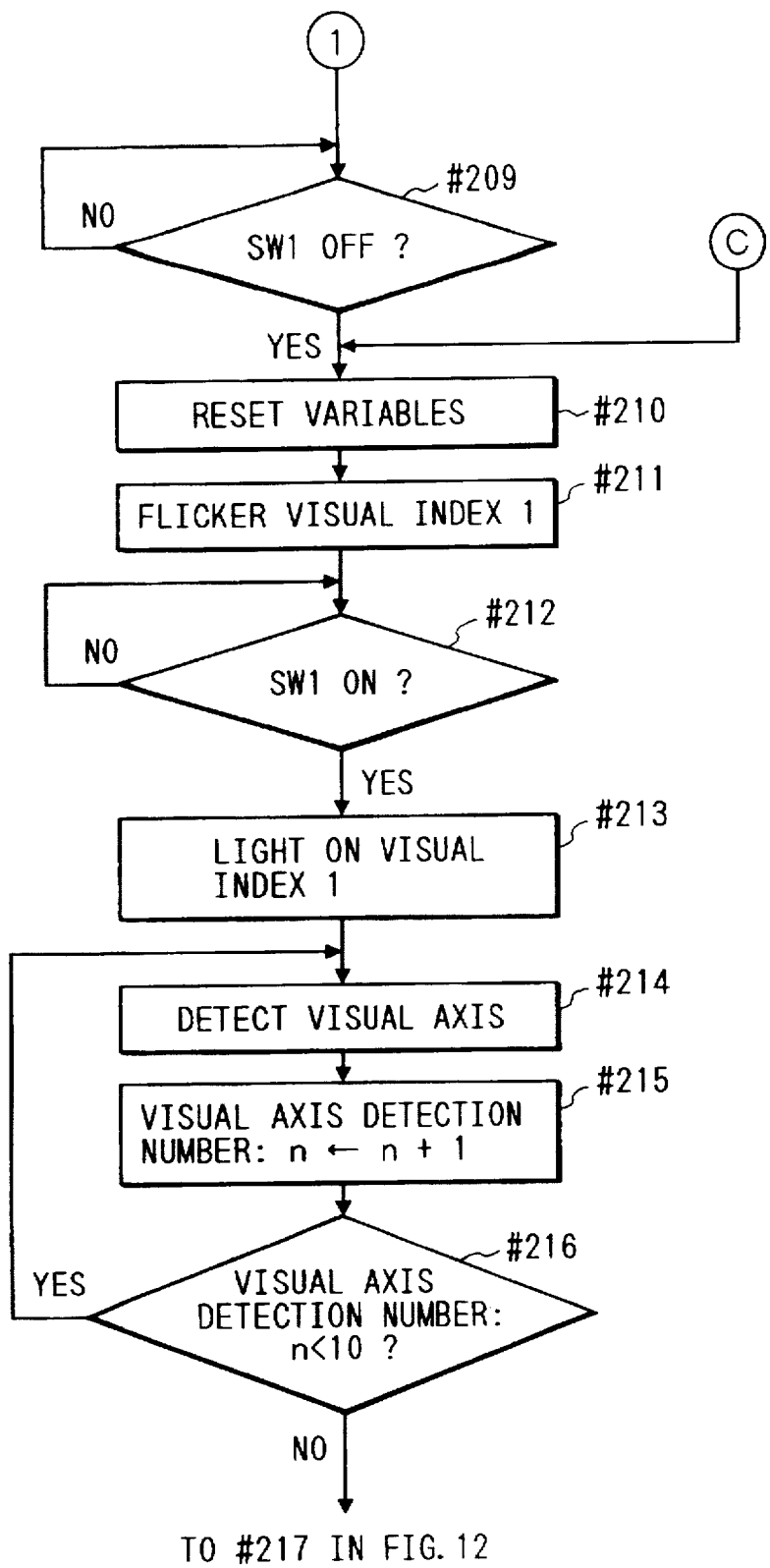
FIG. 11 is comprised of FIGS. 11A and 11B illustrating flow charts showing a calibration routine according to the present invention.
Figure 12:
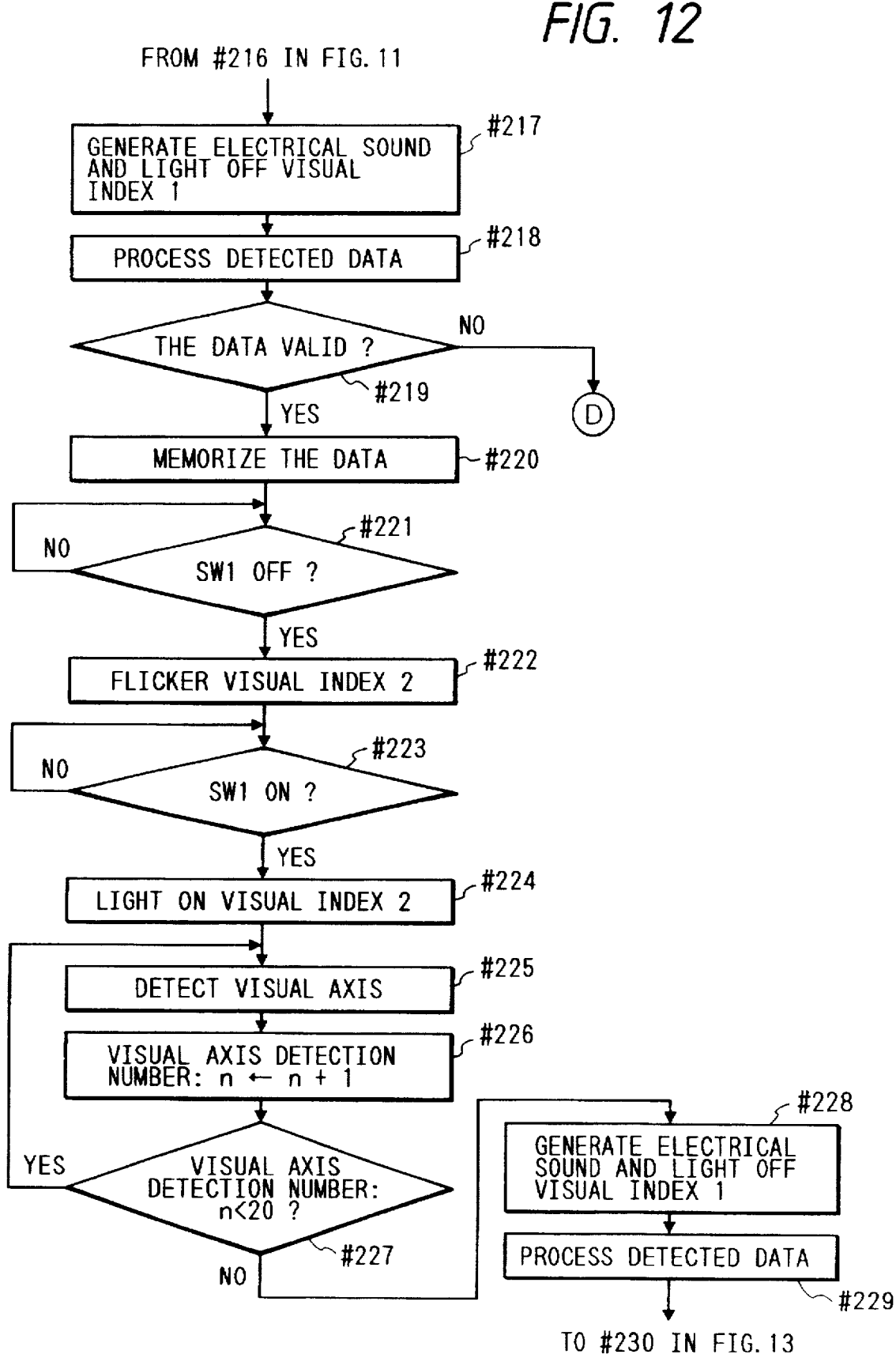
FIG. 12 is a flow chart showing the calibration routine according to the present invention.
Figure 13:
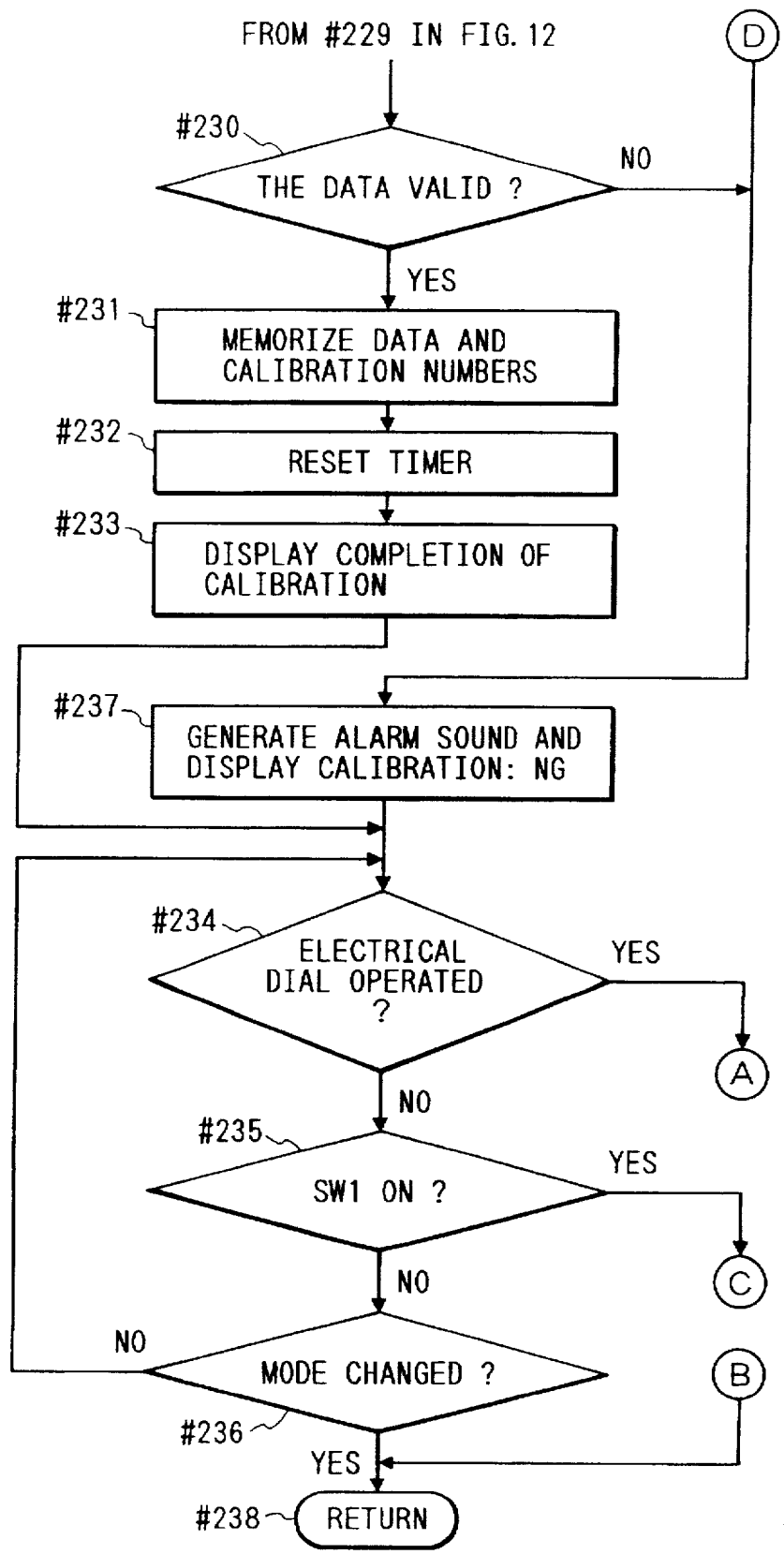
FIG. 13 is a flow chart showing the calibration routine according to the present invention.

FIGS. 11 to 13 are flow charts showing the gazing point calibration routine. The calibration routine will be described below with reference to FIGS. 11A to 13.

When the photographer turns the mode dial 44 and sets the CAL position 44d at the position of the index, the gazing point calibration mode is selected (#124). The gazing point calibration mode includes an "ON" mode in which the calibration operation is performed, and an "OFF" mode in which the calibration operation is not performed. These modes can be selected by turning the electronic dial 45.

In the "ON" mode, for example, one of five calibration numbers (CAL1 to CAL5) can be selected, and five calibration data shown in Table 1 can be stored in the EEPROM 100a at addresses corresponding to the selectable calibration numbers.

The calibration number selected at this time is stored in the EEPROM 100a as a calibration data number (1 to 5). When the "OFF" mode is selected by the electronic dial 45, the calibration data number to be stored in the EEPROM 100a is set to be, e.g., "0", i.e., the visual axis forbid mode is set.

The signal input circuit 104 supplies a signal to the LCD drive circuit 105 via the CPU 100 to cause the finder LCD 24 and the monitor LCD 42 to display that one of the calibration modes is started. The finder LCD 24 and the monitor LCD 42 perform a display in correspondence with the calibration data number. When the calibration data of the calibration number selected in the calibration "ON" mode has an initial value, the calibration number (one of CAL1 to CAL5) displayed on each of the finder LCD 24 and the monitor LCD 42 flickers.

On the other hand, when a calibration has already been performed in correspondence with the selected calibration number, and calibration data different from an initial value is stored on the address in the EEPROM 100a corresponding to the calibration number, the calibration number displayed on each of the finder LCD 24 and the monitor LCD 42 is fully turned on. As a result, the photographer can recognize whether or not the calibration data is already stored in correspondence with the presently selected calibration number.

In the "OFF" mode, "OFF" is displayed on each of the finder LCD 24 and the monitor LCD 42 using the 7-segment display portion.

Subsequently, a timer set in the CPU 100 is started to start calibration of the gazing point (#202). If the photographer does not take any action for the camera after an elapse of a predetermined period of time after the start of the timer, the CPU 100 re-sets the presently selected calibration data number to be "0", thus selecting the visual axis forbid (OFF) mode. In addition, the CPU 100 turns off the calibration displays inside and outside the finder.

When the photographer turns the electronic dial 45, the signal input circuit 104, which detects the rotation, transmits a signal to the LCD drive circuit 105 via the CPU 100. As a result, the calibration number displayed on each of the finder LCD 24 and the monitor LCD 42 changes in synchronism with the rotation of the electronic dial 45.

After the photographer selects a desired calibration number while observing the calibration number displayed on each of the finder LCD 24 and the monitor LCD 42, the CPU 100 confirms the selected calibration number (#203). The confirmed calibration number is stored on a predetermined address in the EEPROM 100a as a calibration data number.

The CPU 100 confirms a photographing mode via the signal input circuit 104 (#204). If it is confirmed that the photographer turns the mode dial 44 to select a photographing mode other than the gazing point calibration mode (#204), the CPU 100 turns off the calibration displays inside and outside the finder (#206), and the flow returns to the photographing operation of the camera as the main routine (#238).

When the mode dial 44 is switched to another photographing mode while one of the calibration numbers "CAL1 to CAL5" is displayed, the visual axis detection is performed using the calibration data of the displayed calibration number, and the above-mentioned photographing operation using the visual axis information can be performed.

On the other hand, when the CPU 100 confirms that the gazing point calibration mode is kept set (#204), the calibration data number selected by the electronic dial 45 is confirmed again (#205). At this time, if the calibration data number stored in the EEPROM 100a is set to be "0", and the visual axis forbid mode is selected (#205), the calibration number is confirmed again (#203), and the control waits until the photographing mode is changed (#204).

More specifically, when the mode dial 44 is switched in a state wherein "OFF" is displayed on each of the finder LCD 24 and the monitor LCD 42, a photographing operation is started without executing the visual axis detection.

If the calibration data number is set to be a value other than "0" (#205), detection of the posture of the camera is continued by the posture detecting means constituted by the CPU 100 and the signal input circuit 104 (#207), etc. The posture detecting means processes the output signals from the mercury switches 27 and 28 as the posture detecting switches via the signal input circuit 104, and determines if the camera is held at the horizontal posture (FIGS. 8A and 8B) or the vertical posture, and if the release button 41 is located at the upper position (FIGS. 8C and 8D) or lower position (FIGS. 8E and 8F) if the camera is held at the vertical posture.

When the posture of the camera is detected (#207), the IREDs for illuminating the eyeball 15 of the photographer are selected in correspondence with the posture of the camera (#208). In this case, the illuminating IREDs are selected to illuminate the eyeball 15 of the photographer from below.

Table 2 shows combinations of the IREDs used in correspondence with the posture of the camera. If the posture of the camera detected by the posture detecting means corresponds to the horizontal posture (FIGS. 8A and 8B), when a photographer does not wear spectacle, the IREDs 13a and 13b are selected. In this case, when the photographer wears spectacles, the IREDs 13c and 13d are selected.

On the other hand, if the posture of the camera corresponds to the first vertical posture (FIGS. 8C and 8D) at which the release button 41 is located at the upper position, the IREDs 13a and 13e are selected. The same applies to a photographer who wears spectacles. If the posture of the camera corresponds to the second vertical posture (FIGS. 8E and 8F) at which the release button 41 is located at the lower position, the IREDs 13b and 13f are selected. The same applies to a photographer who wears spectacles.

TABLE 2

|  | Naked Eye | Spectacles |
|---|---|---|
| Horizontal Posture | 13a, 13b | 13c, 13d |
| First Vertical Posture | 13a, 13e | 13a, 13e |
| Second Vertical Posture | 13b, 13f | 13b, 13f |

The gazing point calibration routine is set to be started when the switch SW1 is turned on. In order to prevent the camera side from starting a calibration of the gazing point before the photographer is ready for the calibration, the CPU 100 confirms the state of the switch SW1. If the switch SW1 is ON upon depression of the release button 41, the control waits until the switch SW1 is turned off (#209).

When the CPU 100 confirms via the signal input circuit 104 that the switch SW1 is OFF (#209), it sets a visual axis detection number n (the number of times of visual axis detection) to be 0, and resets the variables used in gazing point calculations (#210).

Furthermore, the CPU 100 sends a signal to the LED drive circuit 106 to flicker calibration visual index 1 of the gazing point (#211). The calibration visual index of the gazing point is superimpose-displayed in the finder by commonly using the distance measuring point marks 200 and 204. In addition, the first visual index, which is presented first upon execution of calibration, is selected in correspondence with the posture of the camera.

When the posture of the camera corresponds to the horizontal posture (FIGS. 8A and 8B), the calibration visual index begins to flicker from the distance measuring point mark 204 at the right end in this state. When the posture of the camera corresponds to the first vertical posture (FIGS. 8C and 8D) at which the release button 41 is located at the upper position, the calibration visual index begins to flicker from the distance measuring point mark 204 at the upper end in this state. This is because the photographer can easily move his or her visual axis from an upper position to a lower position, but it is hard for the photographer to move his or her visual axis from a lower position to an upper position. As a result, stability of the visual axis is impaired.

For this reason, in order to obtain stable visual axis information, the calibration visual index is presented from an upper position with respect to the photographer. Similarly, when the posture of the camera corresponds to the second vertical posture (FIGS. 8E and 8F) at which the release button 41 is located at the lower position, the calibration visual index begins to flicker from the distance measuring point mark 200 at the upper end with respect to the photographer.

The camera waits until an ON signal of the switch SW1 as a trigger signal for starting the calibration of the gazing point is input (#212). When the photographer gazes the visual index which begins to flicker, and depresses the release button 41 to turn on the switch SW1 (#212), the CPU 100 sends a signal to the LED drive circuit 106 to turn on calibration visual index 1 (#213).

Furthermore, the eyeball rotation angle detecting means detects the visual axis (the rotation angle of the eyeball) (#214). At this time, the rotation angles ($\theta x$, $\theta y$) of the eyeball and the pupil diameter Rp are detected. The detection methods of these values are as described above. When the rotation angles of the eyeball are detected while the photographer gazes visual index 1, the visual axis detection number n is incremented by 1 (#215).

In this embodiment, since the visual axis detection number for one visual index is set to be 10, if the visual axis detection number n is smaller than 10 (#216), visual axis detection for visual index 1 is continued (#214). On the other hand, if the visual axis detection number n has reached 10 (#216), visual axis detection for visual index 1 ends. The CPU 100 causes a sound generator (not shown) to generate several electronic sounds so that the photographer recognizes the end of visual axis detection for visual index 1. At the same time, the CPU 100 turns off visual index 1 via the LED drive circuit 106 (#217).

Furthermore, the CPU 100 performs data processing of 10 sets of detected eyeball rotation angles (θx, θy) and pupil diameters Rp (#218). In this processing, data which were detected upon movement of the visual axis against the photographer's will are excluded. The CPU 100 excludes data with large deviations from an average value of the detected data, and calculates an average value of the remaining data.

Furthermore, the CPU 100 checks if the data after the data processing are valid (#219). In this checking operation, the number of valid data and their average value in the 10 sets of detected data are compared with reference values.

For example, when the number of valid data is 5 or less, or their average value exceeds a predetermined range, it is determined that acquisition of calibration data for the first visual index is not successful (#219). In this case, the CPU 100 causes a sound generator (not shown) to generate an electronic sound for a predetermined period of time, and sends a signal to the LCD drive circuit 105 to flicker a "CAL" display on each of the finder LCD 24 and the monitor LCD 42, thus generating an alarm to the photographer (#237).

On the other hand, when the number of valid data is larger than 5, and their average value falls within a predetermined range, it is determined that data after the data processing are valid (#219), and the CPU 100 stores the processed data on predetermined addresses in the EEPROM 100a (#220).

The calibration data to be stored in the EEPROM 100a include the average value of the rotation angles of the eyeball, the average value of the pupil diameters, and the product of these average values. The calibration data are not updated in each calibration, but are added to already stored values (see Table 1).

For example, when the posture of the camera upon calibration of the gazing point corresponds to the horizontal posture (FIGS. 8A and 8B), if the rotation angles of the eyeball after the data processing are represented by (θx1, θy1), and the pupil diameter after the data processing is represented by Rpx1, (θx1, Rpx1*θx1, Rpx1, Rpx1^2) are added to stored values on addresses corresponding to these data. At this time, data of the rotation angle θy1 in the vertical direction is processed after calibration of the gazing point for the second visual index, and the processed data is stored, as will be described later.

On the other hand, when the posture of the camera upon calibration of the gazing point corresponds to the first vertical posture (FIGS. 8C and 8D), if the rotation angles of the eyeball after the data processing are represented by (θx1v1, θy1v1), and the pupil diameter after the data processing is represented by Rpy1v1, (θy1v1, Rpy1v1*θy1v1, Rpy1v1, Rpy1v1^2) are added to stored values on addresses corresponding to these data. At this time, the rotation angle θx1v1 in the horizontal direction is processed after calibration of the gazing point for the second visual index, and the processed data is stored, as will be described later.

Similarly, when the posture of the camera upon calibration of the gazing point corresponds to the second vertical posture (FIGS. 8E and 8F), if the rotation angles of the eyeball after the data processing are represented by (θx1v2, θy1v2), and the pupil diameter after the data processing is represented by Rpy1v2, (θy1v2, Rpy1v2*θy1v2, Rpy1v2, Rpy1v2^2) are added to stored values on addresses corresponding to these data. At this time, the rotation angle θx1v2 in the horizontal direction is processed after calibration of the gazing point for the second visual index, and the processed data is stored, as will be described later.

After the calibration data of the gazing point corresponding to the first visual index are memorized (#220), the CPU 100 confirms the state of the switch SW1. If the switch SW1 is ON upon depression of the release button 41, the CPU 100 waits until the switch SW1 is turned off (#221).

When the CPU 100 confirms via the signal input circuit 104 that the switch SW1 is OFF (#221), it sends a signal to the LED drive circuit 106 to flicker gazing point calibration visual index 2 (#222). In this case, the gazing point calibration visual index is displayed using the marks 200 or 204 which also serve as distance measuring point marks, and are not used for the first visual index.

For example, when the posture of the camera corresponds to the horizontal posture (FIGS. 8A and 8B), the calibration visual index begins to flicker from the distance measuring mark 200 at the left end in this case. On the other hand, when the posture of the camera corresponds to the first vertical posture (FIGS. 8C and 8D) at which the release button 41 is located at the upper position, the calibration visual index begins to flicker from the distance measuring point 200 at the lower end with respect to the photographer.

Similarly, when the posture of the camera corresponds to the second vertical posture (FIGS. 8E and 8F) at which the release button 41 is located at the lower position, the calibration visual index begins to flicker from the distance measuring point 204 at the lower end with respect to the photographer.

Furthermore, the CPU 100 confirms via the signal input circuit 104 if an ON signal of the switch SW1 as a trigger signal for starting calibration of the gazing point corresponding to the second visual index is received (#223). If an ON signal of the switch SW1 is not received, the camera waits (#223). If the photographer gazes the visual index which begins to flicker, and depresses the release button 41 to turn on the switch SW1 (#223), the CPU 100 sends a signal to the LED drive circuit 106 to turn on calibration visual index 2 (#224).

Moreover, the eyeball rotation angle detecting means detects the visual axis (the rotation angle of the eyeball) (#225). At this time, the rotation angles (θx, θy) of the eyeball and the pupil diameter Rp are detected. When the rotation angles of the eyeball are detected while the photographer gazes visual index 2, the visual axis detection number n is incremented by 1 (#226).

In this embodiment, since the visual axis detection number for one visual index is set to be 10, if the visual axis detection number n is smaller than 20 (#227), visual axis detection for visual index 2 is continued (#225). On the other hand, if the visual axis detection number n has reached 20 (#227), visual axis detection for visual index 2 ends. The CPU 100 causes a sound generator (not shown) to generate several electronic sounds so that the photographer recognizes the end of visual axis detection for visual index 2. At the same time, the CPU 100 turns off visual index 2 via the LED drive circuit 106 (#228).

The CPU 100 performs data processing of 10 sets of detected eyeball rotation angles (θx, θy) and pupil diameters Rp (#229). The CPU 100 excludes data with large deviations from an average value of the detected data, and calculates an average value of the remaining data. The CPU 100 then checks if the data after the data processing are valid (#230). In this checking operation, the number of valid data and their average value in the 10 sets of detected data are compared with reference values.

For example, when the number of valid data is 5 or less, or their average value exceeds a predetermined range, it is determined that acquisition of calibration data for visual index 2 is not successful (#230). In this case, the CPU 100 causes a sound generator (not shown) to generate an electronic sound for a predetermined period of time, and sends a signal to the LCD drive circuit 105 to flicker a "CAL" display on each of the finder LCD 24 and the monitor LCD 42, thus generating an alarm to the photographer (#237).

On the other hand, when the number of valid data is larger than 5, and their average value falls within a predetermined range, it is determined that data after the data processing are valid (#230), and the CPU 100 stores the processed data and calibration numbers on predetermined addresses in the EEPROM 100a (#231).

For example, when the posture of the camera upon calibration of the gazing point corresponds to the horizontal posture (FIGS. 8A and 8B), if the rotation angles of the eyeball after the data processing are represented by ($\theta x2$, $\theta y2$), and the pupil diameter after the data processing is represented by $Rpx2$, ($\theta x2$, $Rpx2 * \theta x2$, $Rpx2$, $Rpx2^{\wedge}2$) are added to stored values on addresses corresponding to these data. The data $\theta yh$ and $Rpyh$ for the rotation in the vertical direction are calculated by:

$$\theta yh = \frac{\theta y1 + \theta y2}{2}$$

$$Rpyh = \frac{Rpx1 + Rpx2}{2}$$

The calculated values are added as calibration data ($\theta yh$, $Rpyh * \theta yh$, $Rpyh$, $Rpyh^{\wedge}2$) to stored values on addresses corresponding to these data.

On the other hand, when the posture of the camera upon calibration of the gazing point corresponds to the first vertical posture (FIGS. 8C and 8D), if the rotation angles of the eyeball after the data processing are represented by ($\theta x2v1$, $\theta y2v1$), and the pupil diameter after the data processing is represented by $Rpx2v1$, ($\theta y2v1$, $Rpy2v1 * \theta y2v1$, $Rpy2v1$, $Rpy2v1^{\wedge}2$) are added to stored values on addresses corresponding to these data. The data $\theta xv1$ and $Rpxv1$ for the rotation in the horizontal direction are calculated by:

$$\theta xv1 = \frac{\theta x1v1 + \theta x2v1}{2}$$

$$Rpxv1 = \frac{Rpy1v1 + Rpy2v1}{2}$$

The calculated values are added as calibration data ($\theta xv1$, $Rpxv1 * \theta xv1$, $Rpxv1$, $Rpxv1^{\wedge}2$) to stored values on addresses corresponding to these data.

Similarly, when the posture of the camera upon calibration of the gazing point corresponds to the second vertical posture (FIGS. 8E and 8F), if the rotation angles of the eyeball after the data processing are represented by ($\theta x2v2$, $\theta y2v2$), and the pupil diameter after the data processing is represented by $Rpx2v2$, ($\theta y2v2$, $Rpy2v2 * \theta y2v2$, $Rpy2v2$, $Rpy2v2^{\wedge}2$) are added to stored values on addresses corresponding to these data. The data $\theta xv2$ and $Rpxv2$ for the rotation in the horizontal direction are calculated by:

$$\theta xv2 = \frac{\theta x1v2 + \theta x2v2}{2}$$

$$Rpxv2 = \frac{Rpy1v2 + Rpy2v2}{2}$$

The calculated values are added as calibration data ($\theta xv2$, $Rpxv2 * \theta xv2$, $Rpxv2$, $Rpxv2^{\wedge}2$) to stored values on addresses corresponding to these data.

After the calibration data and the calibration number for the second visual index are memorized (#231), the CPU 100 resets the timer (#232), and makes a display indicating completion of calibration of the gazing point via the LCD drive circuit 105 and the LED drive circuit 106 (#233). The LED drive circuit 106 energizes the superimposed LEDs 21 to flicker visual indices 1 and 2 several times, and the LCD drive circuit 105 supplies signals to the LCDs 24 and 42 to display "END" for a predetermined period of time.

After a series of calibration operations of the gazing point, the camera waits until the photographer operates the electronic dial 45 or the mode dial 44. When the photographer turns the electronic dial 45 to select another calibration number, the CPU 100 detects a change in calibration number via the signal input circuit 104 (#234), and the control advances to the initialization step (#201) of the gazing point calibration routine.

When the photographer turns on the switch SW1 to continuously perform calibration of the gazing point, the CPU 100 detects an ON signal of the switch SW1 via the signal input circuit 104 (#235), and the control advances to the start step (#210) of the gazing point calibration routine.

When the photographer selects another photographing mode by turning the mode dial 44, the CPU 100 detects a change in photographing mode via the signal input circuit 104 (#236), and the control returns to the main routine (#238).

Figure 14:
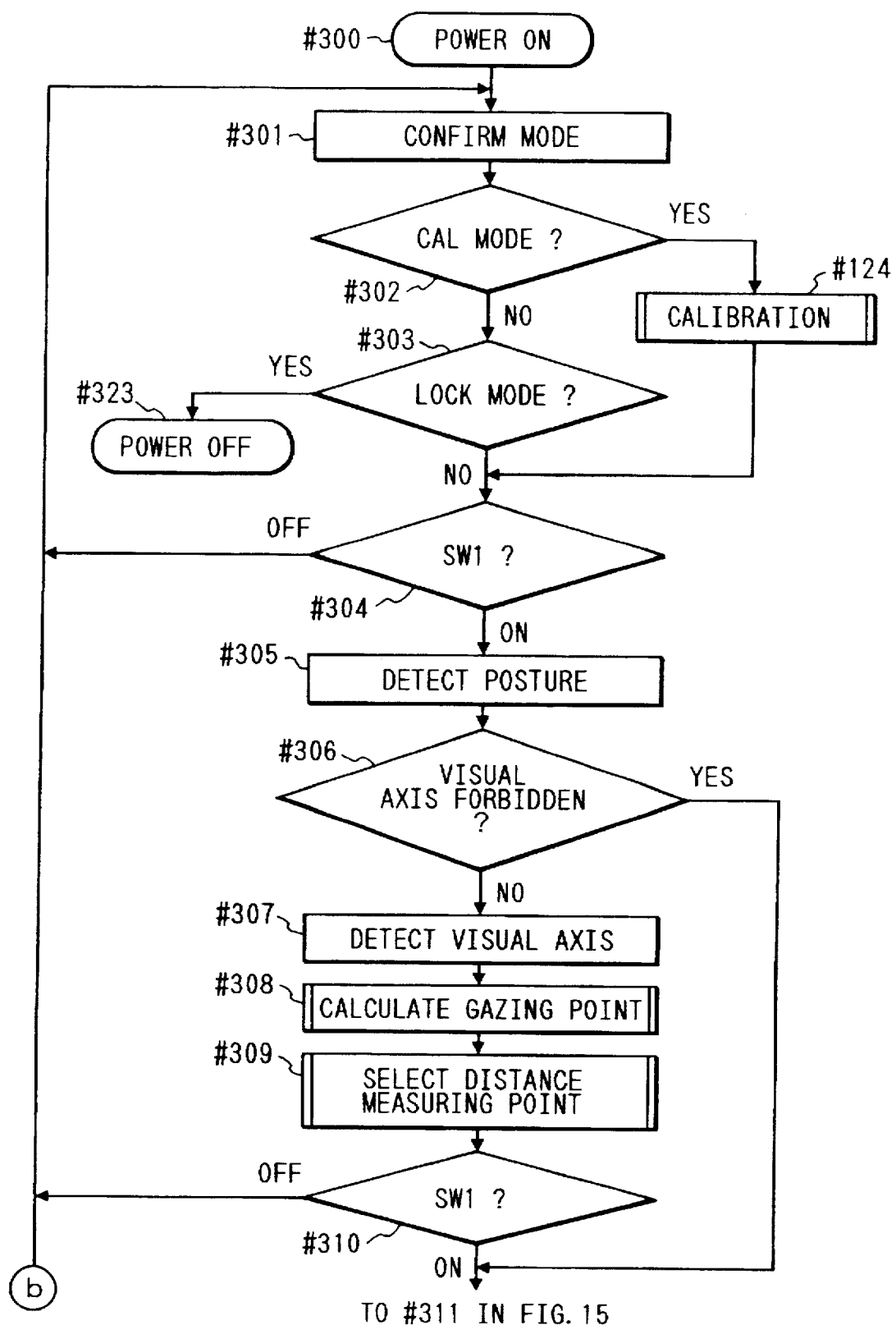
FIG. 14 is a flow chart showing the operation of a camera according to the second embodiment of the present invention.
Figure 15:
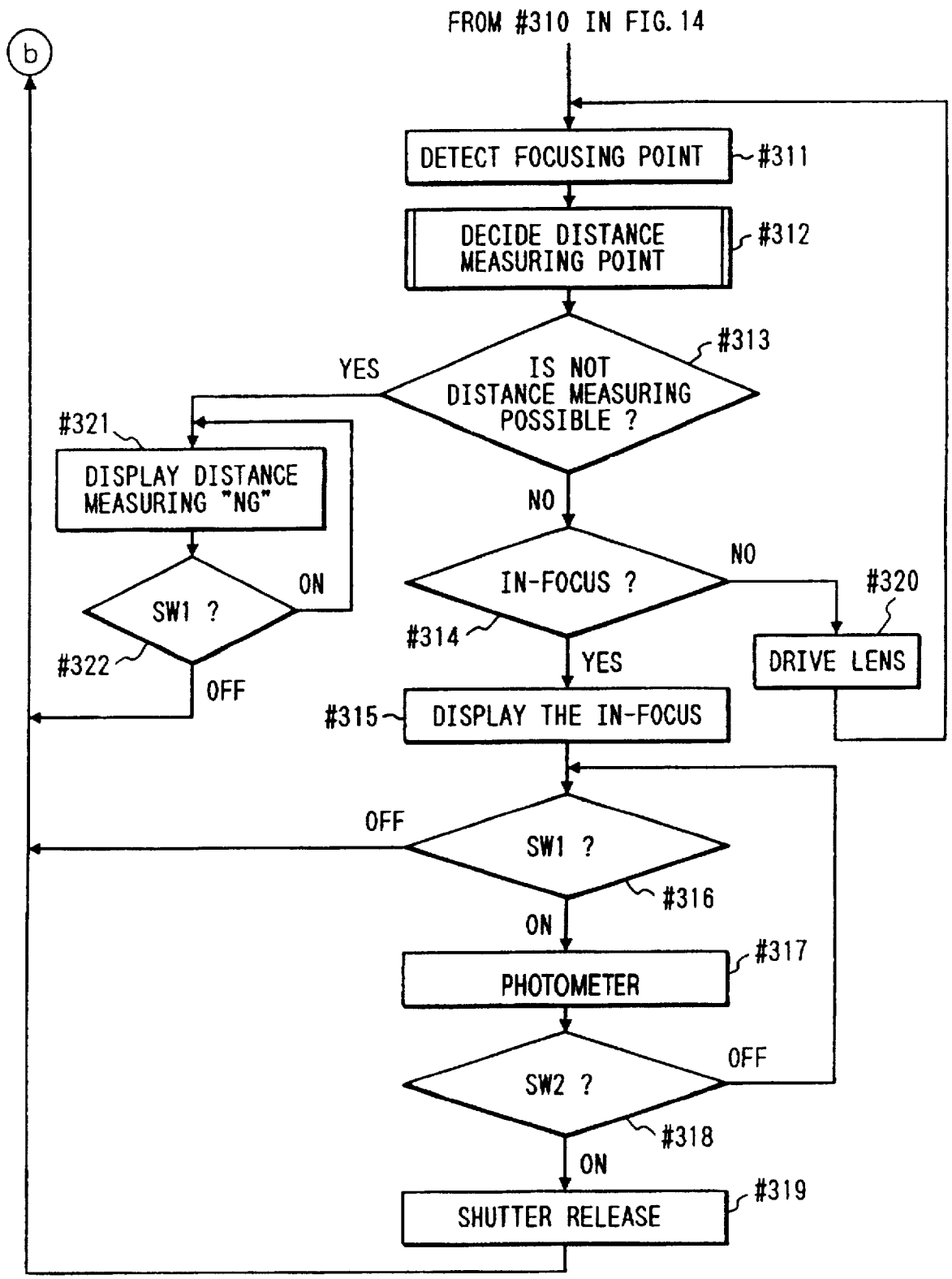
FIG. 15 is a flow chart showing the operation of the camera according to the second embodiment of the present invention.

FIGS. 14 to 18 are flow charts according to the second embodiment of the present invention. Of these figures, FIGS. 14 and 15 are flow charts showing the operation of a camera with a visual axis detecting device. Since the camera of this embodiment has the same arrangement as that of the camera shown in FIGS. 1 to 5, only the operation of the camera will be explained below with reference to FIGS. 14 to 18.

When the camera is released from an inoperative state (lock state) and is set in a predetermined photographing mode by turning the mode dial 44, the power supply of the camera is turned on (#300). The CPU 100 confirms the selected mode position of the mode dial 44 via the signal input circuit 104 (#301). If the mode dial 44 is set in the calibration mode of a gazing point (#302), a calibration of the gazing point is executed (#124). The calibration method of the gazing point is as described above. Upon completion of the calibration of the gazing point, the camera waits until the switch SW1 is turned on upon depression of the release button 41 (#304).

On the other hand, if the mode dial 44 is not set in the gazing point calibration mode (#302), but is set in a power supply lock mode (#303), the power supply of the camera is turned off (#323).

On the other hand, if the mode dial 44 is set in a normal photographing mode, the camera waits until the switch SW1 is turned on upon depression of the release button 41 (#304). If the signal input circuit 104 detects that the switch SW1 is turned on upon depression of the release button 41, the posture detecting means detects the present posture of the camera (#305).

The posture detecting means comprises the CPU 100 and the signal input circuit 104, and of these members, the CPU 100 analyzes signals transmitted from the posture detecting switches SW-ANG1 and SW-ANG2 via the signal input circuit 104, and determines whether the posture of the camera corresponds to a horizontal or vertical posture.

Furthermore, the CPU 100 confirms calibration data to be used in visual axis detection on the basis of the contents of the EEPROM 100a (#306). The data stored in the EEPROM 100a and associated with calibration are as described above. At this time, if the confirmed calibration data number corresponds to the visual axis forbid mode (#306), focusing point detection for the respective distance measuring points is immediately executed without performing the visual axis detecting operation (#311).

On the other hand, if it is confirmed that calibration data corresponding to the calibration number data are set to be predetermined values, and they are input by a photographer, the CPU 100 executes visual axis detection (#307). In practice, the eyeball rotation angle detecting means detects the rotation angle of the eyeball of the photographer. The eyeball rotation angle detecting means comprises the CPU 100, the visual axis detecting circuit 101, the IRED driving circuit 107, and the posture detecting means. The rotation angles ($\theta x$, $\theta y$) of the eyeball of the photographer are calculated using formulas (5) and (6) above (#307).

After the rotation angles of the eyeball are calculated by the eyeball rotation angle detecting means, the gazing point calculating means calculates a gazing point in the finder on the basis of the rotation angles ($\theta x$, $\theta y$) of the eyeball (#308). The gazing point calculating means comprises the CPU 100 and the EEPROM 100a. The coordinates (x, y) of the gazing point in the finder are calculated using formulas (7) and (8) above.

In this embodiment, data stored in the EEPROM 100a and associated with calibration are the same as the calibration data and the calibration data numbers shown in Table 1 above.

Figure 16:
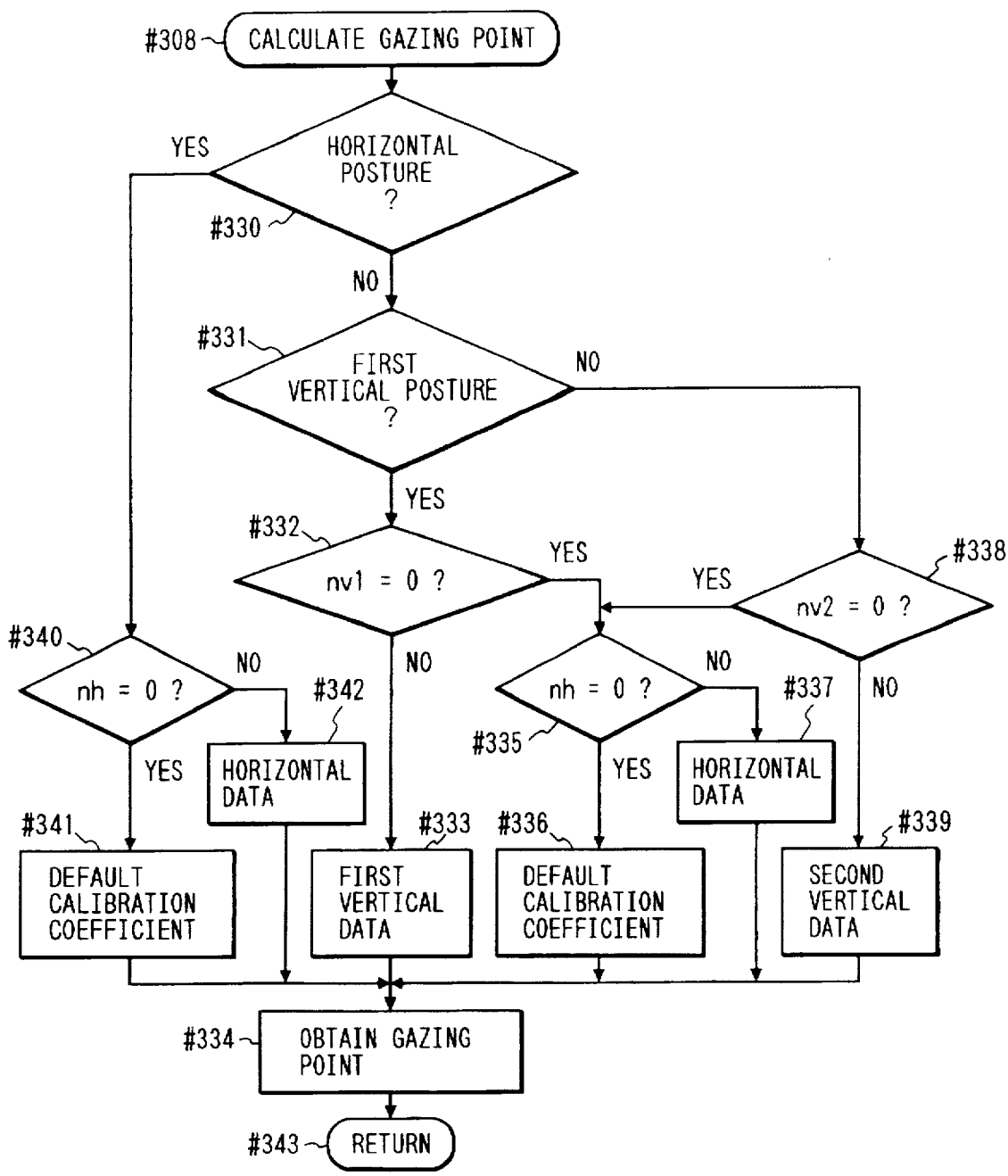
FIG. 16 is a flow chart showing a gazing point calculation routine according to the second embodiment of the present invention.

FIG. 16 is a flow chart showing the gazing point calculation routine. If the CPU 100 detects the posture of the camera using the posture detecting means, and determines that the camera is in the horizontal posture state (the state shown in FIGS. 8A and 8B) (#330), it confirms a calibration number nh stored in the EEPROM 100a.

If a calibration has been performed in the horizontal posture state (#340), calibration coefficients are calculated using calibration data ($\Sigma\theta x1$ to $\Sigma Rpyh^2$) for the horizontal posture (#342). At this time, the calibration coefficients are expressed by:

$$axh = \frac{m^*(Kx1 - Kx2)}{x1 - x2}$$

$$bxh = \frac{Kx1 + Kx2}{2}$$

$$cxh = \frac{m^*(Lx1 - Lx2)}{x1 - x2}$$

$$dxh = \frac{Lx1 + Lx2}{2}$$

$$ayh = 0$$

$$byh = axh^* \frac{\Sigma Rpyh}{nh} + bxh$$

$$cyh = Kyh$$

$$dyh = Lyh$$

Note that Kx1, Lx1, Kx2, Lx2, Kyh, and Lyh are as described above. x1 and x2 are the x-coordinates of two visual indices presented in the finder in the gazing point calibration routine. The coordinates (x, y) of the gazing point in the finder of the photographer are calculated using formulas (9) and (10) above (#334).

On the other hand, if a calibration of the gazing point is not performed yet in the horizontal posture state (#340), default calibration coefficients are used (#341). The calibration coefficients at that time are:

axh=0
bxh=1
cxh=0
dxh=0
ayh=0
byh=1
cyh=0
dyh=0

The coordinates of the gazing point in the finder are calculated by substituting the above calibration coefficients into formulas (9) and (10) (#334).

On the other hand, if the CPU 100 detects the posture of the camera using the posture detecting means (#330), and determines that the camera is in the first vertical posture state (the state shown in FIGS. 8C and 8D) (#331), it confirms a calibration number nv1 stored in the EEPROM 100a. If the calibration has been made in the first vertical posture state (#332), calibration coefficients are calculated using calibration data ($\Sigma\theta xv1$ to $\Sigma Rpy2v1^2$) for the first vertical posture shown in Table 1 above (#332). At this time, the calibration coefficients are expressed by:

$$axv1 = \frac{m^*(Kx1 - Kx2)}{x1 - x2}$$

$$bxv1 = \frac{Kx1 + Kx2}{2}$$

$$cxv1 = Kxv1$$

$$dxv1 = Lxv1$$

$$ayv1 = \frac{m^*(Ky1v1 - Ky2v1)}{y1 - y2}$$

$$byv1 = \frac{Ky1v1 + Ky2v1}{2}$$

$$cyv1 = \frac{m^*(Ly1v1 - Ly2v1)}{y1 - y2}$$

$$dyv1 = \frac{Ly1v1 + Ly2v1}{2}$$

In this case, the calibration coefficients axv1 and bxv1 for the rotation angle in the horizontal direction are set to be equal to the calibration coefficients axh and bxh for the rotation angle in the horizontal direction in the horizontal posture state of the camera. Note that Kxv1, Lxv1, Ky1v1, Ly1v1, Ky2v1, and Ly2v1 are as described above. Furthermore, y1 and y2 are the y-coordinates of the two visual indices presented in the finder in the gazing point calibration routine. The coordinates (x, y) of the gazing point in the finder of the photographer are calculated using formulas (11) and (12) above (#334).

On the other hand, if the calibration of the gazing point in the first vertical posture state is not performed yet (#332), it is checked if a calibration of the gazing point in the horizontal posture state has been made (#335). If a calibration of the gazing point is not performed yet when the posture of the camera corresponds to the horizontal posture state, default calibration coefficients are used (#336). The calibration coefficients at that time are:

axv1=0
bxv1=1
cxv1=0
dxv1=0
ayv1=0
byv1=1
cyv1=0
dyv1=0

The coordinates of the gazing point in the finder are calculated by substituting the above-mentioned calibration coefficients into formulas (11) and (12) above (#334).

On the other hand, if a calibration of the gazing point has been made when the posture of the camera corresponds to the horizontal posture state (#335), the calibration coefficients are expressed as follows using the calibration data for the horizontal posture state (#337):

$$axv1 = \frac{m*(Kx1 - Kx2)}{x1 - x2}$$

$$bxv1 = \frac{Kx1 + Kx2}{2}$$

$$cxv1 = \frac{m*(Lx1 - Lx2)}{x1 - x2}$$

$$dxv1 = \frac{Lx1 + Lx2}{2}$$

$$ayv1 = 0$$

$$byv1 = axv1 * \frac{\Sigma Rpyh}{nh} + bxv1$$

$$cyv1 = Kyh$$

$$dyv1 = Lyh$$

The coordinates of the gazing point in the finder are calculated by substituting the above calibration coefficients into formulas (11) and (12) (#334). On the other hand, if the CPU 100 detects the posture of the camera using the posture detecting means and determines that the camera is in the second vertical posture state (FIGS. 8E and 8F) (#331), it checks a calibration number nv2 stored in the EEPROM 100a.

If a calibration in the second vertical posture has been made (#338), calibration coefficients are calculated using calibration data ($\Sigma\theta xv2$ to $\Sigma Rpy2v2^2$) for the second vertical posture shown in Table 1 above (#339). At this time, the calibration coefficients are expressed by:

$$axv2 = \frac{m*(Kx1 - Kx2)}{x1 - x2}$$

$$bxv2 = \frac{Kx1 + Kx2}{2}$$

$$cxv2 = Kxv2$$

$$dxv2 = Lxv2$$

$$ayv2 = \frac{m*(Ky1v2 - Ky2v2)}{y1 - y2}$$

$$byv2 = \frac{Ky1v2 + Ky2v2}{2}$$

$$cyv2 = \frac{m*(Ly1v2 - Ly2v2)}{y1 - y2}$$

$$dyv2 = \frac{Ly1v2 + Ly2v2}{2}$$

In this case, the calibration coefficients axv2 and bxv2 for the rotation angle in the horizontal direction are set to be equal to the calibration coefficients axh and bxh for the rotation angle in the horizontal direction in the horizontal posture state of the camera. Note that Kxv2, Lxv2, Ky1v2, Ly1v2, Ky2v2, and Ly2v2 are as described above. The coordinates (x, y) of the gazing point in the finder of the photographer are calculated using formulas (13) and (14) above (#334).

On the other hand, if a calibration of the gazing point in the second vertical posture state is not performed yet, it is checked if a calibration of the gazing point in the horizontal posture state has been made (#335). If a calibration of the gazing point is not performed yet when the posture of the camera corresponds to the horizontal posture state, default calibration coefficients are used (#336).

The calibration coefficients at that time are:
axv2=0
bxv2=1
cxv2=0
dxv2=0
ayv2=0
byv2=1
cyv2=0
dyv2=0

The coordinates of the gazing point in the finder are calculated by substituting the above-mentioned calibration coefficients into formulas (13) and (14) above (#334).

On the other hand, if a calibration of the gazing point has been made when the posture of the camera corresponds to the horizontal posture state (#335), the calibration coefficients are expressed as follows using the calibration data for the horizontal posture state (#337):

$$axv2 = \frac{m*(Kx1 - Kx2)}{x1 - x2}$$

$$bxv2 = \frac{Kx1 + Kx2}{2}$$

$$cxv2 = \frac{m*(Lx1 - Lx2)}{x1 - x2}$$

$$dxv2 = \frac{Lx1 + Lx2}{2}$$

$$ayv2 = 0$$

$$byv2 = axv2 * \frac{\Sigma Rpyh}{nh} + bxv2$$

$$cyv2 = Kyh$$

$$dyv2 = Lyh$$

The coordinates of the gazing point in the finder are calculated by substituting the above calibration coefficients into formulas (11) and (12) (#334). After the coordinates of the gazing point are calculated (#334), the control returns to the main routine shown in FIGS. 14 and 15 (#343). When the gazing point in the finder where the photographer gazes is calculated (#308), a distance measuring point to be subjected to focusing point detection is selected on the basis of the coordinates of the calculated gazing point (#309).

Figure 17:
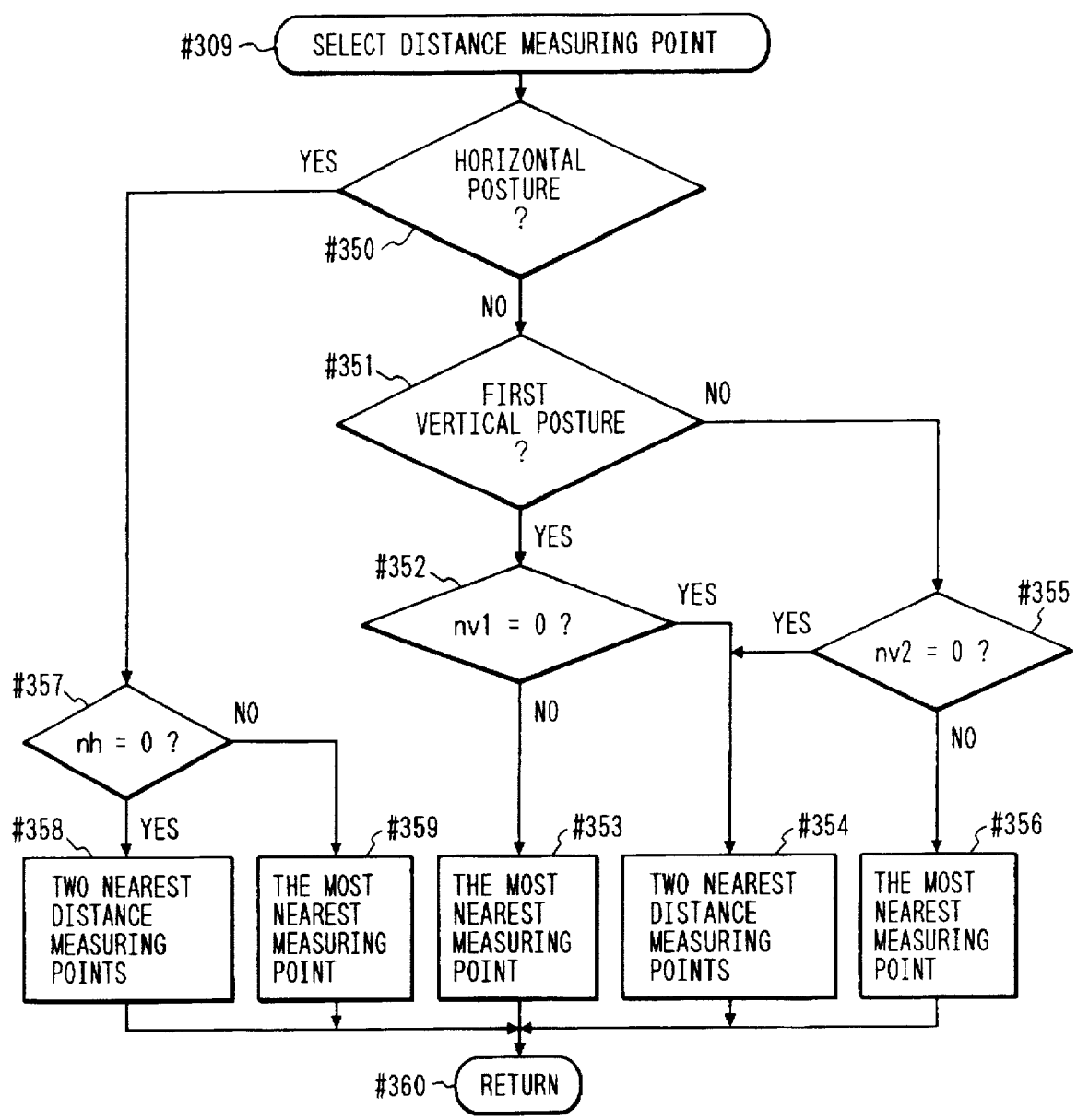
FIG. 17 is a flow chart showing a distance measuring point selection routine according to the second embodiment of the present invention.

FIG. 17 is a flow chart for explaining a distance measuring point selection routine. If the CPU 100 detects the posture of the camera using the posture detecting means, and determines that the camera is in the horizontal posture state (FIGS. 8A and 8B) (#350), it checks the calibration number nh stored in the EEPROM 100a. If a calibration has been made in the horizontal posture state (#357), a distance measuring point nearest the previously calculated coordinates of the gazing point is selected (#359).

On the other hand, if a calibration of the gazing point is not performed yet in the horizontal posture state, since the coordinates of the gazing point are calculated using the default calibration coefficients, the reliability of the calculated coordinates of the gazing point is low. For this reason, if a calibration of the gazing point is not performed yet in the horizontal posture state (#357), a distance measuring point closest to the previously calculated coordinates of the gazing point and a distance measuring point second nearest the calculated coordinates are selected (#358).

If the CPU 100 detects the posture of the camera using the posture detecting means (#350), and determines that the camera is in the first vertical posture state (FIGS. 8C and 8D) (#351), it checks the calibration number nv1 stored in the EEPROM 100a. If a calibration has been made in the first vertical posture state (#352), a distance measuring point nearest the previously calculated coordinates of the gazing point is selected (#353).

However, if a calibration of the gazing point is not performed yet in the first vertical posture state (#352), since the coordinates of the gazing point are calculated using the default calibration coefficients or the calibration data obtained in the horizontal posture state, the reliability of the calculated coordinates of the gazing point is low. For this reason, if a calibration of the gazing point is not performed yet in the first vertical posture state (#352), a distance measuring point closest to the previously calculated coordinates of the gazing point and a distance measuring point second nearest the calculated coordinates are selected (#354).

If the CPU 100 detects the posture of the camera using the posture detecting means, and determines that the camera is in the second vertical posture state (FIGS. 8E and 8F) (#351), it checks the calibration number nv2 stored in the EEPROM 100a. If a calibration has been made in the second vertical posture state (#355), a distance measuring point nearest the previously calculated coordinates of the gazing point is selected (#356).

However, if a calibration of the gazing point is not performed yet in the second vertical posture state (#355), since the coordinates of the gazing point are calculated using the default calibration coefficients or the calibration data obtained in the horizontal posture state, the reliability of the calculated coordinates of the gazing point is low. For this reason, if a calibration of the gazing point is not performed yet in the second vertical posture state (#355), a distance measuring point closest to the previously calculated coordinates of the gazing point and a distance measuring point second nearest the calculated coordinates are selected (#354). After a distance measuring point (or points) is (or are) selected, the flow returns to the main routine shown in FIGS. 14 and 15 (#360).

The CPU 100 displays the selected distance measuring point (or points) in the finder. When the photographer recognizes upon observation of the distance measuring point (or points) superimpose-displayed in the finder that the selected distance measuring point (or points) is (or are) different from one that he or she intended, and the photographer releases his or her hand from the release button 41 to turn off the switch SW1 (#310), the CPU 100 confirms the selected mode again (#301). If the normal photographing mode is selected, the control waits until the switch SW1 is turned on (#304).

Figure 18:
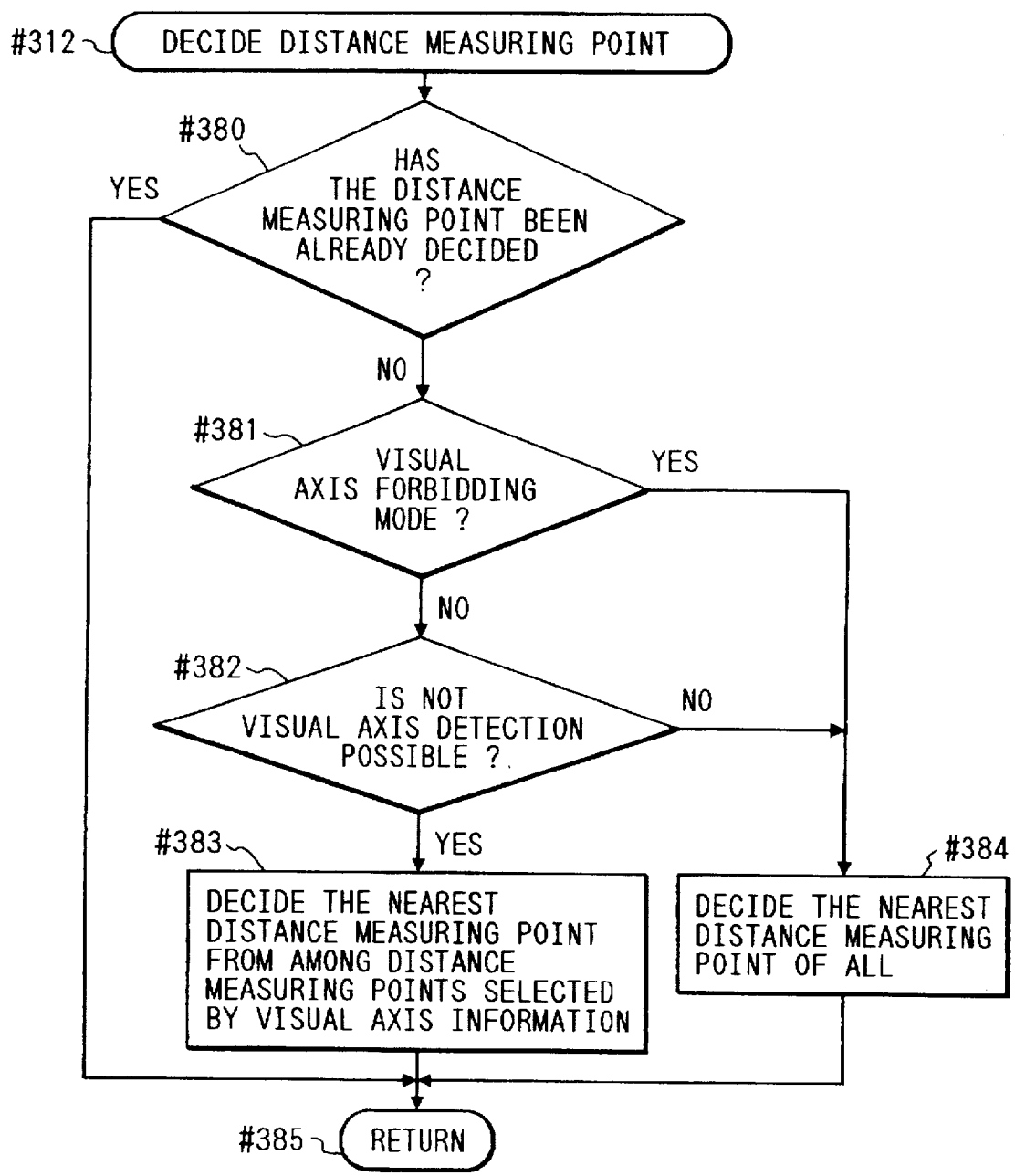
FIG. 18 is a flow chart showing a distance measuring point decision routine according to the second embodiment of the present invention.
Figure 19A:
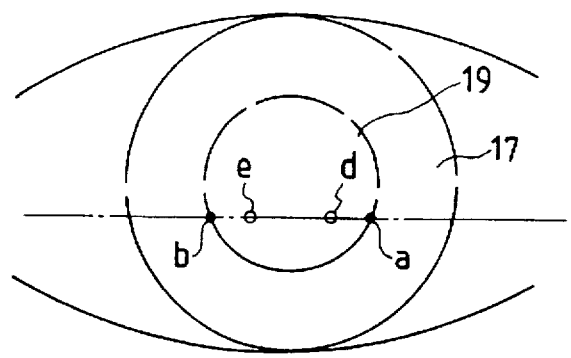
FIGS. 19A and 19B are schematic views of a principal part of an eyeball image.
Figure 19B:
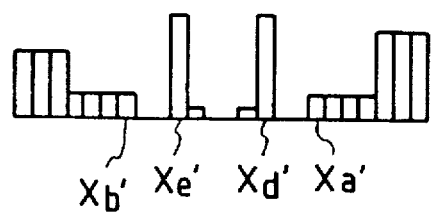
Figure 20:
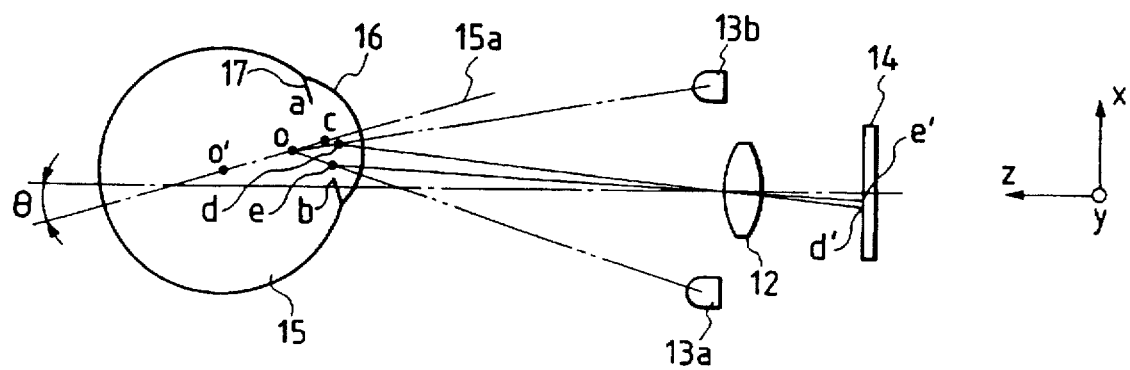
FIG. 20 is an explanatory view of the principle of visual axis detection.
Figure 21:
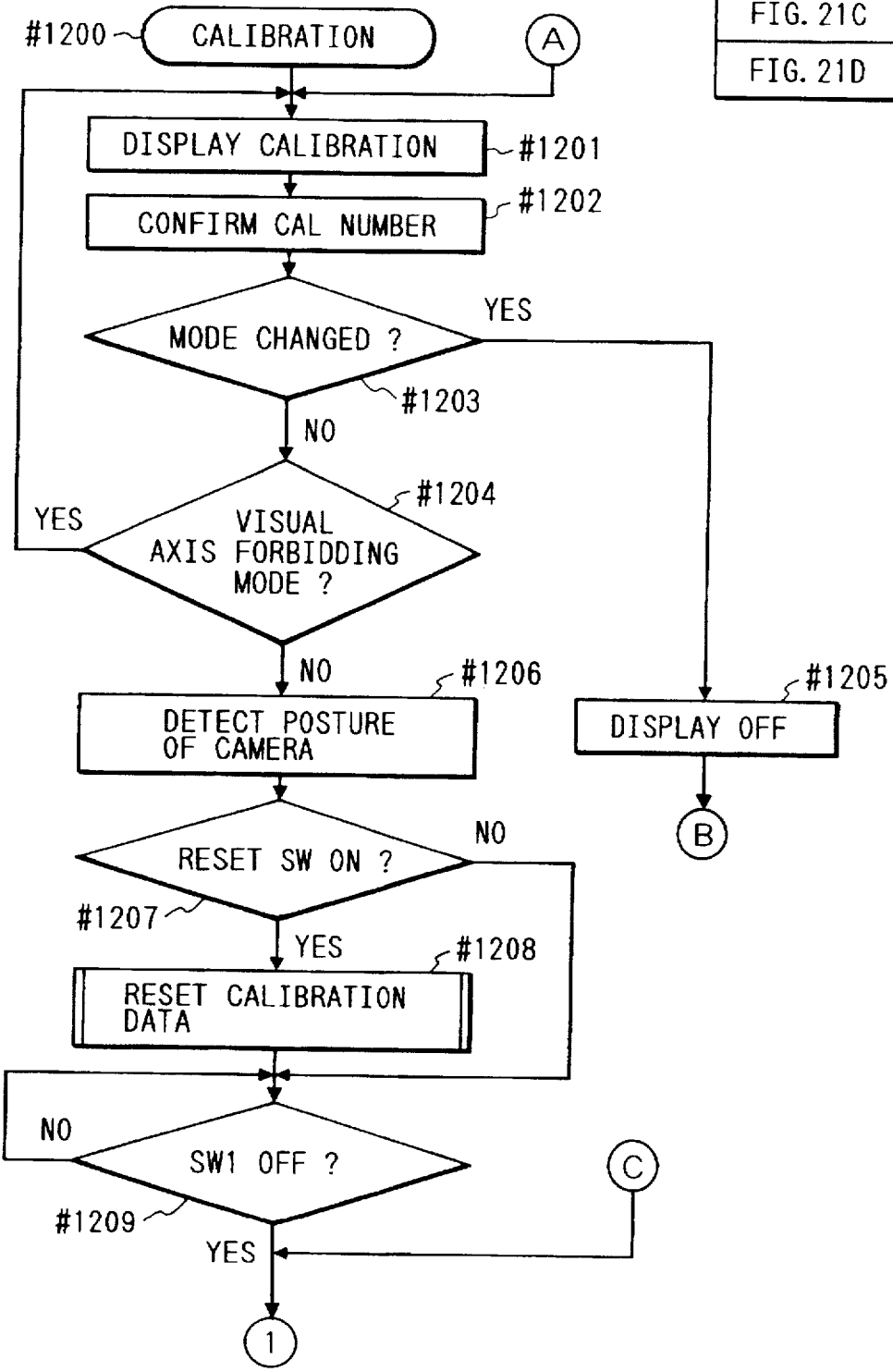
FIG. 21 is comprised of FIGS. 21A to 21D illustrating flow charts showing the operation according to the third embodiment of the present invention.
Figure 21B:
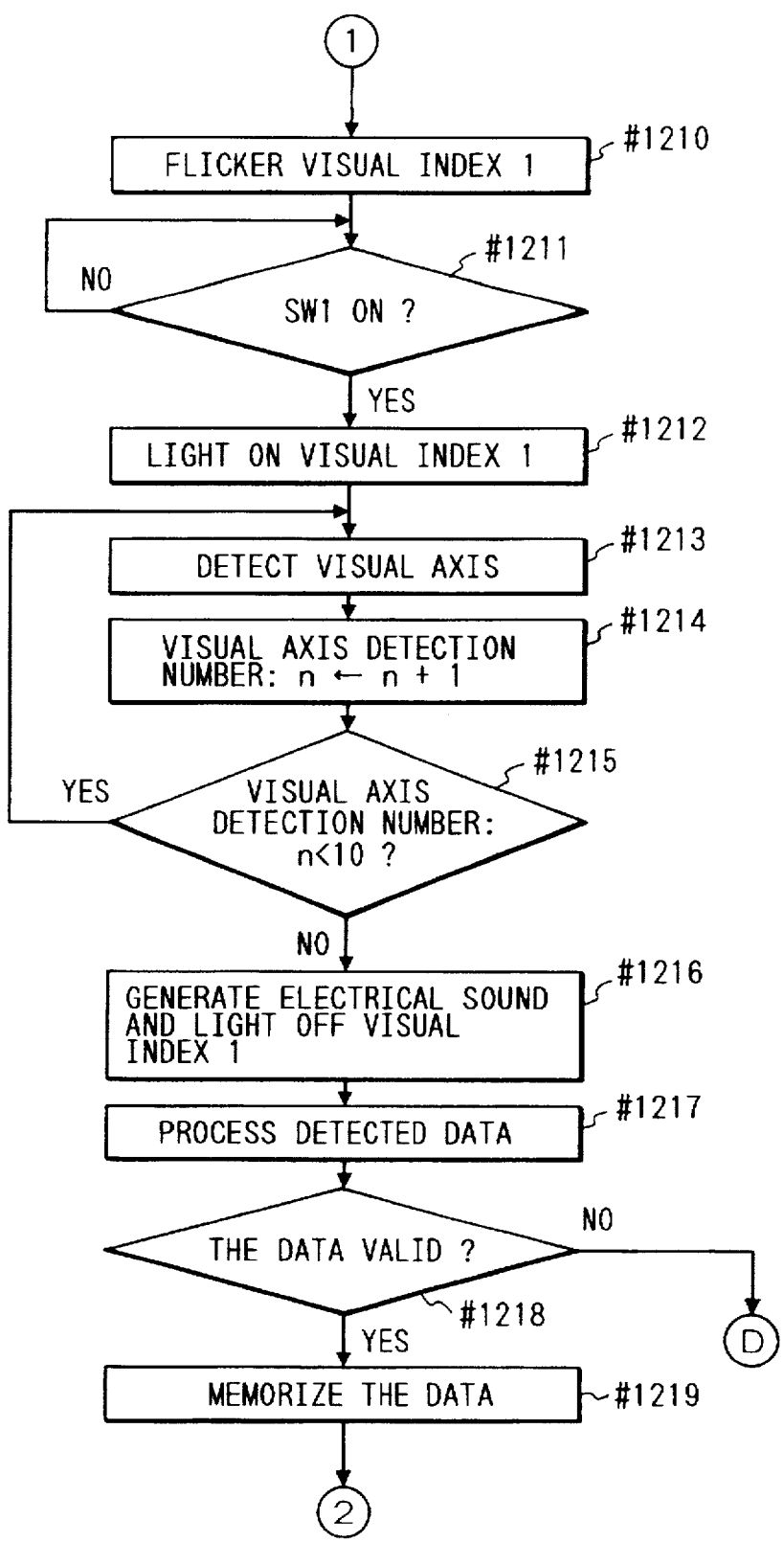
Figure 21C:
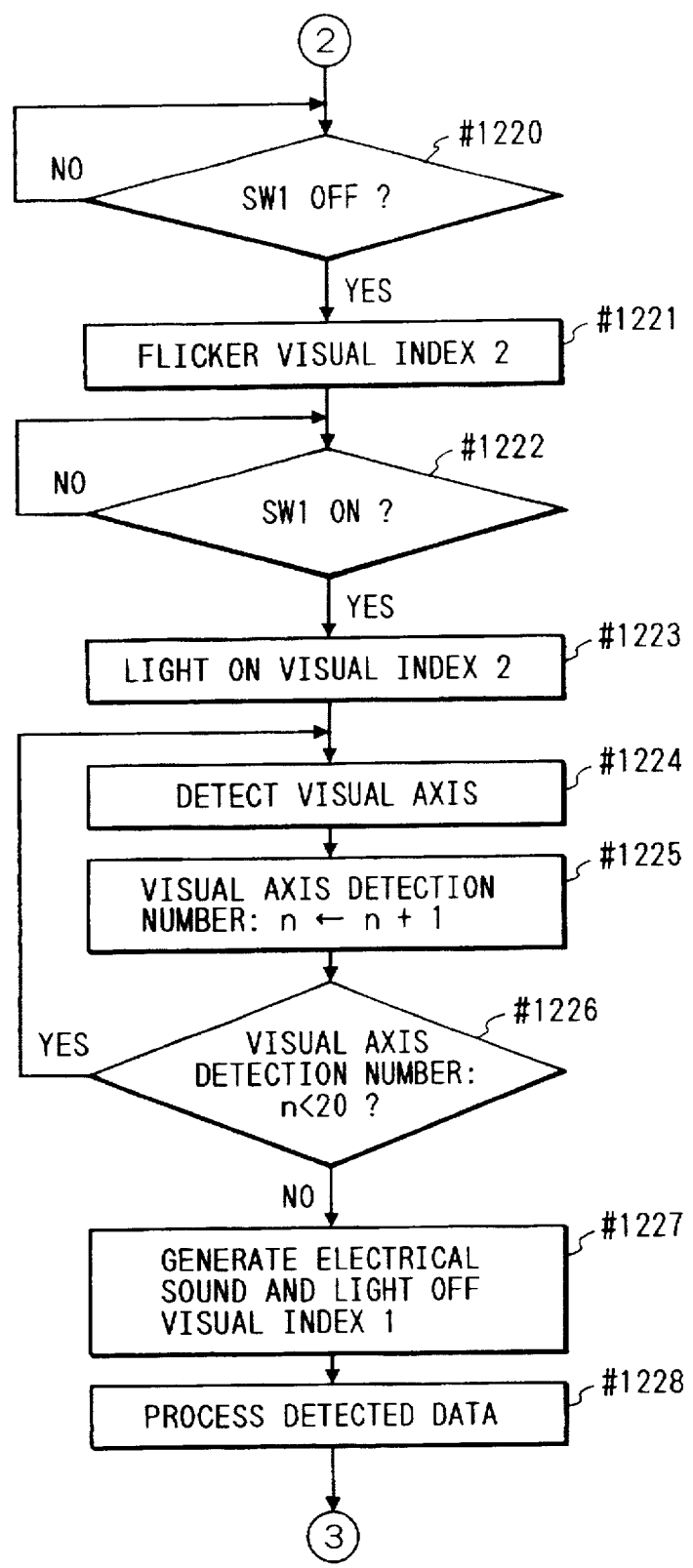
Figure 21D:
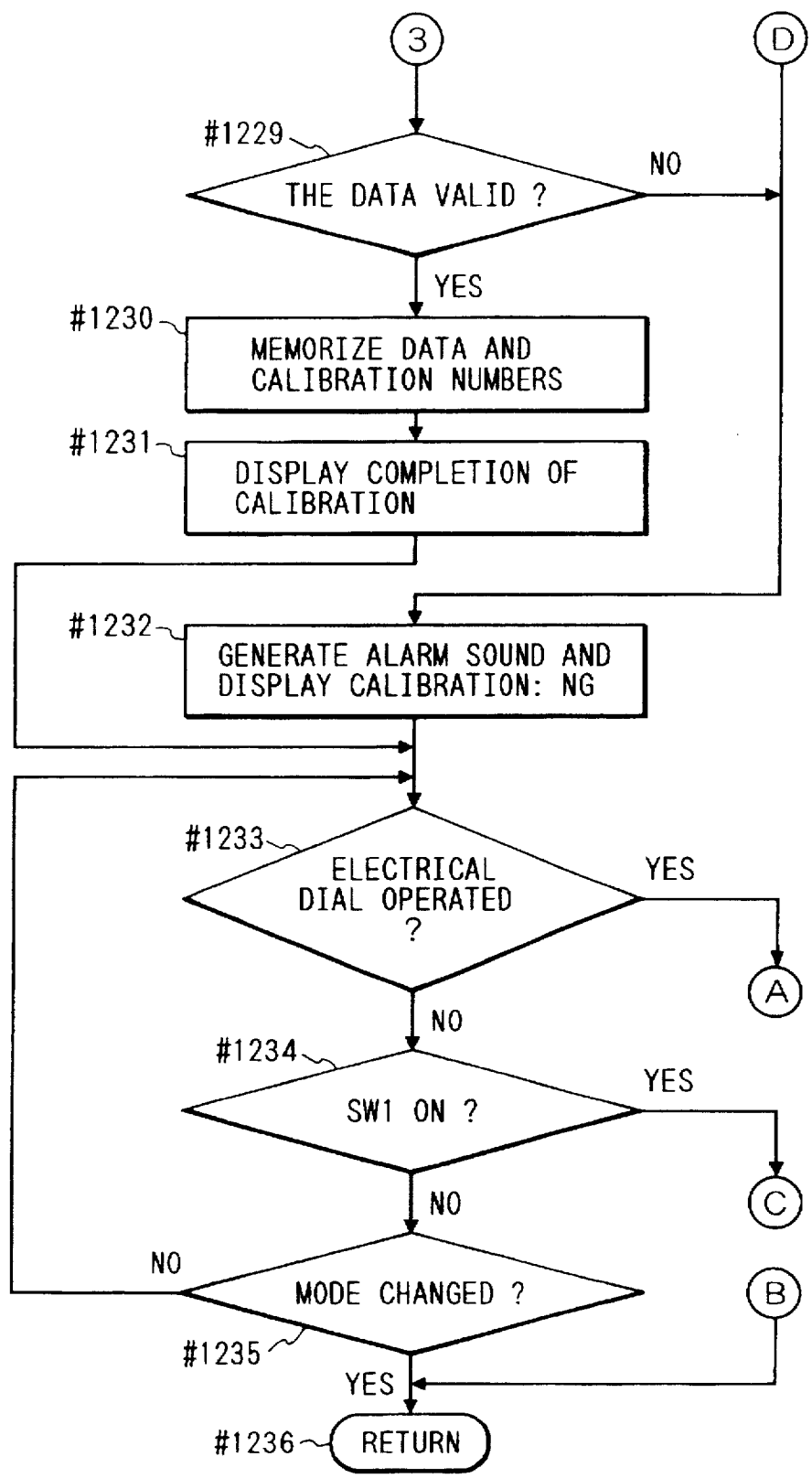

On the other hand, when the photographer keeps the switch SW1 ON upon observation of the superimpose-displayed distance measuring point (or points) selected by his or her visual axis (#310), the auto focusing point detecting circuit 103 executes focusing point detection at the distance measuring point (or points) selected by the visual axis information (#311). Upon completion of the focusing point detection (#311), a distance measuring point at which focusing point adjustment of the photographing lens 1 is to be actually performed is decided (#312). FIG. 18 is a flow chart showing the distance measuring point decision routine.

Referring to FIG. 18, if a distance measuring point to be subjected to focusing point adjustment has already been decided or the number of distance measuring points selected based on the visual axis information is one (#380), the flow immediately returns to the main routine (#385).

On the other hand, if a distance measuring point to be subjected to focusing point adjustment is not decided yet (#380), the CPU 100 confirms data stored in the EEPROM 100a and associated with calibration.

At this time, if the confirmed calibration data number is set to be the visual axis forbid mode (#381), a distance measuring point corresponding to the shortest object distance is decided from all the distance measuring points subjected to focusing point detection (#384). Although the visual axis forbid mode is not set (#381), if a distance measuring point cannot be selected based on the visual axis information since visual axis detection is not possible (#382), a distance measuring point corresponding to the shortest object distance is similarly decided from all the distance measuring points subjected to focusing point detection (#384). On the other hand, if the visual axis detection is possible (#382), one, corresponding to the shortest object distance, of the two distance measuring points selected based on the visual axis information is decided (#383). When a distance measuring point to be subjected to focusing point adjustment is decided, the flow returns to the main routine (#385).

If the distance measuring at the decided distance measuring point is not possible (#313), the CPU 100 sends a signal to the LCD drive circuit 105 to flicker the in-focus mark 50 on the finder LCD 24, thereby displaying, for the photographer, an alarm message indicating that the distance measuring is "NG" (not possible) (#321). This alarm message is continuously displayed until the switch SW1 is released (#322).

If the distance measuring at the decided distance measuring point is possible, and the focusing point adjustment state of the photographing lens 1 corresponding to the distance measuring point is not an in-focus state (#314), the CPU 100 sends a signal to the lens focusing point adjusting circuit 110 to drive the focusing lens 1a in the photographing lens 1 by a predetermined amount (#320). After the lens is driven, the auto focusing point detecting circuit 103 performs focusing point detection at the decided distance measuring point again (#311), and it is checked if the photographing lens 1 has reached an in-focus state (#314). If the photographing lens 1 has reached an in-focus state (#314), the CPU 100 sends a signal to the LCD drive circuit 105 to turn on the in-focus mark 50 on the finder LCD 24, and also sends a signal to the LED drive circuit 106 to perform an in-focus display on the in-focus distance measuring point (#315).

At this time, the flickering display of the distance measuring point selected by the visual axis is turned off, and the in-focus distance measuring point is turned on, so that the photographer can recognize the in-focus state. If the photographer observes the in-focus distance measuring point displayed in the finder, recognizes that the distance measuring point is not correct, and releases his or her hand from the release button 41 to turn off the switch SW1 (#316), the CPU 100 confirms the selected mode again (#301). If the normal photographing mode is selected, the control waits until the switch SW1 is turned on (#304).

On the other hand, if the photographer keeps the switch SW1 ON upon observation of the displayed in-focus distance measuring point (#316), the CPU 100 sends a signal to the photometering circuit 102 to perform photometering (#317). At this time, an exposure value is calculated by weighting the photometering regions 210 to 213 including the in-focus distance measuring point.

Furthermore, it is checked if the switch SW2 is turned on by pressing the release button 41 (#318). If the switch SW2 is OFF, the state of the switch SW1 is checked again (#316). On the other hand, if the switch SW2 is ON, the CPU 100 sends signals to the shutter controlling circuit 108, the motor controlling circuit 109, and the aperture drive circuit 111.

The motor M2 is energized to move the main mirror 2 upward, and to stop down the aperture 31. Thereafter, the magnet MG-1 is energized to open the front curtain of the shutter 4. The aperture value of the aperture 31 and the shutter speed of the shutter 4 are respectively determined on the basis of the exposure value detected by the photometering circuit 102, and the sensitivity of the film 5. After an elapse of a predetermined shutter time, the magnet MG-2 is energized to close the rear curtain of the shutter 4. Upon completion of exposure onto the film 5, the motor M2 is energized again to move the mirror downward and to charge the shutter. In addition, the motor M1 is also energized to feed the film by one frame, thus completing a series of operations in the shutter release sequence (#319).

Upon completion of the shutter release operations of the camera (#319), the CPU 100 confirms the selected mode again (#301). If the normal photographing mode is selected, the control waits until the switch SW1 is turned on (#304).

The third embodiment of the present invention will be described below. The third embodiment comprises reset means. The reset means comprises a reset switch 46 (SW-RSET), the signal input circuit 104 for detecting the signal input state of the reset switch 46, the CPU 100, and the EEPROM 100a.

A method of resetting information associated with the personal difference of the visual axis of a photographer in a camera according to this embodiment will be described below.

Information associated with the personal difference of the visual axis stored in the storage means is reset in the gazing point calibration mode for acquiring the personal difference information.

The calibration operation will be described below using the flow chart in FIGS. 21A to 21D with reference to FIGS. 22A to 22F showing the illumination states of the illumination means at the respective postures of the camera and the states in the finder view field.

When a photographer turns the mode dial 44 and sets the CAL position 44d at the index 55, the gazing point calibration mode is set (#1200).

The gazing point calibration mode includes an "ON" mode in which the calibration operation is performed, and an "OFF" mode in which the calibration operation is not performed. These modes can be selected by turning the electronic dial 45. In the "ON" mode, for example, one of five calibration numbers (CAL1 to CAL5) can be selected, and five calibration data shown in FIG. 24 can be stored in the EEPROM 100a at addresses corresponding to the selectable calibration numbers. The calibration number selected at this time is stored in the EEPROM 100a as a calibration data number (CAL1 to CAL5).

When the "OFF" mode is selected by the electronic dial 45, the calibration data number to be stored in the EEPROM 100a is set to be, e.g., "0", i.e., the visual axis forbid mode is set.

The signal input circuit 104 supplies a signal to the LCD drive circuit 105 via the CPU 100 to cause the finder LCD 24 and the monitor LCD 42 to display that one of the calibration modes is started.

The finder LCD 24 and the monitor LCD 42 perform a display in correspondence with the calibration data number. When the calibration data of the calibration number selected in the calibration "ON" mode has an initial value, the calibration number displayed on each of the finder LCD 24 and the monitor LCD 42 is flickered. On the other hand, when a calibration has already been performed in correspondence with the selected calibration number, and calibration data different from an initial value is stored on the address in the EEPROM 100a corresponding to the calibration number, the calibration number displayed on each of the finder LCD 24 and the monitor LCD 42 is fully turned on.

Therefore, the photographer can recognize whether or not calibration data is already stored in correspondence with the presently selected calibration number.

In the "OFF" mode, "OFF" is displayed on each of the finder LCD 24 and the monitor LCD 42 using the 7-segment display portion (#1201).

When the photographer turns the electronic dial 45, the signal input circuit 104, which detects the rotation, transmits a signal to the LCD drive circuit 105 via the CPU 100. As a result, the calibration number displayed on each of the finder LCD 24 and the monitor LCD 42 changes in synchronism with the rotation of the electronic dial 45. After the photographer selects a desired calibration number while observing the calibration number displayed on each of the finder LCD 24 and the monitor LCD 42, the CPU 100 confirms the selected calibration number (#1202). The confirmed calibration number is stored on a predetermined address in the EEPROM 100a as a calibration data number.

The CPU 100 confirms a photographing mode via the signal input circuit 104. If it is confirmed that the photographer turns the mode dial 44 to select a photographing mode other than the gazing point calibration mode (#1203), the CPU 100 turns off the calibration displays inside and outside the finder (#1205), and the flow returns to the photographing operation of the camera as the main routine (#1236). When the mode dial 44 is switched to another photographing mode while one of the calibration numbers "CAL1 to CAL5" is displayed, the visual axis detection is performed using the calibration data of the displayed calibration number, and a photographing operation using the visual axis information can be performed.

On the other hand, when the CPU 100 confirms that the gazing point calibration mode is kept set (#1203), the calibration data number selected by the electronic dial 45 is confirmed again (#1204). At this time, if the calibration data number stored in the EEPROM 100a is set to be "0", and the visual axis forbid mode is selected (#1204), the calibration number is confirmed again (#1202), and the control waits until the photographing mode is changed. More specifically, when the mode dial 44 is switched in a state wherein "OFF" is displayed on each of the finder LCD 24 and the monitor LCD 42, a photographing operation is started without executing the visual axis detection.

If the calibration data number is set to be a value other than "0" (#1204), detection of the posture of the camera is continued by the posture detecting means constituted by the CPU 100 and the signal input circuit 104 (#1206).

The posture detecting means processes the output signals from the mercury switches 27 and 28 as the posture detecting switches via the signal input circuit 104, and determines if the camera is held at a horizontal posture or vertical posture, and if the release button 41 is located at the upper position or lower position when the camera is held at the vertical posture.

Figure 22A:
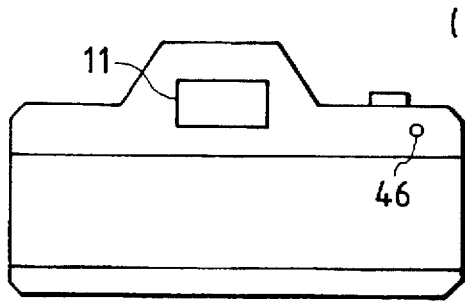
FIGS. 22A to 22F are explanatory views showing the relationship between the postures of a camera in the embodiment shown in FIGS. 21A and 21B and the illumination LEDs to be used.
Figure 22B:
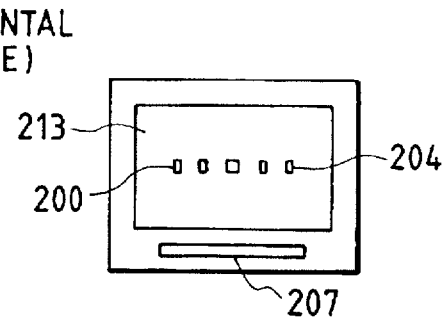
Figure 22C:
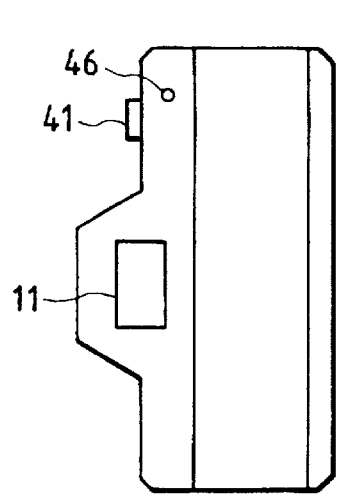
Figure 22D:
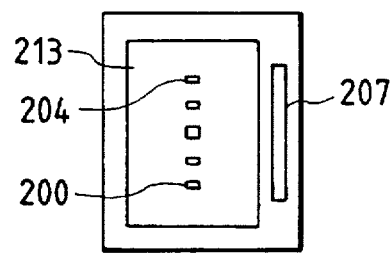
Figure 22E:
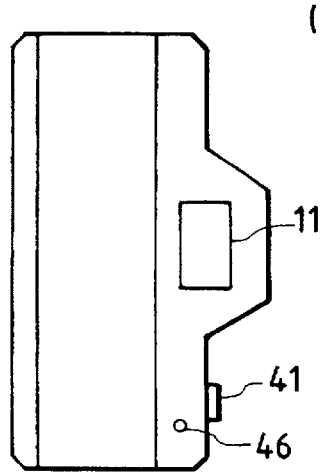
Figure 22F:
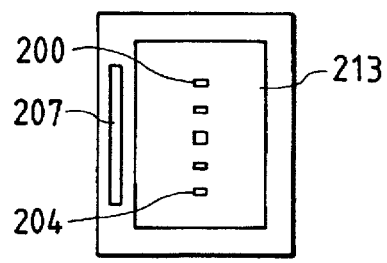

FIGS. 22A and 22B show a state wherein the camera is held at the horizontal posture. In this state, both the posture detecting switches SW-ANG1 and SW-ANG2 are ON. FIGS. 22C and 22D show a state wherein the camera is held at a first vertical posture (the release button 41 is at the upper position). In this state, the posture detecting switch SW-ANG1 is ON, and the switch SW-ANG2 is OFF. Furthermore, FIGS. 22E and 22F show a state wherein the camera is held at a second vertical posture (the release button is at the lower position). In this state, the posture detecting switch SW-ANG1 is OFF, and the switch SW-ANG2 is ON.

When the posture of the camera is detected (#1206), the CPU 100 checks the state of the reset switch 46 (SW-RSET) for erasing calibration data as personal information associated with the visual axis, via the signal input circuit 104. If the reset switch 46 is OFF (#1207), the calibration of the gazing point is continued without erasing the calibration data. On the other hand, if the reset switch 46 is ON (#1207), the calibration data are erased on the basis of the posture of the camera detected by the posture detecting means (#1208).

The method of resetting calibration data based on the posture of the camera will be described below with reference to the flow chart in FIG. 23.

If the reset switch 46 is turned on when the posture of the camera corresponds to the horizontal posture state shown in FIGS. 22A and 22B (#1240), the camera interprets this operation to mean that the photographer wants to erase calibration data at the horizontal posture as well as those at the vertical postures, and the CPU 100 constituting the reset means erases all calibration data stored in the EEPROM 100a as the storage means (#1241).

On the other hand, if the reset switch 46 is turned on when the posture of the camera corresponds to the vertical posture state shown in FIGS. 22C and 22D or FIGS. 22E and 22F (#1240), the camera interprets this operation to mean that the photographer wants to erase only calibration data corresponding to the present posture, and the CPU 100 constituting the reset means erases calibration data stored in the EEPROM 100a as the storage means and corresponding to the present posture (#1242).

The gazing point calibration routine is set to be started when the switch SW1 is turned on. In order to prevent the camera side from starting a calibration of the gazing point before the photographer is ready for the calibration, the CPU 100 confirms the state of the switch SW1. If the switch SW1 is ON upon depression of the release button 41, the control waits until the switch SW1 is turned off (#1209).

When the CPU 100 confirms via the signal input circuit 104 that the switch SW1 is OFF (#1209), it sets a visual axis detection number n to be 0, and resets variables used in gazing point calculations.

Furthermore, the CPU 100 sends a signal to the LED drive circuit 106 to flicker calibration visual index 1 of the gazing point (#1210). The calibration visual index of the gazing point is superimpose-displayed in the finder by commonly using the distance measuring points (to be also referred to as distance measuring point marks hereinafter) 200 and 204. In addition, the first visual index, which is presented first upon execution of calibration, is selected in correspondence with the posture of the camera.

When the posture of the camera corresponds to the horizontal posture, as shown in FIGS. 22A and 22B, the calibration visual index begins to flicker from the distance measuring point mark 204 at the right end in this state. When the posture of the camera corresponds to the first vertical posture at which the release button 41 is located at the upper position, as shown in FIGS. 22C and 22D, the calibration visual index begins to flicker from the distance measuring point mark 204 at the upper end with respect to the photographer. Similarly, when the posture of the camera corresponds to the second vertical posture at which the release button 41 is located at the lower position, as shown in FIGS. 22E and 22F, the calibration visual index begins to flicker from the distance measuring point mark 200 at the upper end with respect to the photographer.

The camera waits if an ON signal of the switch SW1 as a trigger signal for starting the calibration of the gazing point is not received (#1211). When the photographer gazes the visual index which begins to flicker, and turns on the switch SW1 (#1211), the CPU 100 sends a signal to the LED drive circuit 106 to turn on calibration visual index 1 (#1212).

Subsequently, the eyeball rotation angle detecting means detects the visual axis (the rotation angle of the eyeball) (#1213). At this time, the rotation angles ($\theta$x, $\theta$y) of the eyeball and the pupil diameter Rp are detected.

When the rotation angles of the eyeball are detected while the photographer gazes visual index 1, the visual axis detection number n is incremented by 1 (#1214). In this embodiment, since the visual axis detection number for one visual index is set to be 10, if the visual axis detection number n is smaller than 10 (#1215), visual axis detection for visual index 1 is continued (#1213). On the other hand, if the visual axis detection number n has reached 10 (#1215), visual axis detection for visual index 1 ends. The CPU 100 causes a sound generator (not shown) to generate several electronic sounds so that the photographer recognizes the end of visual axis detection for visual index 1. At the same time, the CPU 100 turns off visual index 1 via the LED drive circuit 106 (#1216).

Furthermore, the CPU 100 performs data processing of 10 sets of detected eyeball rotation angles ($\theta$x, $\theta$y) and pupil diameters Rp (#1217). In this processing, data which were detected upon movement of the visual axis against the photographer's will are excluded. The CPU 100 excludes data with large deviations from an average value of the detected data, and calculates an average value of the remaining data.

Moreover, the CPU 100 checks if the data after the data processing are valid (#1218). In this checking operation, the number of valid data and their average value in the 10 sets of detected data are compared with reference values. For example, when the number of valid data is "5" or less, or their average value exceeds a predetermined range, it is determined that acquisition of calibration data for the first visual index is not successful (#1218). In this case, the CPU 100 causes a sound generator (not shown) to generate an electronic sound for a predetermined period of time, and sends a signal to the LCD drive circuit 105 to flicker a "CAL" display on each of the finder LCD 24 and the monitor LCD 42, thus generating an alarm to the photographer (#1232).

On the other hand, when the number of valid data is larger than "5", and their average value falls within a predetermined range, it is determined that data after the data processing are valid (#1218), and the CPU 100 stores the processed data on predetermined addresses in the EEPROM 100a (#1219). At this time, a setting value of a flag representing the illumination state of the illumination means is also stored in the EEPROM 100a as the storage means.

The calibration data to be stored in the EEPROM 100a include the average value of the rotation angles of the eyeball, the average value of the pupil diameters, and the product of these average values. The calibration data are not updated in each calibration, but are added to already stored values (see FIG. 24). For example, when the posture of the camera upon calibration of the gazing point corresponds to the horizontal posture shown in FIGS. 22A and 22B, if the rotation angles of the eyeball after the data processing are represented by (θx1, θy1), and the pupil diameter after the data processing is represented by Rpx1, "(θx1, Rpx1*θx1, Rpx1, Rpx1^2)" are added to stored values on addresses corresponding to these data. At this time, data of the rotation angle θy1 in the vertical direction is processed after calibration of the gazing point for the second visual index, and the processed data is stored, as will be described later.

On the other hand, when the posture of the camera upon calibration of the gazing point corresponds to the first vertical posture shown in FIGS. 22C and 22D, if the rotation angles of the eyeball after the data processing are represented by (θx1v1, θy1v1), and the pupil diameter after the data processing is represented by Rpy1v1, "(θy1v1, Rpy1v1*θy1v1, Rpy1v1, Rpy1v1^2)" are added to stored values on addresses corresponding to these data. At this time, the rotation angle θx1v1 in the horizontal direction is processed after calibration of the gazing point for the second visual index, and the processed data is stored, as will be described later.

Similarly, when the posture of the camera upon calibration of the gazing point corresponds to the second vertical posture shown in FIGS. 22E and 22F, if the rotation angles of the eyeball after the data processing are represented by (θx1v2, θy1v2), and the pupil diameter after the data processing is represented by Rpy1v2, "(θy1v2, Rpy1v2*θy1v2, Rpy1v2, Rpy1v2^2)" are added to stored values on addresses corresponding to these data. At this time, the rotation angle θx1v2 in the horizontal direction is processed after calibration of the gazing point for the second visual index, and the processed data is stored, as will be described later.

After the calibration data of the gazing point corresponding to the first visual index are memorized (#1219), the CPU 100 confirms the state of the switch SW1. If the switch SW1 is ON upon depression of the release button 41, the CPU 100 waits until the switch SW1 is turned off (#1220).

When the CPU 100 confirms via the signal input circuit 104 that the switch SW1 is OFF (#1220), it sends a signal to the LED drive circuit 106 to flicker gazing point calibration visual index 2 (#1221). In this case, the gazing point calibration visual index is displayed using the marks 200 or 204 which also serve as the distance measuring point marks, and are not used for the first visual index. For example, when the posture of the camera corresponds to the horizontal posture, as shown in FIGS. 22A and 22B, the calibration visual index begins to flicker from the distance measuring mark 200 at the left end in this case. On the other hand, when the posture of the camera corresponds to the first vertical posture at which the release button 41 is located at the upper position, as shown in FIGS. 22C and 22D, the calibration visual index begins to flicker from the distance measuring point 200 at the lower end with respect to the photographer. Similarly, when the posture of the camera corresponds to the second vertical posture at which the release button 41 is located at the lower position, as shown in FIGS. 22E and 22F, the calibration visual index begins to flicker from the distance measuring point 204 at the lower end with respect to the photographer.

Furthermore, the CPU 100 confirms via the signal input circuit 104 if an ON signal of the switch SW1 as a trigger signal for starting calibration of the gazing point corresponding to the second visual index is received (#1222). If an ON signal of the switch SW1 is not received, the camera waits (#1222). If the photographer gazes the visual index which begins to flicker, and depresses the release button 41 to turn on the switch SW1 (#1222), the CPU 100 sends a signal to the LED drive circuit 106 to turn on calibration visual index 2 (#1223). Furthermore, the eyeball rotation angle detecting means detects the visual axis (the rotation angle of the eyeball) (#1224). At this time, the rotation angles (θx, θy) of the eyeball and the pupil diameter Rp are detected.

When the rotation angles of the eyeball are detected while the photographer gazes visual index 2, the visual axis detection number n is incremented by 1 (#1225). In this embodiment, since the visual axis detection number for one visual index is set to be 10, if the visual axis detection number n is smaller than "20" (#1226), visual axis detection for visual index 2 is continued (#1224). On the other hand, if the visual axis detection number n has reached "20" (#1226), visual axis detection for visual index 2 ends. The CPU 100 causes a sound generator (not shown) to generate several electronic sounds so that the photographer recognizes the end of visual axis detection for visual index 2. At the same time, the CPU 100 turns off visual index 2 via the LED drive circuit 106 (#1227).

The CPU 100 performs data processing of 10 sets of detected eyeball rotation angles (θx, θy) and pupil diameters Rp (#1228). The CPU 100 excludes data with large deviations from an average value of the detected data, and calculates an average value of the remaining data. The CPU 100 then checks if the data after the data processing are valid (#1229). In this checking operation, the number of valid data and their average value in the 10 sets of detected data are compared with reference values. For example, when the number of valid data is "5" or less, or their average value exceeds a predetermined range, it is determined that acquisition of calibration data for visual index 2 is not successful (#1229). In this case, the CPU 100 causes a sound generator (not shown) to generate an electronic sound for a predetermined period of time, and sends a signal to the LCD drive circuit 105 to flicker a "CAL" display on each of the finder LCD 24 and the monitor LCD 42, thus generating an alarm to the photographer (#1232). At this time, if the calibration data and illumination state corresponding to visual index 1 are stored, these data are reset.

On the other hand, when the number of valid data is larger than "5", and their average value falls within a predetermined range, it is determined that data after the data processing are valid (#1229), and the CPU 100 adds and stores the processed data and calibration numbers on predetermined addresses in the EEPROM 100a (#1230).

For example, when the posture of the camera upon calibration of the gazing point corresponds to the horizontal posture shown in FIGS. 22A and 22B, if the rotation angles of the eyeball after the data processing are represented by (θx2, θy2), and the pupil diameter after the data processing is represented by Rpx2, "(θx2, Rpx2*θx2, Rpx2, Rpx2^2)" are added to stored values on addresses corresponding to these data, as shown in FIG. 24. The data θyh and Rpyh for the rotation in the vertical direction are calculated by:

$$\theta yh = (\theta y1 + \theta y2)/2$$

$$Rpyh = (Rpx1 + Rpx2)/2$$

The calculated data are added to stored values on addresses corresponding to these data as calibration data (θyh, Rpyh*θyh, Rpyh, Rpyh^2).

On the other hand, when the posture of the camera upon calibration of the gazing point corresponds to the first vertical posture shown in FIGS. 22C and 22D, if the rotation angles of the eyeball after the data processing are represented by (θx2v1, θy2v1), and the pupil diameter after the data processing is represented by Rpx2v1, "(θy2v1, Rpy2v1*θy2v1, Rpy2v1, Rpy2v1^2)" are added to stored values on addresses corresponding to these data. The data θxv1 and Rpxv1 for the rotation in the horizontal direction are calculated by:

$$θxv1=(θx1v1+θx2v1)/2$$

$$Rpxv1=(Rpy1v1+Rpx2v1)/2$$

The calculated values are added as calibration data (θxv1, Rpxv1*θxv1, Rpxv1, Rpxv1^2) to stored values on addresses corresponding to these data.

Similarly, when the posture of the camera upon calibration of the gazing point corresponds to the second vertical posture shown in FIGS. 22E and 22F, if the rotation angles of the eyeball after the data processing are represented by (θx2v2, θy2v2), and the pupil diameter after the data processing is represented by Rpx2v2, "(θy2v2, Rpy2v2*θy2v2, Rpy2v2, Rpy2v2^2)" are added to stored values on addresses corresponding to these data. The data θxv2 and Rpxv2 for the rotation in the horizontal direction are calculated by:

$$θxv2=(θx1v2+θx2v2)/2$$

$$Rpxv2=(Rpy1v2+Rpx2v2)/2$$

The calculated values are added as calibration data (θxv2, Rpxv2*θxv2, Rpxv2, Rpxv2^2) to stored values on addresses corresponding to these data.

After the calibration data and the calibration number for the second visual index are memorized (#1230), the CPU 100 makes a display indicating completion of calibration of the gazing point via the LCD drive circuit 105 and the LED drive circuit 106 (#1231). The LED drive circuit 106 energizes the superimposed LEDs 21 to flicker visual indices 1 and 2 several times, and the LCD drive circuit 105 supplies signals to the LCDs 24 and 42 to display "END" for a predetermined period of time.

After a series of calibration operations of the gazing point, the camera waits until the photographer operates the electronic dial 45 or the mode dial 44. When the photographer turns the electronic dial 45 to select another calibration number, the CPU 100 detects a change in calibration number via the signal input circuit 104 (#1233), and the control advances to the initialization step (#1201) of the gazing point calibration routine.

When the photographer turns on the switch SW1 to continuously perform calibration of the gazing point, the CPU 100 detects an ON signal of the switch SW1 via the signal input circuit 104 (#1234), and the control advances to the start step (#1210) of the gazing point calibration routine.

When the photographer selects another photographing mode by turning the mode dial 44, the CPU 100 detects a change in photographing mode via the signal input circuit 104 (#1235), and the control returns to the main routine (#1236). Then, the control is made on the basis of the calibration data of the gazing point.

Although the correspondence between the arrangements of the above embodiments and that of the present invention is as described above, the present invention is not limited to the arrangements of these embodiments.

In the third embodiment, calibration data are erased in correspondence with the posture of the camera when the photographer changes the posture of the camera and turns on the reset switch 46 at that time. Alternatively, calibration data corresponding to a desired posture of the camera may be read out using, e.g., the electronic dial 45, and may be erased by turning on the reset switch 46.

In this embodiment, the posture of the camera is detected by the posture detecting means using the mercury switches. Upon image processing of the eye of an observer, the posture of the camera may be determined by detecting the direction of the corner of the eye, and calibration data corresponding to the detected posture may be erased.

Figure 25B:
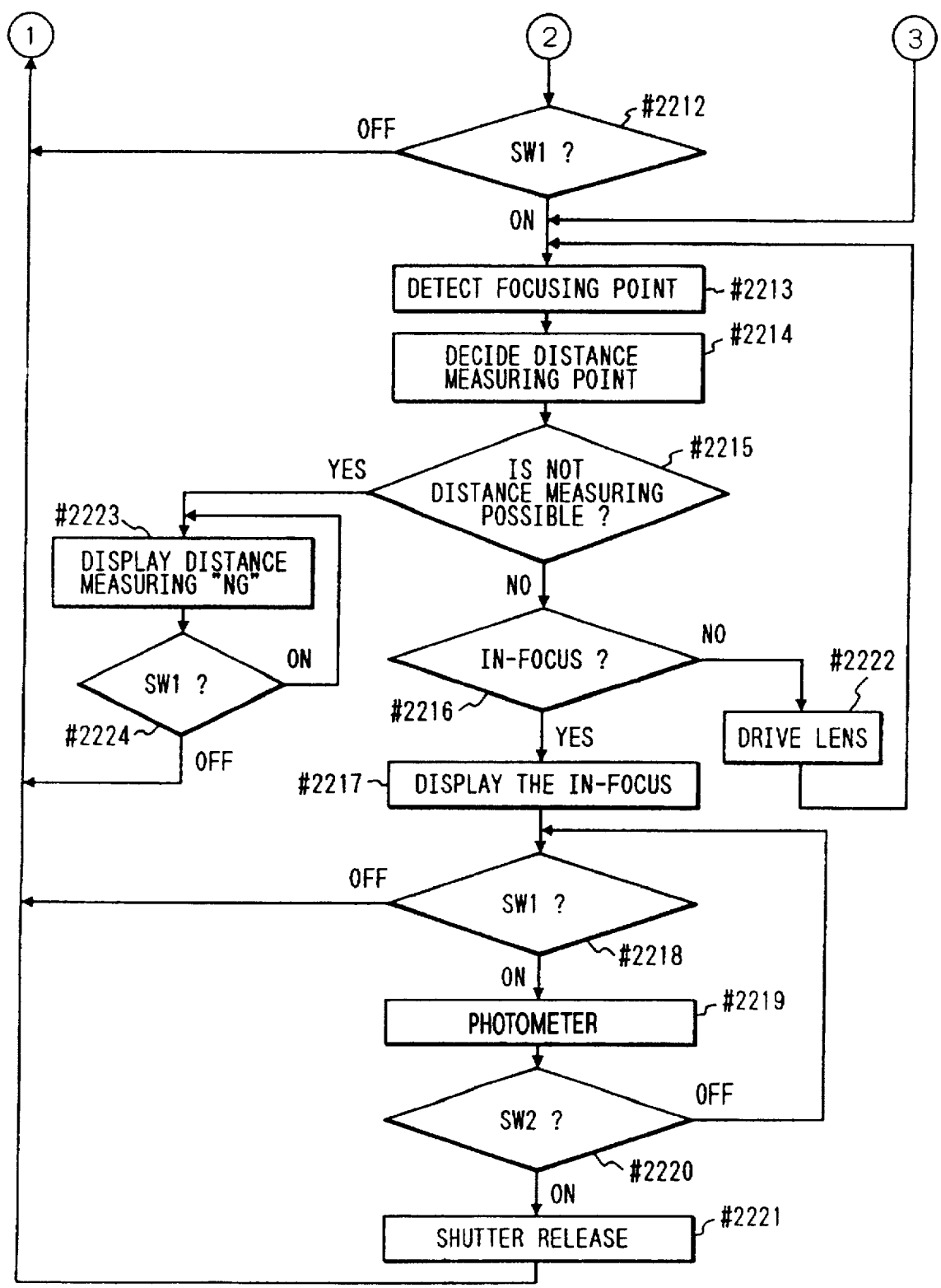
FIG. 25 is comprised of FIGS. 25A and 25B illustrating flow charts showing the operation according to the fourth embodiment of the present invention.

The operation of a camera according to the fourth embodiment of the present invention will be described below using the flow chart in FIGS. 25A and 25B with reference to FIGS. 26A to 26F showing the illumination states of the illumination means at the respective postures of the camera and the states in the finder view field.

When the camera is released from an inoperative state (lock state) and is set in a predetermined photographing mode by turning the mode dial 44, the power supply of the camera is turned on (#2200).

The CPU 100 confirms the selected mode position of the mode dial 44 via the signal input circuit 104 (#2201). If the mode dial 44 is set in the calibration mode of a gazing point (#2202), a calibration of the gazing point is executed to acquire personal information associated with the visual axis of the photographer (#2225).

FIGS. 27A to 27D are flow charts showing a gazing point calibration routine. The method of acquiring personal information associated with the visual axis of the photographer will be explained below with reference to FIGS. 27A to 27D.

When a photographer turns the mode dial 44 and sets the CAL position 44d at the index 55, the gazing point calibration mode is set (#2225).

The gazing point calibration mode includes an "ON" mode in which the calibration operation is performed, and an "OFF" mode in which the calibration operation is not performed. These modes can be selected by turning he electronic dial 45. In the "ON" mode, for example, one of five calibration numbers (CAL1 to CAL5) can be selected, and five calibration data shown in FIG. 29A can be stored in the EEPROM 100a at addresses corresponding to the selectable calibration numbers. The calibration number selected at this time is stored in the EEPROM 100a as a calibration data number (CAL1 to CAL5).

When the "OFF" mode is selected by the electronic dial 45, the calibration data number to be stored in the EEPROM 100a is set to be, e.g., "0", i.e., the visual axis forbid mode is set.

The signal input circuit 104 supplies a signal to the LCD drive circuit 105 via the CPU 100 to cause the finder LCD 24 and the monitor LCD 42 to display that one of the calibration modes is started.

The finder LCD 24 and the monitor LCD 42 perform a display in correspondence with the calibration data number. When the calibration data of the calibration number selected in the calibration "ON" mode has an initial value, the calibration number displayed on each of the finder LCD 24 and the monitor LCD 42 flickers.

On the other hand, when the calibration has already been performed in correspondence with the selected calibration number, and calibration data different from an initial value is stored on the address in the EEPROM 100a corresponding to the calibration number, the calibration number displayed on each of the finder LCD 24 and the monitor LCD 42 is turned on.

Therefore, the photographer can recognize whether or not calibration data is already stored in correspondence with the presently selected calibration number.

In the "OFF" mode, "OFF" is displayed on each of the finder LCD 24 and the monitor LCD 42 using the 7-segment display portion (#2226).

When the photographer turns the electronic dial 45, the signal input circuit 104, which detects the rotation, transmits a signal to the LCD drive circuit 105 via the CPU 100. As a result, the calibration number displayed on each of the finder LCD 24 and the monitor LCD 42 changes in synchronism with the rotation of the electronic dial 45. After the photographer selects a desired calibration number while observing the calibration number displayed on each of the finder LCD 24 and the monitor LCD 42, the CPU 100 confirms the selected calibration number (#2227). The confirmed calibration number is stored on a predetermined address in the EEPROM 100a as a calibration data number.

The CPU 100 confirms a photographing mode via the signal input circuit 104. If it is confirmed that the photographer turns the mode dial 44 to select a photographing mode other than the gazing point calibration mode (#2228), the CPU 100 turns off the calibration displays inside and outside the finder (#2230), and the flow returns to the photographing operation of the camera as the main routine (#2262). When the mode dial 44 is switched to another photographing mode while one of the calibration numbers "CAL1 to CAL5" is displayed, the visual axis detection is performed using the calibration data of the displayed calibration number, and the photographing operation using the visual axis information can be performed.

On the other hand, when the CPU 100 confirms that the gazing point calibration mode is kept set (#2228), the calibration data number selected by the electronic dial 45 is confirmed again (#2229). At this time, if the calibration data number stored in the EEPROM 100a is set to be "0", and the visual axis forbid mode is selected (#2229), the calibration number is confirmed again (#2227), and the control waits until the photographing mode is changed. More specifically, when the mode dial 44 is switched in a state wherein "OFF" is displayed on each of the finder LCD 24 and the monitor LCD 42, a photographing operation is started without executing the visual axis detection.

If the calibration data number is set to be a value other than "0" (#2229), detection of the posture of the camera is continued by the posture detecting means constituted by the CPU 100 and the signal input circuit 104 (#2231), etc.

The posture detecting means processes the output signals from the mercury switches 27 and 28 as the posture detecting switches via the signal input circuit 104, and determines if the camera is held at a horizontal posture or vertical posture, and if the release button 41 is located at the upper position or lower position when the camera is held at the vertical posture.

Figure 26A:
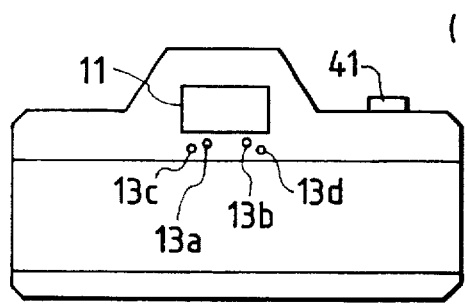
FIGS. 26A to 26F are explanatory views showing the relationship between the postures of a camera in the embodiment shown in FIGS. 25A and 25B and the illumination LEDs to be used.
Figure 26B:
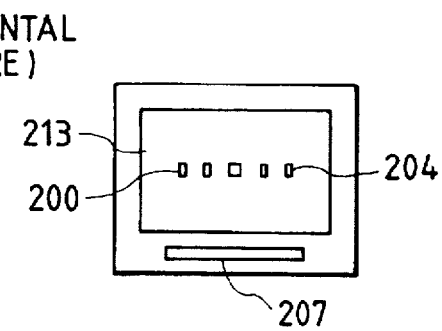
Figure 26C:
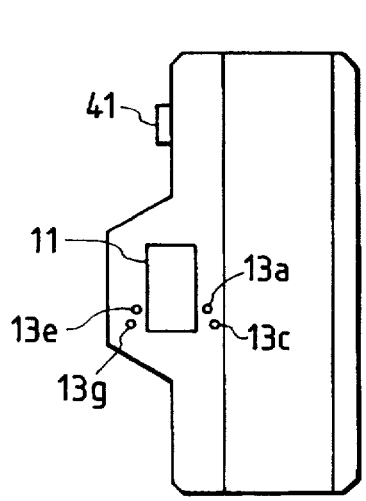
Figure 26D:
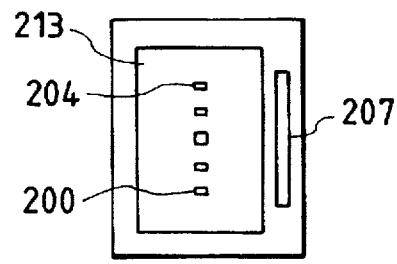
Figure 26E:
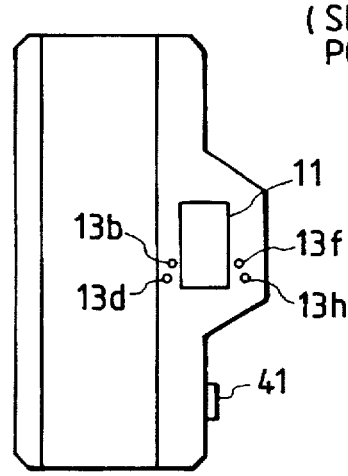
Figure 26F:
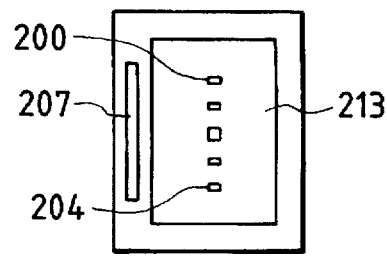
Figure 27A:
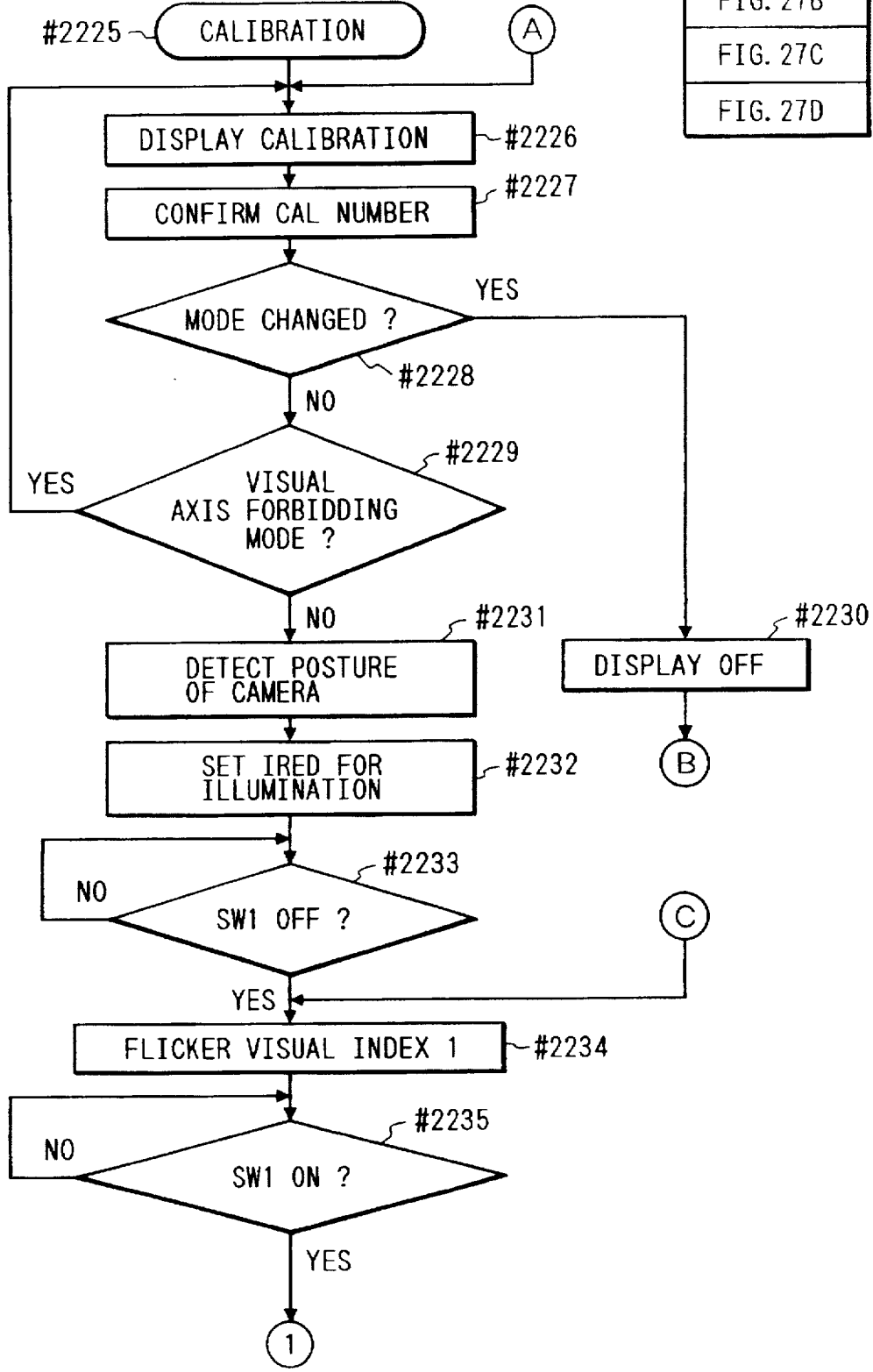
FIG. 27 is comprised of FIGS. 27A to 27D illustrating flow charts showing the operation in a calibration routine in FIGS. 25A and 25B.
Figure 27:
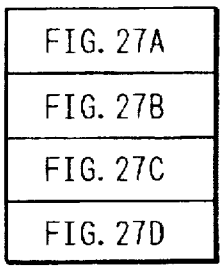
Figure 27B:
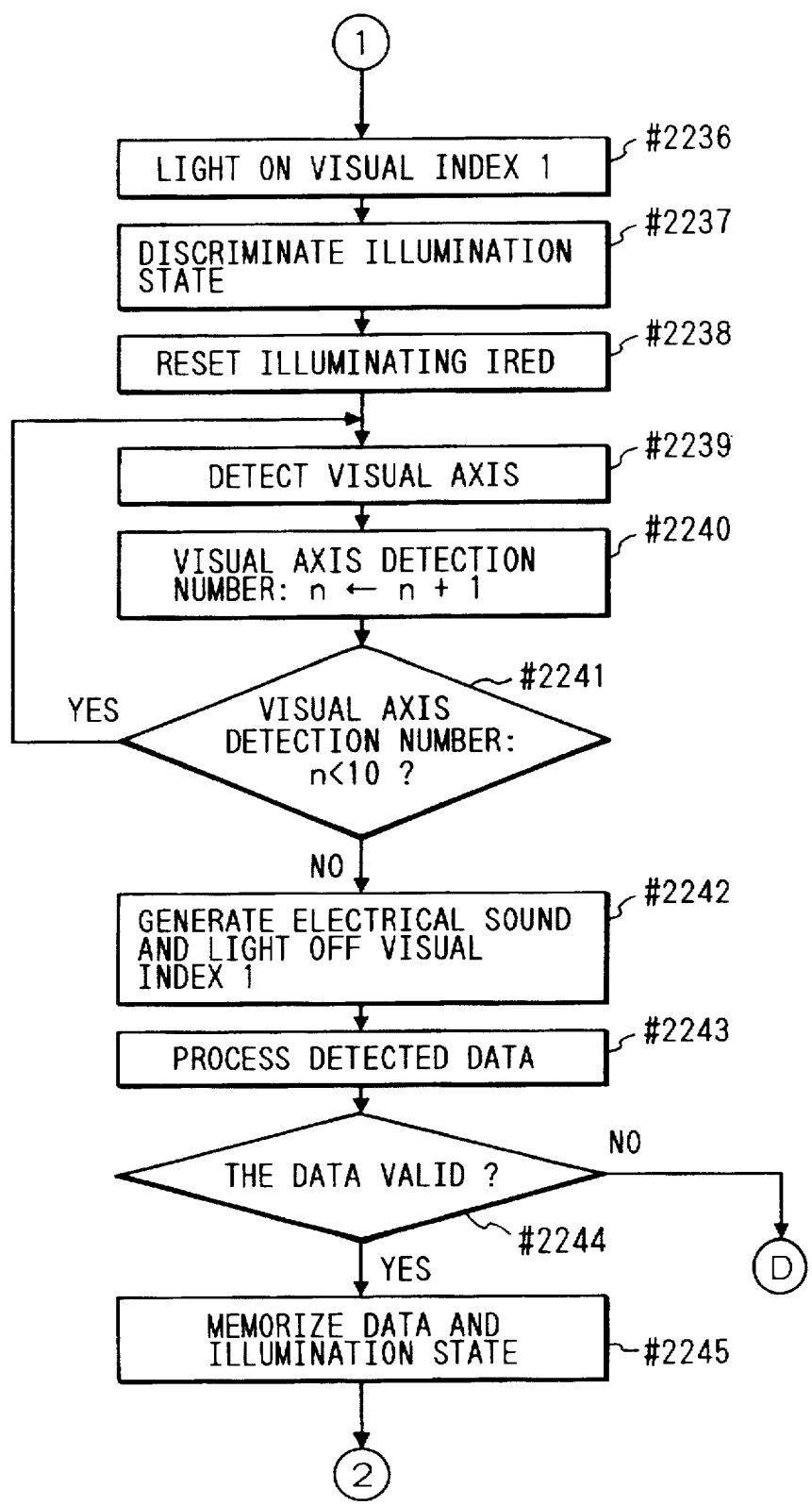
Figure 27C:
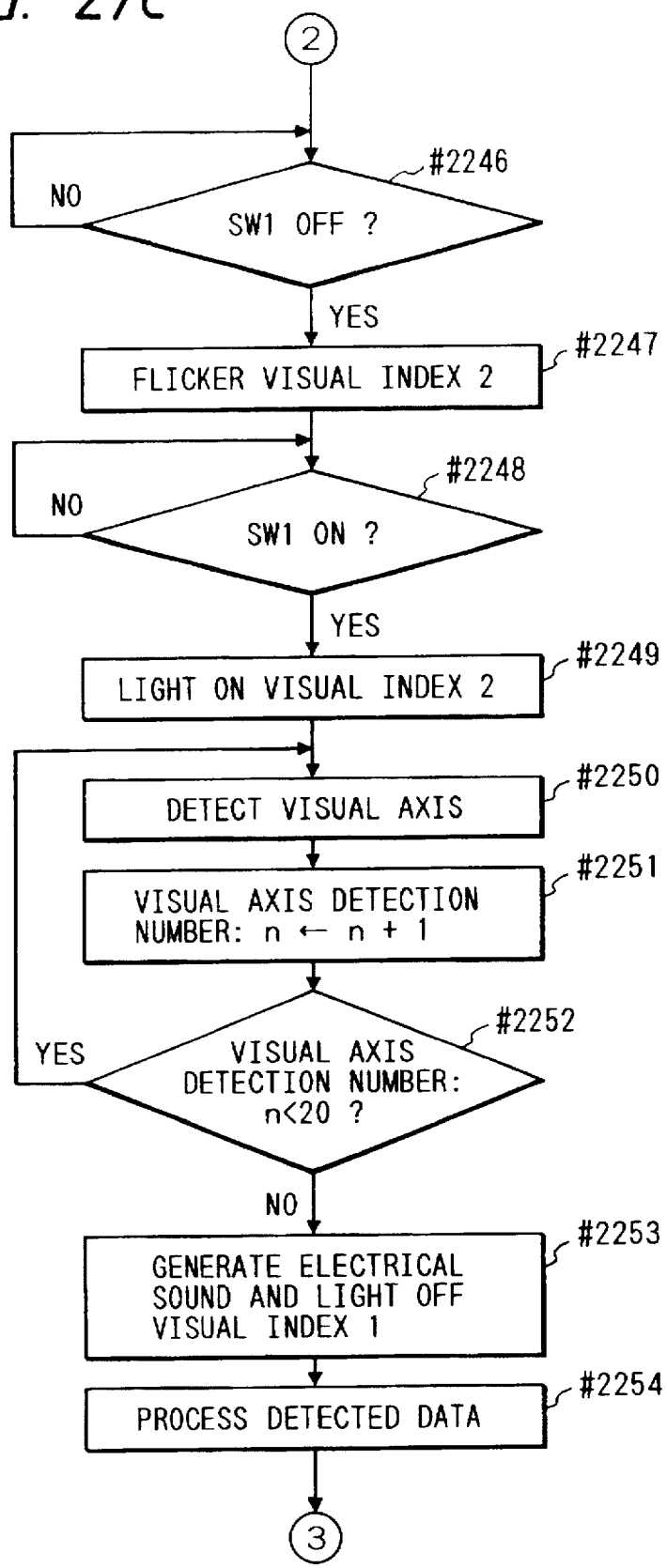
Figure 27D:
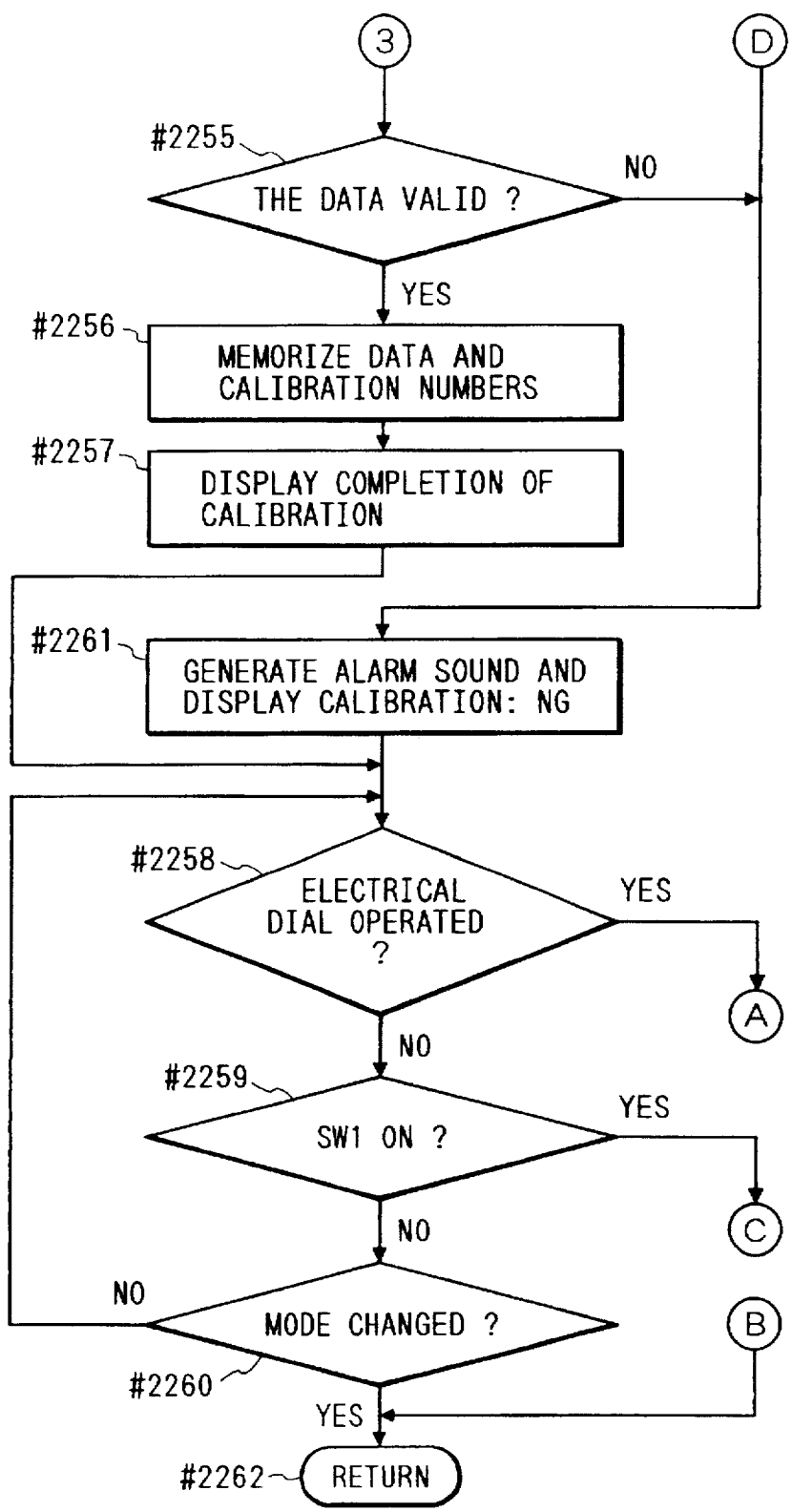

FIGS. 26A and 26B show a state wherein the camera is held at the horizontal posture. In this state, both the posture detecting switches SW-ANG1 and SW-ANG2 are ON. FIGS. 26C and 26D show a state wherein the camera is held at a first vertical posture (the release button 41 is at the upper position). In this state, the posture detecting switch SW-ANG1 is ON, and the switch SW-ANG2 is OFF. Furthermore, FIGS. 26E and 26F show a state wherein the camera is held at a second vertical posture (the release button is at the lower position). In this state, the posture detecting switch SW-ANG1 is OFF, and the switch SW-ANG2 is ON.

When the posture of the camera is detected (#2231), the IREDs for illuminating the eyeball 15 of the photographer are selected in correspondence with the posture of the camera (#2232). In this case, the illuminating IREDs are selected to illuminate the eyeball 15 of the photographer from below. However, since it is unknown as to whether or not the photographer wears spectacles, the IREDs for a naked-eye photographer are initially selected.

Therefore, if the posture of the camera detected by the posture detecting means corresponds to the horizontal posture, as shown in FIGS. 26A and 26B, the IREDs 13a and 13b are selected. On the other hand, if the posture of the camera corresponds to the first vertical posture at which the release button 41 is located at the upper position, as shown in FIGS. 26C and 26D, the IREDs 13a and 13e are selected. If the posture of the camera corresponds to the second vertical posture at which the release button 41 is located at the lower position, as shown in FIGS. 26E and 26F, the IREDs 13b and 13f are selected.

The gazing point calibration routine is set to be started when the switch SW1 is turned on. In order to prevent the camera side from starting a calibration of the gazing point before the photographer is ready for the calibration, the CPU 100 confirms the state of the switch SW1. If the switch SW1 is ON upon depression of the release button 41, the control waits until the switch SW1 is turned off (#2233).

When the CPU 100 confirms via the signal input circuit 104 that the switch SW1 is OFF (#2233), it sets a visual axis detection number n (the number of times of visual axis detection) to be 0, and resets variables used in gazing point calculations.

Furthermore, the CPU 100 sends a signal to the LED drive circuit 106 to flicker calibration visual index 1 of the gazing point (#2234). The calibration visual index of the gazing point is superimpose-displayed in the finder by commonly using the distance measuring points (to be also referred to as distance measuring point marks hereinafter) 200 and 204. In addition, the first visual index, which is presented first upon execution of calibration, is selected in correspondence with the posture of the camera.

When the posture of the camera corresponds to the horizontal posture shown in FIGS. 26A and 26B, the calibration visual index begins to flicker from the distance measuring point mark 204 at the right end in this state. When the posture of the camera corresponds to the first vertical posture at which the release button 41 is located at the heavenward position, as shown in FIGS. 26C and 26D, the calibration visual index begins to flicker from the distance measuring point mark 204 at the upper end with respect to the photographer. Similarly, when the posture of the camera corresponds to the second vertical posture at which the release button 41 is located at the earthward position, as shown in FIGS. 22E and 22F, the calibration visual index begins to flicker from the distance measuring point mark 200 at the upper end with respect to the photographer.

The camera waits if an ON signal of the switch SW1 as a trigger signal for starting the calibration of the gazing point is not received (#2235). When the photographer gazes the visual index which begins to flicker, and turns on the switch SW1 (#2235), the CPU 100 sends a signal to the LED drive circuit 106 to turn on calibration visual index 1 (#2236).

The visual axis detecting means discriminates the illumination state of the illumination means as personal difference information upon detection of the visual axis of the photographer (#2237). FIG. 29B shows the IREDs set in correspondence with the illumination states of the illumination means, and the setting values of illumination state flags (IREDh, IREDv1, and IREDv2) stored in the EEPROM 100a as the storage means.

As shown in FIG. 29B, one of the illumination states of the IREDs for the naked eye and the IREDs for spectacles can be selected in correspondence with the posture of the camera. For example, even when the posture of the camera corresponds to the horizontal posture and the illumination state for the naked eye is selected, if the eye 15 of the photographer is separated from the camera at the first vertical posture, the illumination state for the spectacles with a large light emission amount of the IREDs is selected.

As a result, even when the distance between the eye 15 of the photographer and the camera is relatively short, or conversely, when the distance between the eye 15 of the photographer and the camera is relatively large, the eyeball image intensity obtained by the light-receiving means can be substantially constant, and high-precision visual axis detection can be realized based on stable image information independently of the posture of the camera.

The discrimination method of the illumination state of the illumination means is as follows.

In the illumination means, the IREDs for a naked-eye photographer, which correspond to the posture of the camera detected by the posture detecting means, are turned on to illuminate the eyeball of the photographer, as described above. Infrared light reflected by the eye 15 of the photographer is guided to the image sensor 14 as the light-receiving means via the beam splitter 11a of the eyepiece lens 11 and the light-receiving lens 12. In arithmetic processing means, the visual axis detecting circuit 101 A/D-converts an eyeball image output from the image sensor 14, and sends the image information to the CPU 100. The CPU 100 analyzes the obtained eyeball image information to check the distance between the eye 15 of the photographer and the eyepiece lens 11 and to check if a ghost is generated by spectacles.

If the distance between the eye 15 of the photographer and the eyepiece lens 11 is relatively small, and no ghost generated by the spectacles is detected, the CPU 100 discriminates that the photographer does not wear spectacles. If the posture of the camera at this time is the horizontal posture, the illumination state flag IREDh is set to be "0"; if the posture of the camera is the first vertical posture, the illumination state flag IREDv1 is set to be "0"; or if the posture of the camera is the second vertical posture, the illumination state flag IREDv2 is set to be "0".

On the other hand, if the distance between the eye 15 of the photographer and the eyepiece lens 11 is relatively large, or a ghost generated by the spectacles is detected, the CPU 100 discriminates that the photographer wears spectacles or has a far eyepoint even though he or she does not wear spectacles. If the posture of the camera at this time is the horizontal posture, the illumination state flag IREDh is set to be "1"; if the posture of the camera is the first vertical posture, the illumination state flag IREDv1 is set to be "1"; or if the posture of the camera is the second vertical posture, the illumination state flag IREDv2 is set to be "1".

After the illumination state is discriminated (#2237), the illuminating IREDs are re-selected to perform visual axis detection on the basis of the discrimination result (#2238).

Subsequently, the eyeball rotation angle detecting means detects the visual axis (the rotation angle of the eyeball) (#2239). At this time, the rotation angles (θx, θy) of the eyeball and the pupil diameter Rp are detected.

When the rotation angles of the eyeball are detected while the photographer gazes visual index 1, the visual axis detection number n is incremented by 1 (#2240). In this embodiment, since the visual axis detection number for one visual index is set to be 10, if the visual axis detection number n is smaller than "10" (#2241), visual axis detection for visual index 1 is continued (#2239). On the other hand, if the visual axis detection number n has reached "10"

(#2241), visual axis detection for visual index 1 ends. The CPU 100 causes a sound generator (not shown) to generate several electronic sounds so that the photographer recognizes the end of visual axis detection for visual index 1. At the same time, the CPU 100 turns off visual index 1 via the LED drive circuit 106 (#2242).

Furthermore, the CPU 100 performs data processing of 10 sets of detected eyeball rotation angles (θx, θy) and pupil diameters Rp (#2243). In this processing, data which were detected upon movement of the visual axis against the photographer's will are excluded. The CPU 100 excludes data with large deviations from an average value of the detected data, and calculates an average value of the remaining data.

Moreover, the CPU 100 checks if the data after the data processing are valid (#2244). In this checking operation, the number of valid data and their average value in the 10 sets of detected data are compared with reference values. For example, when the number of valid data is "5" or less, or their average value exceeds a predetermined range, it is determined that acquisition of calibration data for the first visual index is not successful (#2244). In this case, the CPU 100 causes a sound generator (not shown) to generate an electronic sound for a predetermined period of time, and sends a signal to the LCD drive circuit 105 to flicker a "CAL" display on each of the finder LCD 24 and the monitor LCD 42, thus generating an alarm to the photographer (#2261).

On the other hand, when the number of valid data is larger than "5", and their average value falls within a predetermined range, it is determined that data after the data processing are valid (#2244), and the CPU 100 stores the processed data on predetermined addresses in the EEPROM 100a (#2245). At this time, the setting value of the illumination state flag of the illumination means is also stored in the EEPROM 100a as the storage means.

The calibration data to be stored in the EEPROM 100a include the average value of the rotation angles of the eyeball, the average value of the pupil diameters, and the product of these average values. The calibration data are not updated in each calibration, but are added to already stored values (see "Σ" of FIG. 29A). For example, when the posture of the camera upon calibration of the gazing point corresponds to the horizontal posture shown in FIGS. 26A and 26B, if the rotation angles of the eyeball after the data processing are represented by (θx1, θy1), and the pupil diameter after the data processing is represented by Rpx1, "(θx1, Rpx1*θx1, Rpx1, Rpx1^2)" are added to stored values on addresses corresponding to these data. At this time, data of the rotation angle θy1 in the vertical direction is processed after calibration of the gazing point for the second visual index, and the processed data is stored, as will be described later.

On the other hand, when the posture of the camera upon calibration of the gazing point corresponds to the first vertical posture shown in FIGS. 26C and 26D, if the rotation angles of the eyeball after the data processing are represented by (θx1v1, θy1v1), and the pupil diameter after the data processing is represented by Rpy1v1, "(θy1v1, Rpy1v1*θy1v1, Rpy1v1, Rpy1v1^2)" are added to stored values on addresses corresponding to these data. At this time, the rotation angle θx1v1 in the horizontal direction is processed after calibration of the gazing point for the second visual index, and the processed data is stored, as will be described later.

Similarly, when the posture of the camera upon calibration of the gazing point corresponds to the second vertical posture shown in FIGS. 26E and 26F, if the rotation angles of the eyeball after the data processing are represented by ($\theta x1v2$, $\theta y1v2$), and the pupil diameter after the data processing is represented by Rpy1v2, "($\theta y1v2$, Rpy1v2*$\theta y1v2$, Rpy1v2, Rpy1v2^2)" are added to stored values on addresses corresponding to these data. At this time, the rotation angle $\theta x1v2$ in the horizontal direction is processed after calibration of the gazing point for the second visual index, and the processed data is stored, as will be described later.

After the calibration data of the gazing point and illumination state corresponding to the first visual index are memorized (#2245), the CPU 100 confirms the state of the switch SW1. If the switch SW1 is ON upon depression of the release button 41, the CPU 100 waits until the switch SW1 is turned off (#2246).

When the CPU 100 confirms via the signal input circuit 104 that the switch SW1 is OFF (#2246), it sends a signal to the LED drive circuit 106 to flicker gazing point calibration visual index 2 (#2247). In this case, the gazing point calibration visual index is displayed using the marks 200 or 204 which also serve as distance measuring point marks, and are not used for the first visual index. For example, when the posture of the camera corresponds to the horizontal posture, as shown in FIGS. 26A and 26B, the calibration visual index begins to flicker from the distance measuring mark 200 at the left end in this case. On the other hand, when the posture of the camera corresponds to the first vertical posture at which the release button 41 is located at the upper position, as shown in FIGS. 26C and 26D, the calibration visual index begins to flicker from the distance measuring point 200 at the lower end with respect to the photographer. Similarly, when the posture of the camera corresponds to the second vertical posture at which the release button 41 is located at the lower position, as shown in FIGS. 26E and 26F, the calibration visual index begins to flicker from the distance measuring point 204 at the lower end with respect to the photographer.

Furthermore, the CPU 100 confirms via the signal input circuit 104 if an ON signal of the switch SW1 as a trigger signal for starting calibration of the gazing point corresponding to the second visual index is received (#2248). If an ON signal of the switch SW1 is not received, the camera waits (#2248). If the photographer gazes the visual index which begins to flicker, and depresses the release button 41 to turn on the switch SW1 (#2248), the CPU 100 sends a signal to the LED drive circuit 106 to turn on calibration visual index 2 (#2249). Furthermore, the eyeball rotation angle detecting means detects the visual axis (the rotation angle of the eyeball) (#2250). At this time, the rotation angles ($\theta x$, $\theta y$) of the eyeball and the pupil diameter Rp are detected.

When the rotation angles of the eyeball are detected while the photographer gazes visual index 2, the visual axis detection number n is incremented by "1" (#2251). In this embodiment, since the visual axis detection number for one visual index is set to be 10, if the visual axis detection number n is smaller than "20" (#2252), visual axis detection for visual index 2 is continued (#2250). On the other hand, if the visual axis detection number n has reached "20" (#2252), visual axis detection for visual index 2 ends. The CPU 100 causes a sound generator (not shown) to generate several electronic sounds so that the photographer recognizes the end of visual axis detection for visual index 2. At the same time, the CPU 100 turns off visual index 2 via the LED drive circuit 106 (#2253).

The CPU 100 performs data processing of 10 sets of detected eyeball rotation angles ($\theta x$, $\theta y$) and pupil diameters Rp (#2254). The CPU 100 excludes data with large deviations from an average value of the detected data, and calculates an average value of the remaining data. The CPU 100 then checks if the data after the data processing are valid (#2255). In this checking operation, the number of valid data and their average value in the 10 sets of detected data are compared with reference values. For example, when the number of valid data is "5" or less, or their average value exceeds a predetermined range, it is determined that acquisition of calibration data for visual index 2 is not successful (#2255). In this case, the CPU 100 causes a sound generator (not shown) to generate an electronic sound for a predetermined period of time, and sends a signal to the LCD drive circuit 105 to flicker a "CAL" display on each of the finder LCD 24 and the monitor LCD 42, thus generating an alarm to the photographer (#2261). At this time, if the calibration data and illumination state corresponding to visual index 1 are stored, these data are reset.

On the other hand, when the number of valid data is larger than "5", and their average value falls within a predetermined range, it is determined that data after the data processing are valid (#2255), and the CPU 100 adds and stores the processed data and calibration numbers on predetermined addresses in the EEPROM 100a (#2256).

For example, when the posture of the camera upon calibration of the gazing point corresponds to the horizontal posture shown in FIGS. 26A and 26B, if the rotation angles of the eyeball after the data processing are represented by ($\theta x2$, $\theta y2$), and the pupil diameter after the data processing is represented by Rpx2, "($\theta x2$, Rpx2*$\theta x2$, Rpx2, Rpx2^2)" are added to stored values on addresses corresponding to these data, as shown in FIG. 29A. The data $\theta yh$ and Rpyh for the rotation in the vertical direction are calculated by:

$$\theta yh = (\theta y1 + \theta y2)/2$$

$$Rpyh = (Rpx1 + Rpx2)/2$$

The calculated data are added to stored values on addresses corresponding to these data as calibration data ($\theta yh$, Rpyh*$\theta yh$, Rpyh, Rpyh^2).

On the other hand, when the posture of the camera upon calibration of the gazing point corresponds to the first vertical posture shown in FIGS. 26C and 26D, if the rotation angles of the eyeball after the data processing are represented by ($\theta x2v1$, $\theta y2v1$), and the pupil diameter after the data processing is represented by Rpx2v1, "($\theta y2v1$, Rpy2v1*$\theta y2v1$, Rpy2v1, Rpy2v1^2)" are added to stored values on addresses corresponding to these data. The data $\theta xv1$ and Rpxv1 for the rotation in the horizontal direction are calculated by:

$$\theta xv1 = (\theta x1v1 + \theta x2v1)/2$$

$$Rpxv1 = (Rpy1v1 + Rpx2v1)/2$$

The calculated values are added as calibration data ($\theta xv1$, Rpxv1*$\theta xv1$, Rpxv1, Rpxv1^2) to stored values on addresses corresponding to these data.

Similarly, when the posture of the camera upon calibration of the gazing point corresponds to the second vertical posture shown in FIGS. 26E and 26F, if the rotation angles of the eyeball after the data processing are represented by ($\theta x2v2$, $\theta y2v2$), and the pupil diameter after the data processing is represented by Rpx2v2, "($\theta y2v2$, Rpy2v2*$\theta y2v2$, Rpy2v2, Rpy2v2^2)" are added to stored values on addresses corresponding to these data. The data $\theta xv2$ and Rpxv2 for the rotation in the horizontal direction are calculated by:

$$\theta_{xv2} = (\theta_{x1v2} + \theta_{x2v2})/2$$

$$Rp_{xv2} = (Rp_{y1v2} + Rp_{x2v2})/2$$

The calculated values are added as calibration data ($\theta_{xv2}$, $Rp_{xv2}*\theta_{xv2}$, $Rp_{xv2}$, $Rp_{xv2}^2$) to stored values on addresses corresponding to these data.

After the calibration data and the calibration number for the second visual index are memorized (#2256), the CPU 100 makes a display indicating completion of calibration of the gazing point via the LCD drive circuit 105 and the LED drive circuit 106 (#2257). The LED drive circuit 106 energizes the superimposed LEDs 21 to flicker visual indices 1 and 2 several times, and the LCD drive circuit 105 supplies signals to the LCDs 24 and 42 to display "END" for a predetermined period of time.

After a series of calibration operations of the gazing point, the camera waits until the photographer operates the electronic dial 45 or the mode dial 44. When the photographer turns the electronic dial 45 to select another calibration number, the CPU 100 detects a change in calibration number via the signal input circuit 104 (#2258), and the control advances to the initialization step (#2226) of the gazing point calibration routine.

When the photographer turns on the switch SW1 to continuously perform calibration of the gazing point, the CPU 100 detects an ON signal of the switch SW1 via the signal input circuit 104 (#2259), and the control advances to the start step (#2234) of the gazing point calibration routine.

When the photographer selects another photographing mode by turning the mode dial 44, the CPU 100 detects a change in photographing mode via the signal input circuit 104 (#2260), and the control returns to the main routine (#2262).

Referring back to FIGS. 25A and 25B, upon completion of detection of personal information associated with the visual axis (#2225), the camera waits until the switch SW1 is turned on upon depression of the release button 41 (#2204). If the mode dial 44 is not set in the gazing point calibration mode (#2202) but is set in the power supply lock mode (#2203), the power supply of the camera is turned off (#2226).

On the other hand, if the mode dial 44 is set in the normal photographing mode, the camera waits until the switch SW1 is turned on upon depression of the release button 41 (#2204).

If the signal input circuit 104 detects that the switch SW1 is turned on upon depression of the release button 41 (#2204), the posture detecting means detects the present posture of the camera (#2205). The posture detecting means is constituted by the CPU 100 and the signal input circuit 104. The CPU 100 analyzes signals transmitted from the posture detecting switches SW-ANG1 and SW-ANG2 via the signal input circuit 104, and determines whether the posture of the camera corresponds to the horizontal posture or one of the vertical postures.

Furthermore, the CPU 100 confirms calibration data to be used in visual axis detection on the basis of the contents of the EEPROM 100a (#2206). At this time, if the confirmed calibration data number is set to be "0" corresponding to the visual axis forbid mode (#2207), focusing point detection for the respective distance measuring points is immediately executed without performing the visual axis detecting operation (#2213).

On the other hand, if the calibration data number is set to be a predetermined value other than "0" (#2207), the CPU 100 sets IREDs for illuminating the eye 15 of the photographer (#2208).

FIG. 28 is a flow chart showing the illuminating IRED setting routine.

Referring to FIG. 28, the CPU 100 checks if a calibration corresponding to the present posture of the camera detected by the posture detecting means has already been executed (#3270). This checking operation is attained by reading out the calibration number (nh, nv1, or nv2 in FIG. 29A) stored at predetermined addresses in the EEPROM 100a as the storage means. If a calibration corresponding to the present posture of the camera has been executed (#3270), an illumination state corresponding to the present posture is set (#3271).

More specifically, when the posture of the camera corresponds to the horizontal posture, as shown in FIGS. 26A and 26B, if the illumination state flag IREDh is set to be "0", the IREDs 13a and 13b for a naked-eye photographer are set. On the other hand, if the illumination state flag IREDh is set to be "1", the IREDs 13c and 13d for a photographer who wears spectacles are set. When the posture of the camera corresponds to the first vertical posture at which the release button 41 is located at the upper position, as shown in FIGS. 26C and 26D, if the illumination state flag IREDv1 is set to be "0", the IREDs 13a and 13e for a naked-eye photographer are set. On the other hand, if the illumination state flag IREDv1 is set to be "1", the IREDs 13c and 13g for a photographer who wears spectacles are set. Furthermore, when the posture of the camera corresponds to the second vertical posture at which the release button 41 is located at the lower position, as shown in FIGS. 26E and 26F, if the illumination state flag IREDv2 is set to be "0", the IREDs 13b and 13f for a naked-eye photographer are set. On the other hand, if the illumination state flag IREDv2 is set to be "1", the IREDs 13d and 13h for a photographer who wears spectacles are set.

In this manner, since the IREDs for a naked-eye photographer, which have a relatively small light emission amount, and the IREDs for a photographer who wears spectacles, which have a relatively large light emission amount, can be set in correspondence with the postures of the camera, even when the eyepoint of the photographer who looks into the finder changes depending on the posture of the camera, the visual axis detecting means can acquire a good eyeball image.

On the other hand, if a calibration is not performed yet in the present posture of the camera (#3270), the illumination states of the remaining two postures are compared. In this case, if the stored illumination states of the remaining two postures match each other, or if the illumination state of only one of the remaining two postures is stored (#3272), the stored illumination state is set (#3273). On the other hand, if the stored illumination states of the remaining two postures do not match each other (#3272), the IREDs for a naked-eye photographer are set (#3274).

Referring back to FIG. 25A, when illuminating IREDs corresponding to the posture of the camera are set (#2208), the CPU 100 executes detection of the visual axis of the photographer who gazes an object via the finder (#2209). In practice, the eyeball rotation angle detecting means detects the rotation angles of the eyeball of the photographer. The CPU 100 transmits a signal to the IRED driving circuit 107 to turn on the set IREDs. At the same time, the CPU 100 sends a signal to the visual axis detecting circuit 101 to start light accumulation of the image sensor 14. Upon completion of light accumulation for a predetermined period of time, the visual axis detecting circuit 101 A/D-converts an image output from the image sensor 14, and sends image information to the CPU 100. The CPU 100 executes image processing of the eyeball image signal in accordance with a predetermined algorithm, thereby extracting feature points (cornea reflected images and edges of the pupil) of the eyeball image. If the coordinates of the middle point of a pair of extracted cornea reflected images are represented by (xpo, ypo), and the coordinates of the center of the pupil calculated based on the edges of the pupil are represented by (xic, yic), the rotation angle θ of the eyeball of the photographer satisfies formulas (5) and (6) above.

After the rotation angles of the eyeball are calculated by the eyeball rotation angle detecting means, the gazing point in the finder of the photographer is calculated using the personal information associated with the visual axis of the photographer (#2210). The coordinates (x, y) of the gazing point in the finder are given by formulas (7) and (8) above.

After the gazing point in the finder where the photographer gazes is calculated (#2210), a distance measuring point to be subjected to focusing point detection is selected on the basis of the calculated coordinates of the gazing point (#2211). In this case, a distance measuring point nearest the coordinates of the gazing point is selected. Furthermore, the CPU 100 displays the selected distance measuring point in the finder.

When the photographer recognizes upon observation of the distance measuring point superimpose-displayed in the finder that the selected distance measuring point is different from one that he or she intended, and the photographer releases his or her hand from the release button 41 to turn off the switch SW1 (#2212), the CPU 100 confirms the selected mode again (#2201). If the normal photographing mode is selected, the control waits until the switch SW1 is turned on (#2204).

On the other hand, when the photographer keeps the switch SW1 ON upon observation of the superimpose-displayed distance measuring point selected by his or her visual axis (#2212), the auto focusing point detecting circuit 103 executes focusing point detection at the distance measuring point selected by the visual axis information (#2213).

Upon completion of the focusing point detection (#2213), a distance measuring point at which focusing point adjustment of the photographing lens 1 is to be actually performed is determined (#2214).

If the distance measuring at the distance measuring point decided based on the visual axis information is not possible (#2215), the CPU 100 sends a signal to the LCD drive circuit 105 to flicker the in-focus mark 50 on the finder LCD 24, thereby displaying, for the photographer, an alarm message indicating that the distance measuring is "NG" (not possible) (#2223). This alarm message is continuously displayed until the switch SW1 is released (#2224).

If the decided distance measuring point can be subjected to distance measuring (#2215), and the focusing point adjustment state of the photographing lens 1 corresponding to the distance measuring point is not an in-focus state (#2216), the CPU 100 sends a signal to the lens focusing point adjusting circuit 110 to drive the focusing lens 1a in the photographing lens 1 by a determined amount (#2222). After the lens is driven, the auto focusing point detecting circuit 103 performs focusing point detection at the decided distance measuring point again (#2213), and it is checked if the photographing lens 1 has reached an in-focus-state (#2216). If the photographing lens 1 has reached an in-focus state (#2216), the CPU 100 sends a signal to the LCD drive circuit 105 to turn on the in-focus mark 50 on the finder LCD 24, and also sends a signal to the LED drive circuit 106 to perform an in-focus display on the in-focus distance measuring point (#2217).

At this time, the flickering display of the distance measuring point selected by the visual axis is turned off, and the in-focus distance measuring point is turned on, so that the photographer can recognize the in-focus state. If the photographer observes the in-focus distance measuring point displayed in the finder, recognizes that the distance measuring point is not correct, and releases his or her hand from the release button 41 to turn off the switch SW1 (#2218), the CPU 100 confirms the selected mode again (#2201). If the normal photographing mode is selected, the control waits until the switch SW1 is turned on (#2204).

On the other hand, if the photographer keeps the switch SW1 ON upon observation of the displayed in-focus distance measuring point (#2218), the CPU 100 sends a signal to the photometering circuit 102 to perform photometering (#2219). At this time, an exposure value is calculated by weighting the photometering regions 210 to 213 including the in-focus distance measuring point.

Furthermore, it is checked if the switch SW2 is turned on by pressing the release button 41 (#2220). If the switch SW2 is OFF, the state of the switch SW1 is checked again (#2218). On the other hand, if the switch SW2 is ON, the CPU 100 sends signals to the shutter controlling circuit 108, the motor controlling circuit 109, and the aperture drive circuit 111.

Upon completion of the shutter release operations of the camera (#2220), the CPU 100 confirms the selected mode again (#2201). If the normal photographing mode is selected, the control waits until the switch SW1 is turned on (#2204).

Figure 30:
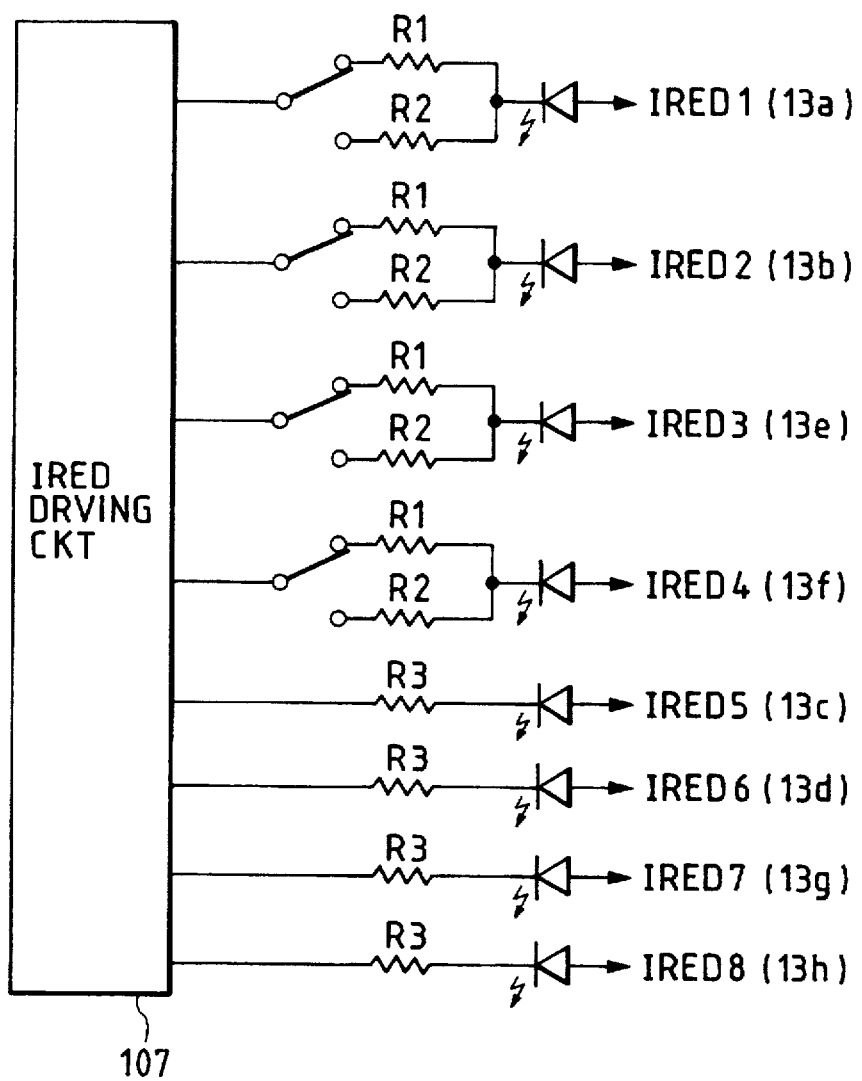
FIG. 30 is a circuit diagram showing the arrangement of a principal part upon application of the fifth embodiment of the present invention to a single-lens reflex camera.
Figure 31B:
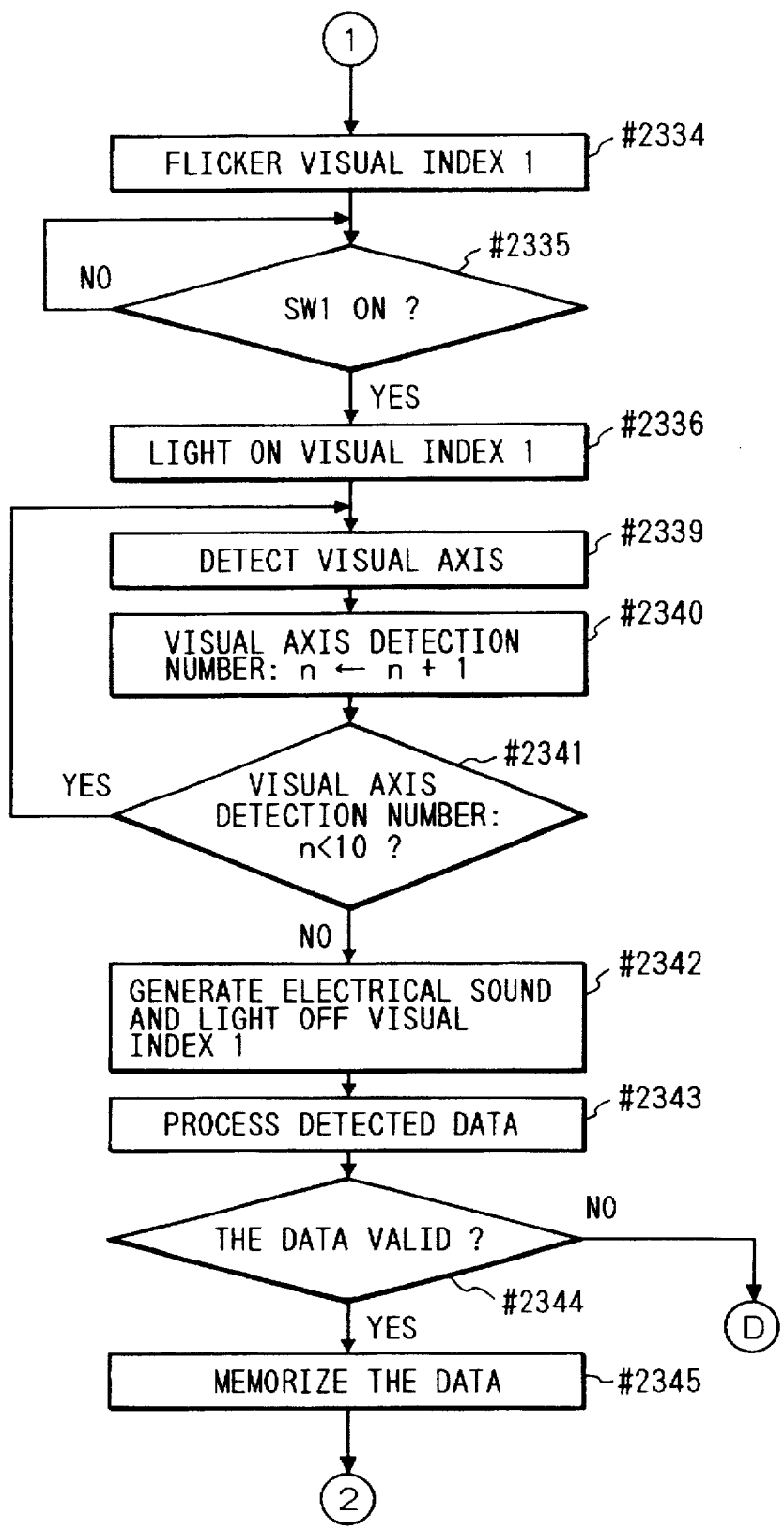
FIG. 31 is comprised of FIGS. 31A to 31D illustrating flow charts showing the operation in a calibration routine according to the fifth embodiment of the present invention.
Figure 31C:
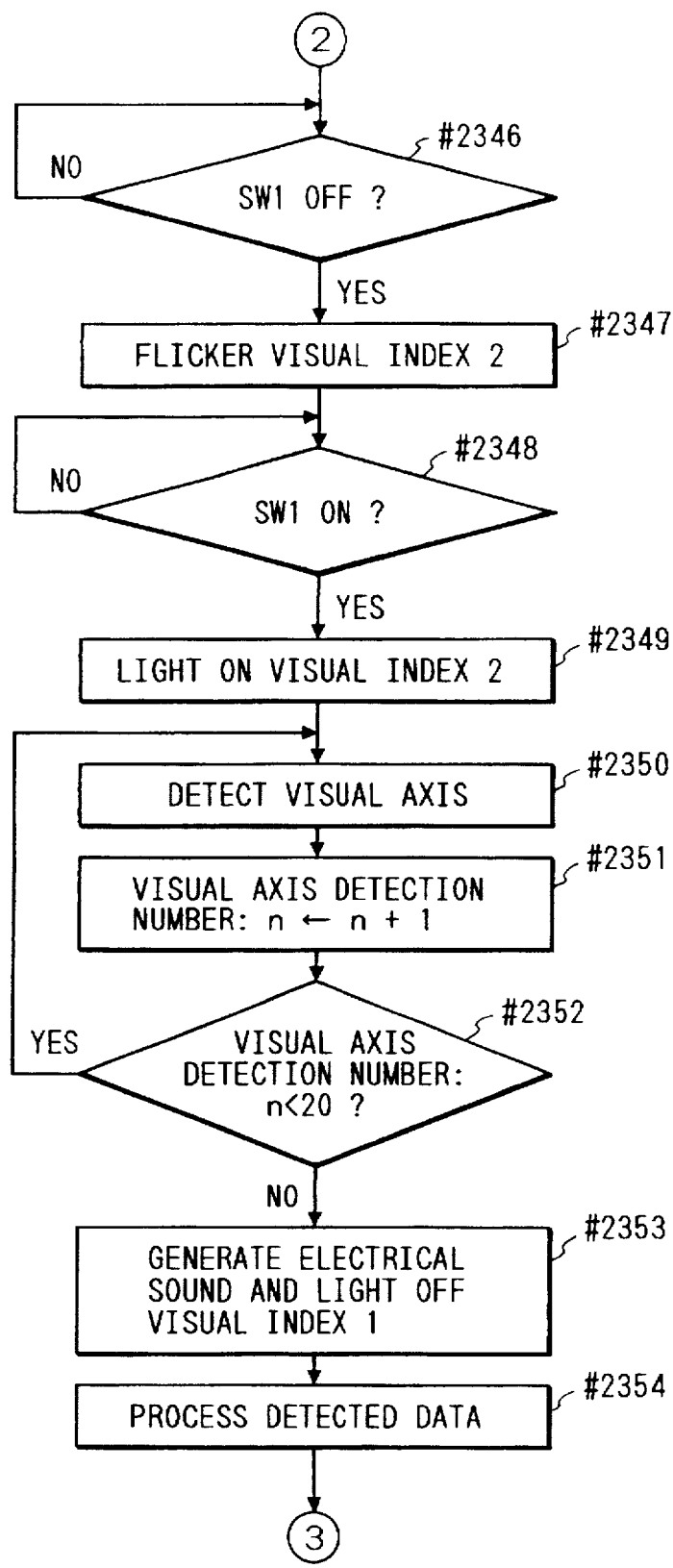
Figure 31D:
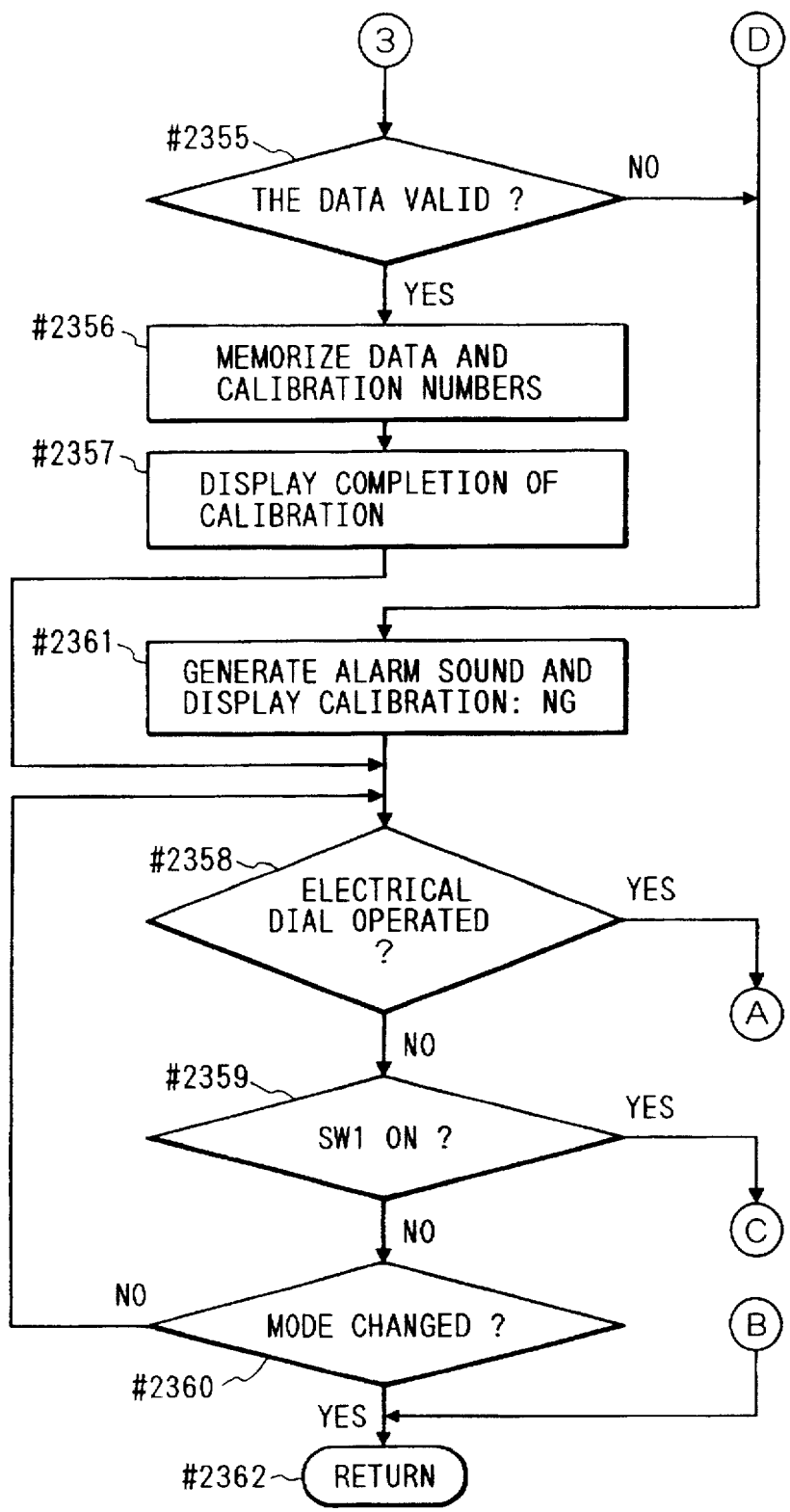
Figure 32:
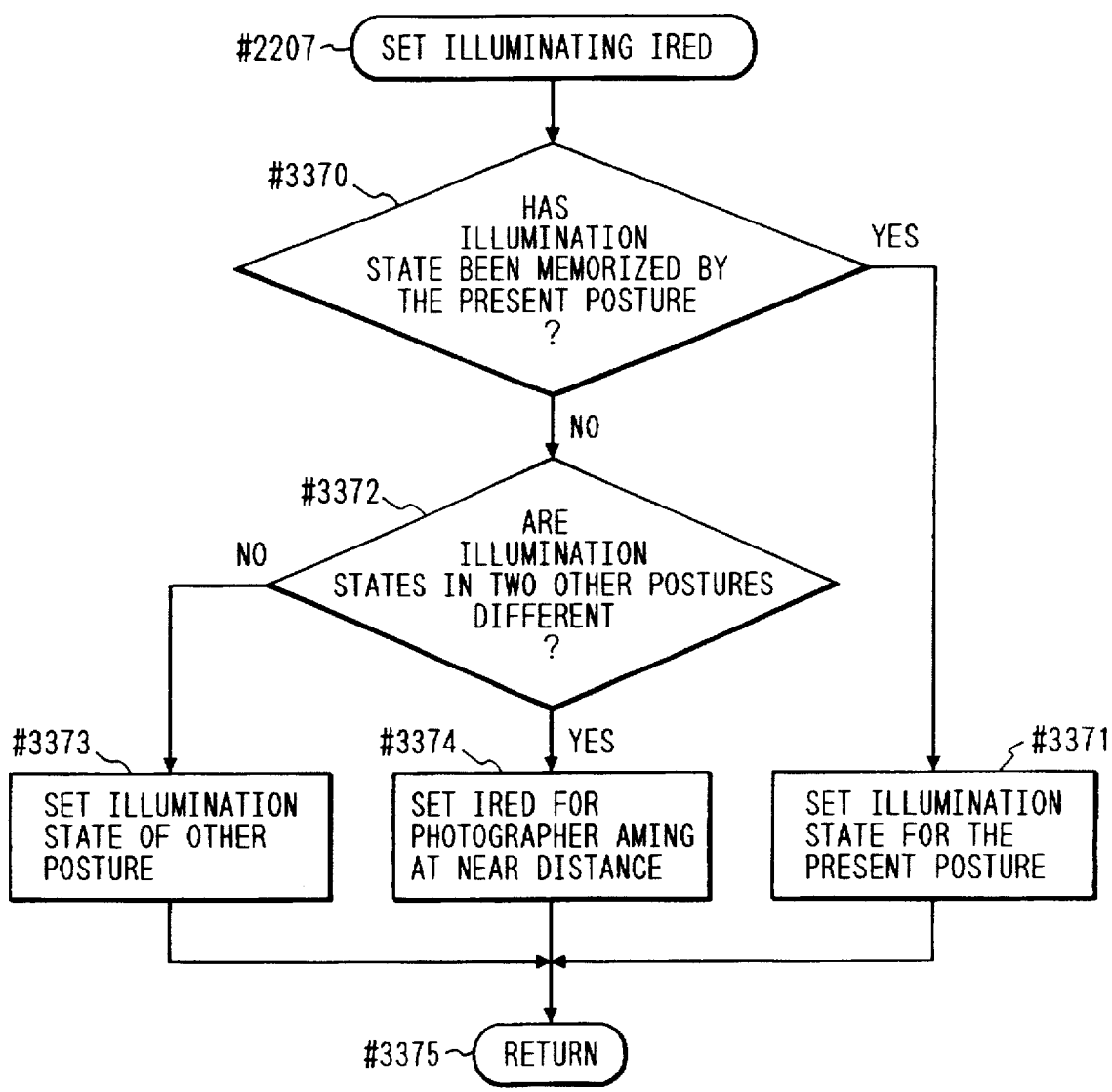
FIG. 32 is a flow chart showing the illuminating IRED setting operation in FIGS. 31A to 31D.

FIGS. 30 to 33 are views according to the fifth embodiment of the present invention. FIG. 30 is a circuit diagram showing the connecting relationship between the IRED driving circuit 107 shown in FIG. 5 and the IREDs. FIGS. 31A and 31D are flow charts showing the gazing point calibration routine for acquiring personal information associated with the visual axis. FIG. 32 is a flow chart showing the illuminating IRED setting routine, and FIG. 33 is a table showing the relationship between illumination state flags and the IREDs in correspondence with the postures of the camera in the fifth embodiment.

In this embodiment, as shown in FIG. 30, the IREDs 13a, 13b, 13e, and 13f for a naked-eye photographer can be set to have two different light emission amounts by selecting two different resistors R1 and R2. In practice, the resistor for setting a relatively small light emission amount is selected for a naked-eye photographer who has a relatively close eyepoint. On the contrary, the resistor for setting a relatively large light amount is selected for a naked-eye photographer who has a relatively far eyepoint. On the other hand, the IREDs 13c, 13d, 13g, and 13h for a photographer who wears spectacles always emit light in a relatively large light emission amount.

The operation of the camera with the visual axis detecting means with the above arrangement will be described below. Since the main operation of the camera, and the illumination states of the illumination means and the states in the finder view field in the respective postures of the camera are the same as those shown in FIGS. 25A and 25B and FIGS. 26A to 26F, they will be quoted as needed.

Referring to FIG. 25A, when the camera is released from an inoperative state (lock state) and is set in a predetermined photographing mode by turning the mode dial 44, the power supply of the camera is turned on (#2200).

The CPU 100 confirms the selected mode position of the mode dial 44 via the signal input circuit 104 (#2201). If the mode dial 44 is set in the calibration mode of a gazing point (#2202), a calibration of the gazing point is executed to acquire personal information associated with the visual axis of the photographer (#2225).

FIGS. 31A and 31D are flow charts showing the gazing point calibration routine in this embodiment. The method of acquiring personal information associated with the visual axis of the photographer will be explained below with reference to FIGS. 31A and 31D.

When a photographer turns the mode dial 44 and sets the CAL position 44d at the index 55, the gazing point calibration mode is set (#2325).

The signal input circuit 104 supplies a signal to the LCD drive circuit 105 via the CPU 100 to cause the finder LCD 24 and the monitor LCD 42 to display that one of the calibration modes is started (#2326).

When the photographer turns the electronic dial 45, the signal input circuit 104, which detects the rotation, transmits a signal to the LCD drive circuit 105 via the CPU 100. As a result, the calibration number displayed on each of the finder LCD 24 and the monitor LCD 42 changes in synchronism with the rotation of the electronic dial 45. After the photographer selects a desired calibration number while observing the calibration number displayed on each of the finder LCD 24 and the monitor LCD 42, the CPU 100 confirms the selected calibration number (#2327).

Subsequently, the CPU 100 confirms a photographing mode via the signal input circuit 104. If it is confirmed that the photographer turns the mode dial 44 to select a photographing mode other than the gazing, point calibration mode (#2328), the CPU 100 turned off the calibration displays inside and outside the finder (#2330), and the flow returns to the photographing operation of the camera as the main routine (#2362).

On the other hand, when the CPU 100 confirms that the gazing point calibration mode is kept set (#2328), the calibration data number selected by the electronic dial 45 is confirmed again (#2329). At this time, if the calibration data number stored in the EEPROM 100a is set to be "0", and the visual axis forbid mode is selected (#2329), the calibration number is confirmed again (#2327), and the control waits until the photographing mode is changed.

If the calibration data number is set to be a value other than "0" (#2329), detection of the posture of the camera is continued by the posture detecting means constituted by the CPU 100 and the signal input circuit 104 (#2331), etc.

The posture detecting means processes the output signals from the mercury switches 27 and 28 as the posture detecting switches SW-ANG1 and SW-ANG2 via the signal input circuit 104, and determines if the camera is held at a horizontal posture or vertical posture, and if the release button 41 is located at the heavenward position or earthward position when the camera is held at the vertical posture.

When the posture of the camera is detected (#2331), the photographer inputs information for setting the illuminating IREDs. The photographer inputs information as to whether or not he or she wears spectacles, and also inputs information as to whether his or her eyepoint is near or far if he or she does not wear spectacles. Such information can be input by turning the electronic dial 45 while depressing a predetermined switch.

The illumination state of the illumination means set based on the information input by the photographer is stored in the EEPROM 100a as the storage means (#2332). FIG. 33 shows the setting values of the illumination state flags (IREDh, IREDv1, and IREDv2) stored in the EEPROM 100a.

After IREDs for illuminating the eye 15 of the photographer are set in correspondence with the posture of the camera (#2332), the CPU 100 confirms the state of the switch SW1. If the switch SW1 is ON upon depression of the release button 41, the control waits until the switch SW1 is turned off (#2333).

When the CPU 100 confirms via the signal input circuit 104 that the switch SW1 is OFF (#2333), it sets a visual axis detection number n to be 0, and resets variables used in gazing point calculations.

Furthermore, the CPU 100 sends a signal to the LED drive circuit 106 to flicker calibration visual index 1 of the gazing point (#2334).

The camera waits if an ON signal of the switch SW1 as a trigger signal for starting the calibration of the gazing point is not received (#2335). When the photographer gazes the visual index which begins to flicker, and turns on the switch SW1 (#2335), the CPU 100 sends a signal to the LED drive circuit 106 to turn on calibration visual index 1 (#2336).

Subsequently, the eyeball rotation angle detecting means detects the visual axis (the rotation angle of the eyeball) (#2339). At this time, the rotation angles (θx, θy) of the eyeball and the pupil diameter Rp are detected.

When the rotation angles of the eyeball are detected while the photographer gazes visual index 1, the visual axis detection number n is incremented by "1" (#2340). In this embodiment, since the visual axis detection number for one visual index is set to be 10, if the visual axis detection number n is smaller than "10" (#2341), visual axis detection for visual index 1 is continued (#2339). On the other hand, if the visual axis detection number n has reached "10" (#2341), visual axis detection for visual index 1 ends. The CPU 100 causes a sound generator (not shown) to generate several electronic sounds so that the photographer recognizes the end of visual axis detection for visual index 1. At the same time, the CPU 100 turns off visual index 1 via the LED drive circuit 106 (#2342).

Furthermore, the CPU 100 performs data processing of 10 sets of detected eyeball rotation angles (θx, θy) and pupil diameters Rp (#2343). In this processing, data which were detected upon movement of the visual axis against the photographer's will are excluded. The CPU 100 excludes data with large deviations from an average value of the detected data, and calculates an average value of the remaining data.

Moreover, the CPU 100 checks if the data after the data processing are valid (#2344). In this checking operation, the number of valid data and their average value in the 10 sets of detected data are compared with reference values. For example, when the number of valid data is "5" or less, or their average value exceeds a predetermined range, it is determined that acquisition of calibration data for the first visual index is not successful (#2344). In this case, the CPU 100 causes a sound generator (not shown) to generate an electronic sound for a predetermined period of time, and sends a signal to the LCD drive circuit 105 to flicker a "CAL" display on each of the finder LCD 24 and the monitor LCD 42, thus generating an alarm to the photographer (#2361).

On the other hand, when the number of valid data is larger than "5", and their average value falls within a predetermined range, it is determined that data after the data processing are valid (#2344), and the CPU 100 stores the processed data on predetermined addresses in the EEPROM 100a (#2345). At this time, the setting value of the illumination state flag of the illumination means is also stored in the EEPROM 100a as the storage means.

After the calibration data of the gazing point and illumination state corresponding to the first visual index are memorized (#2345), the CPU 100 confirms the state of the switch SW1. If the switch SW1 is ON upon depression of the release button 41, the CPU 100 waits until the switch SW1 is turned off (#2346).

When the CPU 100 confirms via the signal input circuit 104 that the switch SW1 is OFF (#2346), it sends a signal to the LED drive circuit 106 to flicker gazing point calibration visual index 2 (#2347). In this case, the gazing point calibration visual index is displayed using the marks 200 or 204 which also serve as distance measuring point marks, and are not used for the first visual index.

Furthermore, the CPU 100 confirms via the signal input circuit 104 if an ON signal of the switch SW1 as a trigger signal for starting calibration of the gazing point corresponding to the second visual index is received (#2348). If an ON signal of the switch SW1 is not received, the camera waits (#2348). If the photographer gazes the visual index 2 which begins to flicker, and depresses the release button 41 to turn on the switch SW1 (#2348), the CPU 100 sends a signal to the LED drive circuit 106 to turn on calibration visual index 2 (#2349). Furthermore, the eyeball rotation angle detecting means detects the visual axis (the rotation angle of the eyeball) (#2350). At this time, the rotation angles (θx, θy) of the eyeball and the pupil diameter Rp are detected.

When the rotation angles of the eyeball are detected while the photographer gazes visual index 2, the visual axis detection number n is incremented by "1" (#2351). In this embodiment, since the visual axis detection number for one visual index is set to be 10, if the visual axis detection number n is smaller than "20" (#2352), visual axis detection for visual index 2 is continued (#2350). On the other hand, if the visual axis detection number n has reached "20" (#2352), visual axis detection for visual index 2 ends. The CPU 100 causes a sound generator (not shown) to generate several electronic sounds so that the photographer recognizes the end of visual axis detection for visual index 2. At the same time, the CPU 100 turns off visual index 2 via the LED drive circuit 106 (#2353).

The CPU 100 performs data processing of 10 sets of the detected eyeball rotation angles (θx, θy) and the pupil diameters Rp (#2354). The CPU 100 excludes data with large deviations from an average value of the detected data, and calculates an average value of the remaining data. The CPU 100 then checks if the data after the data processing are valid (#2355). In this checking operation, the number of valid data and their average value in the 10 sets of detected data are compared with reference values. For example, when the number of valid data is "5" or less, or their average value exceeds a predetermined range, it is determined that acquisition of calibration data for the second visual index is not successful (#2355). In this case, the CPU 100 causes a sound generator (not shown) to generate an electronic sound for a predetermined period of time, and sends a signal to the LCD drive circuit 105 to flicker a "CAL" display on each of the finder LCD 24 and the monitor LCD 42, thus generating an alarm to the photographer (#2361). At this time, if the calibration data and illumination state corresponding to visual index 1 are stored, these data are reset.

On the other hand, when the number of valid data is larger than "5", and their average value falls within a predetermined range, it is determined that data after the data processing are valid (#2355), and the CPU 100 adds and stores the processed data and calibration numbers on predetermined addresses in the EEPROM 100a (#2356).

After the calibration data and the calibration number for the second visual index are memorized (#2356), the CPU 100 makes a display indicating completion of calibration of the gazing point via the LCD drive circuit 105 and the LED drive circuit 106 (#2357). The LED drive circuit 106 energizes the superimposed LEDs 21 to flicker visual indices 1 and 2 several times, and the LCD drive circuit 105 supplies signals to the LCDs 24 and 42 to display "END" for a predetermined period of time.

After a series of calibration operations of the gazing point, the camera waits until the photographer operates the electronic dial 45 or the mode dial 44. When the photographer turns the electronic dial 45 to select another calibration number, the CPU 100 detects a change in calibration number via the signal input circuit 104 (#2358), and the control advances to the initialization step (#2326) of the gazing point calibration routine.

When the photographer turns on the switch SW1 to continuously perform calibration of the gazing point, the CPU 100 detects the ON signal of the switch SW1 via the signal input circuit 104 (#2359), and the control advances to the start step (#2334) of the gazing point calibration routine.

When the photographer selects another photographing mode by turning the mode dial 44, the CPU 100 detects a change in photographing mode via the signal input circuit 104 (#2360), and the control returns to the main routine (#2362).

Referring back to FIG. 25A, upon completion of detection of personal information associated with the visual axis (#2325), the camera waits until the switch SW1 is turned on upon depression of the release button 41 (#2204). If the mode dial 44 is not set in the gazing point calibration mode (#2202) but is set in the power supply lock mode (#2203), the power supply of the camera is turned off (#2226).

On the other hand, if the mode dial 44 is set in the normal photographing mode, the camera waits until the switch SW1 is turned on upon depression of the release button 41 (#2204).

If the signal input circuit 104 detects that the switch SW1 is turned on upon depression of the release button 41 (#2204), the posture detecting means detects the present posture of the camera (#2205). The posture detecting means is constituted by the CPU 100 and the signal input circuit 104, etc. The CPU 100 analyzes signals transmitted from the posture detecting switches SW-ANG1 and SW-ANG2 via the signal input circuit 104, and determines whether the posture of the camera corresponds to the horizontal posture or one of the vertical postures.

Furthermore, the CPU 100 confirms calibration data to be used in visual axis detection on the basis of the contents of the EEPROM 100a (#2206). At this time, if the confirmed calibration data number is set to be "0" corresponding to the visual axis forbid mode (#2207), focusing point detection for the respective distance measuring points is immediately executed without performing the visual axis detecting operation (#2213).

On the other hand, if the calibration data number is set to be a value other than "0" (#2207), the CPU 100 sets IREDs for illuminating the eye 15 of the photographer (#2208).

FIG. 32 is a flow chart showing the illuminating IRED setting routine.

Referring to FIG. 32, the CPU 100 checks if a calibration corresponding to the present posture of the camera detected by the posture detecting means has already been executed (#3370). This checking operation is attained by reading out the calibration number (nh, nv1, or nv2 in FIG. 33) stored at predetermined addresses in the EEPROM 100a as the storage means. If a calibration corresponding to the present posture of the camera has been executed (#3370), the illumination state corresponding to the present posture is set (#3371).

More specifically, when the posture of the camera corresponds to the horizontal posture, as shown in FIGS. 26A and 26B, if the illumination state flag IREDh is set to be "0", the IREDs 13a and 13b for a naked-eye photographer are set to emit light in a relatively small light amount. In this case, if the illumination state flag IREDh is set to be "2", the IREDs 13a and 13b for a naked-eye photographer are set to emit light in a relatively large light amount. On the other hand, if the illumination state flag IREDh is set to be "1", the IREDs 13c and 13d for a photographer who wears spectacles are set.

When the posture of the camera corresponds to the first vertical posture, as shown in FIGS. 26C and 26D, if the illumination state flag IREDv1 is set to be "0", the IREDs 13a and 13e for a naked-eye photographer are set to emit light in a relatively small light amount. In this case, if the illumination state flag IREDv1 is set to be "2", the IREDs 13a and 13e for a naked-eye photographer are set to emit light in a relatively large light amount. On the other hand, if the illumination state flag IREDv1 is set to be "1", the IREDs 13c and 13g for a photographer who wears spectacles are set.

Furthermore, when the posture of the camera corresponds to the second vertical posture, as shown in FIGS. 26E and 26F, if the illumination state flag IREDv2 is set to be "0", the IREDs 13b and 13f for a naked-eye photographer are set to emit light in a relatively small light amount. In this case, if the illumination state flag IREDv2 is set to be "2", the IREDs 13b and 13f for a naked-eye photographer are set to emit light in a relatively large light amount. On the other hand, if the illumination state flag IREDv2 is set to be "1", the IREDs 13d and 13h for a photographer who wears spectacles are set.

In this manner, since the IREDs for a naked-eye photographer, which selectively have relatively small and large light emission amounts, and the IREDs for a photographer who wears spectacles, which have a relatively large light emission amount, can be set in correspondence with the postures of the camera, even when the eyepoint of the photographer who looks into the finder changes depending on the posture of the camera, the visual axis detecting means can acquire a good eyeball image.

On the other hand, if a calibration is not performed yet in the present posture of the camera (#3370), the illumination states of the remaining two postures are compared. In this case, if the stored illumination states of the remaining two postures match each other, or if the illumination state of only one of the remaining two postures is stored (#3372), the matching or one illumination state is set (#3373). On the other hand, if the stored illumination states of the remaining two postures do not match each other (#3372), the IREDs for a near-eyepoint photographer (the IREDs for a naked-eye photographer, which have a relatively small light amount) are set (#3374).

Referring back to FIG. 25A, when the illuminating IREDs corresponding to the posture of the camera are set (#2208), the CPU 100 executes detection of the visual axis of the photographer who gazes an object via the finder (#2209). In practice, the eyeball rotation angle detecting means detects the rotation angles of the eyeball of the photographer. After the rotation angles of the eyeball are calculated, the gazing point in the finder of the photographer is calculated using the personal information associated with the visual axis of the photographer (#2210).

After the gazing point in the finder where the photographer gazes is calculated (#2210), a distance measuring point to be subjected to focusing point detection is selected on the basis of the calculated coordinates of the gazing point (#2211). In this case, a distance measuring point nearest the coordinates of the gazing point is selected. Furthermore, the CPU 100 displays the selected distance measuring point in the finder.

When the photographer recognizes upon observation of the distance measuring point superimpose-displayed in the finder that the selected distance measuring point is different from one that he or she intended, and the photographer releases his or her hand from the release button 41 to turn off the switch SW1 (#2212), the CPU 100 confirms the selected mode again (#2201). If the normal photographing mode is selected, the control waits until the switch SW1 is turned on (#2204).

On the other hand, when the photographer keeps the switch SW1 ON upon observation of the superimpose-displayed distance measuring point selected by his or her visual axis (#2212), the auto focusing point detecting circuit 103 executes focusing point detection at the distance measuring point selected by the visual axis information (#2213).

Upon completion of the focusing point detection (#2213), a distance measuring point at which focusing point adjustment of the photographing lens 1 is to be actually performed is determined (#2214).

If the distance measuring at the distance measuring point decided based on the visual axis information is not possible (#2215), the CPU 100 sends a signal to the LCD drive circuit 105 to flicker the in-focus mark 50 on the finder LCD 24, thereby displaying, for the photographer, an alarm message indicating that the distance measuring is "NG" (not possible) (#2223). This alarm message is continuously displayed until the switch SW1 is released (#2224).

If the decided distance measuring point can be subjected to distance measuring (#2215), and the focusing point adjustment state of the photographing lens 1 corresponding to the distance measuring point is not an in-focus state (#2216), the CPU 100 sends a signal to the lens focusing point adjusting circuit 110 to drive the focusing lens 1a in the photographing lens 1 by a determined amount (#2222). After the lens is driven, the auto focusing point detecting circuit 103 performs focusing point detection at the decided distance measuring point again (#2213), and it is checked if the photographing lens 1 has reached an in-focus state (#2216). If the photographing lens 1 has reached an in-focus state (#2216), the CPU 100 sends a signal to the LCD drive circuit 105 to turn on the in-focus mark 50 on the finder LCD 24, and also sends a signal to the LED drive circuit 106 to perform an in-focus display on the in-focus distance measuring point (#2217).

At this time, the flickering display of the distance measuring point selected by the visual axis is turned off, and the in-focus distance measuring point is turned on, so that the photographer can recognize the in-focus state. If the photographer observes the in-focus distance measuring point displayed in the finder, recognizes that the distance measuring point is not correct, and releases his or her hand from the release button 41 to turn off the switch SW1 (#2218), the CPU 100 confirms the selected mode again (#2201). If the normal photographing mode is selected, the control waits until the switch SW1 is turned on (#2204).

On the other hand, if the photographer keeps the switch SW1 ON upon observation of the displayed in-focus distance measuring point (#2218), the CPU 100 sends a signal to the photometering circuit 102 to perform photometering (#2219). At this time, an exposure value is calculated by weighting the photometering regions 210 to 213 including the in-focus distance measuring point.

Furthermore, it is checked if the switch SW2 is turned on by pressing the release button 41 (#2220). If the switch SW2 is OFF, the state of the switch SW1 is checked again (#2218). On the other hand, if the switch SW2 is ON, the CPU 100 sends signals to the shutter controlling circuit 108, the motor controlling circuit 109, and the aperture drive circuit 111.

Upon completion of the shutter release operations of the camera (#2220), the CPU 100 confirms the selected mode again (#2201). If the normal photographing mode is selected, the control waits until the switch SW1 is turned on (#2204).

Each of the above embodiments exemplifies a case wherein the present invention is applied to a single-lens reflex camera, but the present invention is applicable to various other cameras such as a lens-shutter camera, a video camera, a still video camera, and the like. The present invention is not limited to cameras, but may be similarly applicable to observation apparatuses as long as they have a visual axis detection function, and can be used by a user in different postures.

Furthermore, the present invention may be applied to appropriate combinations of the above-mentioned embodiments or their techniques.

What is claimed is:

1. A visual axis controllable optical apparatus, which is used in mutually different postures, comprising:
    an image pick-up device that picks up at least a portion of an eyeball image:
    a posture detecting device that detects a posture of said optical apparatus:
    a storage device that stores personal data for correcting an individual difference in a visual axis, wherein said storage device stores personal data corresponding to each of the mutually different postures; and
    a visual axis detecting device that detects a visual axis, wherein said visual axis detecting device detects the visual axis using personal data corresponding to the posture of said optical apparatus detected by said posture detecting device and the eyeball image picked up by said image pick-up device.

2. An apparatus according to claim 1, further comprising:
    an input device that inputs personal data to said storage device in accordance with the posture detected by said posture detecting device.

3. An apparatus according to claim 1, further comprising:
    an erasing device that erases personal data stored in said storage device.

4. An apparatus according to claim 3, wherein said erasing device erases the personal data from said storage device in accordance with the posture detected by said posture detecting means.

5. An apparatus according to claim 4, wherein when the posture of said optical apparatus detected by said posture detecting device corresponds to a basic state, said erasing device erases personal data associated with the respective posture.

6. An apparatus according to claim 5, wherein said optical apparatus comprises a camera, and the basic state is a horizontal posture of said camera.

7. An apparatus according to claim 4, wherein when the posture of said optical apparatus detected by said posture detecting device corresponds to a non-basic state, said erasing device erases personal data associated with the non-basic state.

8. An apparatus according to claim 7, wherein said optical apparatus comprises a camera, and the basic state is a horizontal posture of said camera.

9. An apparatus according to claim 4, further comprising:
    an input device that inputs personal data to said storage device in accordance with the posture detected by said posture detecting device.

10. An apparatus according to claim 1, wherein said optical apparatus comprises a camera, and the different postures include two horizontal postures and a vertical posture of said camera.

11. A visual axis controllable optical apparatus, which is used in mutually different postures, comprising:
    an illumination device that illuminates an eyeball;
    an image pick-up device that picks up at least a portion of image of the eyeball illuminated by said illumination device;
    a visual axis detection device that detects a visual axis by using the image of the eyeball picked up by said image pick-up device;
    a posture detecting device that detects a posture of said optical apparatus; and
    a storage device that stores illumination parameters of said illumination device corresponding to each of the mutually different postures, said illumination device illuminating the eyeball under the stored illumination parameters corresponding to the posture of said optical apparatus detected by said posture detecting device.

12. An apparatus according to claim 11, further comprising:
    a personal data storage device that stores personal data associated with the visual axis in correspondence with the different postures,
    said visual axis detecting device detecting the position of the visual axis using the personal data corresponding to the posture of said optical apparatus detected by said posture detecting device, and the image of the eyeball picked up by said image pick-up device.

13. An apparatus according to claim 12, further comprising:
    an input device that inputs personal data to said storage device in accordance with the posture detected by said posture detecting device.

14. An apparatus according to claim 12, wherein the illumination parameters include a brightness of illumination.

15. An apparatus according to claim 12, wherein the illumination parameters include positions of light sources for illumination.

16. An apparatus according to claim 12, wherein the illumination parameters include positions and brightness of light sources for illumination.

17. An apparatus according to claim 12, further comprising:
    an input device that inputs illumination parameters to said storage device.

18. An apparatus according to claim 11, wherein the illumination conditions include a brightness of illumination.

19. An apparatus according to claim 11, wherein the illumination conditions include positions of light sources for illumination.

20. An apparatus according to claim 11, wherein the illumination conditions include positions and brightness of light sources for illumination.

21. An apparatus according to claim 11, further comprising:
    an input device that inputs illumination parameters to said storage device.

22. An apparatus according to claim 11, wherein said optical apparatus comprises a camera, and the mutually different postures include a horizontal posture and two vertical postures of said camera.

23. An apparatus according to claim 12, wherein said optical apparatus comprises a camera, and the mutually different postures include a horizontal posture and two vertical postures of said camera.

24. A visual axis detecting device comprising:

light receiving means for optically receiving an image of an eyeball of a user;

display means for displaying visual indices for obtaining personal data of the user within a view field of the user, wherein said display means displays the visual indices a plurality of times at mutually different positions in a vertical direction within the view field and the visual indices are displayed in order from the upper portion in a vertical direction;

personal data producing means for producing personal data of the user from an image of the eyeball of the user which said light receiving means optically receives when the visual index is displayed; and visual axis detecting means for detecting a visual axis of the user on the basis of the personal data produced by said personal data producing means and the image of the eyeball of the user optically received by said light receiving means.

25. A visual axis detecting device according to claim 24, further comprising posture detecting means for detecting a posture of said visual axis detecting device, wherein a displaying position of the visual index is changed according to the detection result of said posture detecting means.

26. A visual axis detecting device according to claim 25, wherein said personal data producing means comprises a memory for storing the personal data, said memory storing the personal data corresponding to the detection result of said posture detecting means when the personal data of the user is produced.

* * * * *

UNITED STATES PATENT AND TRADEMARK OFFICE
CERTIFICATE OF CORRECTION

PATENT NO. : 5,797,046

DATED : August 18, 1998

INVENTOR(S) : Nagano et al.

Page 1 of 3

It is certified that error appears in the above-identified patent and that said Letters Patent is hereby corrected as shown below:

COLUMN 1:

Line 45, "20" should be deleted.

COLUMN 2:

Line 29, "$\beta*OCSIN\theta\simeq\{xd'+xe'\}/2\}-\{xa'+xb'\}/2\}$" should read --$\beta*OC*SIN\theta \simeq\{xd'+xe'\}/2\}-\{xa'+xb'\}/2\}$--.
Line 60, "Japanese" should read --Japanese Patent--.

COLUMN 3:

Line 3, "CCDS," should read --CCDs,--.

COLUMN 5:

Line 7, "of" (first occurrence) should read --of a--.
Line 8, "a" should be deleted.

COLUMN 8:

Line 50, "on or" should read --on (light on) or--.
Line 51, "the superimpose" should read --and the superimposed--.

UNITED STATES PATENT AND TRADEMARK OFFICE
CERTIFICATE OF CORRECTION

PATENT NO. : 5,797,046

DATED : August 18, 1998

INVENTOR(S): Nagano et al.

It is certified that error appears in the above-identified patent and that said Letters Patent is hereby corrected as shown below:

COLUMN 12:

Line 27, "ΣRpy2v1-^2)" should read --ΣRpy2v1^2)--.

COLUMN 13:

Line 57, "(ΣRpxv2) 2" should read --(ΣRpxv2)^2--.
Line 62, "ΣRpy1v2ΣRpy1v2*θy1v2" should read
  --ΣRpy1v2*ΣRpy1v2*θy1v2--.

COLUMN 17:

Line 55, "spectacle," should read --spectacles,--.

COLUMN 32:

Line 67, "include" should read --includes--.

COLUMN 36:

Line 57, close up right margin.
Line 58, close up left margin.

COLUMN 47:

Line 28, "gazing," should read --gazing--.
Line 29, "turned" should read --turns--.

UNITED STATES PATENT AND TRADEMARK OFFICE
CERTIFICATE OF CORRECTION

PATENT NO. : 5,797,046

DATED : August 18, 1998

INVENTOR(S) : Nagano et al.

It is certified that error appears in the above-identified patent and that said Letters Patent is hereby corrected as shown below:

COLUMN 53:

Line 27, "image:" should read --image;--.
Line 29, "apparatus:" should read --apparatus;--.

SHEET 40:

FIG. 32, "AMING" should read --AIMING--.

Signed and Sealed this

Twenty-seventh Day of April, 1999

Attest:

Q. TODD DICKINSON

Attesting Officer        Acting Commissioner of Patents and Trademarks